United States Patent [19]
Kawase et al.

[11] Patent Number: 5,976,688
[45] Date of Patent: *Nov. 2, 1999

[54] MAGNETO-OPTICAL RECORDING MEDIUM AND METHOD OF MANUFACTURING THE SAME

[75] Inventors: Takeo Kawase; Masaya Ishida; Satoshi Nebashi; Satoshi Shimokawato; Toshiaki Mikoshiba; Shoji Hoshina; Hiromu Miyazawa; Atsushi Takakuwa, all of Suwa, Japan

[73] Assignee: Seiko Epson Corporation, Tokyo, Japan

[ * ] Notice: This patent is subject to a terminal disclaimer.

[21] Appl. No.: 08/912,282

[22] Filed: Aug. 15, 1997

Related U.S. Application Data

[62] Division of application No. 08/211,358, filed as application No. PCT/JP93/01062, Jul. 28, 1993, Pat. No. 5,772,856.

[30] Foreign Application Priority Data

| Jul. 29, 1992 | [JP] | Japan | 4-202514 |
| Nov. 20, 1992 | [JP] | Japan | 4-312215 |
| Nov. 20, 1992 | [JP] | Japan | 4-312217 |
| Mar. 8, 1993 | [JP] | Japan | 5-46910 |
| Mar. 22, 1993 | [JP] | Japan | 5-62018 |
| Apr. 5, 1993 | [JP] | Japan | 5-78304 |
| Apr. 6, 1993 | [JP] | Japan | 5-79875 |

[51] Int. Cl.⁶ ........................ G11B 5/66
[52] U.S. Cl. ............ 428/332; 428/336; 428/694 ML; 428/694 RE; 428/694 MM; 428/900; 427/128; 427/130; 427/131; 204/192.2; 204/192.26
[58] Field of Search ............ 428/634 ML, 634 RE, 428/634 MM, 900, 332, 336; 427/128, 130, 131; 204/192.2, 192.26

[56] References Cited

U.S. PATENT DOCUMENTS 5,648,162 7/1997 Hirokane .................. 428/332
5,691,963 11/1997 Hirokane .................. 369/13

FOREIGN PATENT DOCUMENTS

| 0225141 | 6/1987 | European Pat. Off. . |
| 0257530 | 3/1988 | European Pat. Off. . |
| 0318925 | 6/1989 | European Pat. Off. . |
| 0385786 | 9/1990 | European Pat. Off. . |
| 0424809 | 5/1991 | European Pat. Off. . |
| 0462843 | 12/1991 | European Pat. Off. . |
| 0598524 | 5/1994 | European Pat. Off. . |
| 60-197967 | 10/1985 | Japan . |
| 62-175946 | 8/1987 | Japan . |
| 62-283434 | 12/1987 | Japan . |
| 63-48636 | 3/1988 | Japan . |
| 63-53735 | 3/1988 | Japan . |
| 63-153752 | 6/1988 | Japan . |

(List continued on next page.)

Primary Examiner—Leszek Kiliman
Attorney, Agent, or Firm—Mark P. Watson

[57] ABSTRACT

In a magneto-optical recording medium, a first dielectric layer 12, a recording layer 13, an auxiliary recording layer 14, a second dielectric layer 15 and a reflective layer 16 are sequentially laminated on a transparent substrate 11. Recording layer 14 is formed of a rare-earth transition-metal amorphous alloy having a film thickness of about several hundreds angstroms. Auxiliary recording layer 14 is also formed of a rare-earth transition-metal amorphous alloy. However, the Curie temperature $T_{C2}$ of auxiliary recording layer 14 is 10° K or more higher than the Curie temperature $T_{C1}$ of recording layer 13, and the film thickness of auxiliary recording layer is ultra-thin, such as, 70 Å or less. Further, the squareness ratio of auxiliary recording layer 14 at the Curie temperature $T_{C1}$ of recording layer 13 is 0.7 or higher. These characteristics of auxiliary recording layer 14 may be realized by selecting the composition of auxiliary recording layer 14 or by lowering the density of the layer. In addition, a transition metal, such as, Fe or Co, or a non-magnetic metal, such as, Pt, Al, Ti or Cr, or a nitride of rare-earth transition-metal amorphous alloy may be employed as the material for auxiliary recording layer 14.

43 Claims, 24 Drawing Sheets

FOREIGN PATENT DOCUMENTS

| | | |
|---|---|---|
| 63-224054 | 9/1988 | Japan . |
| 64-27052 | 1/1989 | Japan . |
| 64-76549 | 3/1989 | Japan . |
| 1-107349 | 4/1989 | Japan . |
| 1-119939 | 5/1989 | Japan . |
| 1-173451 | 7/1989 | Japan . |
| 1-237946 | 9/1989 | Japan . |
| 1-292648 | 11/1989 | Japan . |
| 2-130739 | 5/1990 | Japan . |
| 3-19155 | 1/1991 | Japan . |
| 3-268250 | 11/1991 | Japan . |

MAGNETO-OPTICAL RECORDING MEDIUM AND METHOD OF MANUFACTURING THE SAME

This is a divisional of prior application Ser. No. 08/211,358 filed on Jun. 7, 1994 now U.S. Pat. No. 5,772,856, which is a 371 of PCT/JP93/01062 filed Jul. 28, 1993.

BACKGROUND OF THE INVENTION

The present invention relates to a magneto-optical recording medium, and more specifically to a magneto-optical recording medium suitable in use for magnetic field modulation recording.

The recording technique by use of the magneto-optical recording medium may be roughly classified into light modulation recording technique and magnetic field modulation recording technique. The magnetic field modulation recording is easy to overwrite data in the recording medium, and suitable for mark edge recording. In the magnetic field modulation recording, however, since a magnetic head is required, it is necessary to reduce the inductance of the head and further to switch a large current so that the magnetic field may be switched at high speed. In addition, the intensity of the magnetic field applied to the recording layer of the recording medium must be increased as much as possible, by arranging the magnetic head as close as possible to the recording layer thereof. For this purpose, it is practically effective to use a flying magnetic head, as disclosed in Japanese Published, Unexamined (Kokai) Patent Application No. 63-217548.

In any cases, however, it is preferable to reduce the intensity of the magnetic field required to be applied to the recording layer of the recording medium, that is, to record data in the magneto-optical recording medium in accordance with the magnetic field modulation recording in a low magnetic field. Therefore, various countermeasures have been so far proposed as follows: a fourth element, such as, Nd, is added to the recording medium to improve the characteristics thereof in a low magnetic field, as disclosed by DIGEST of 11 th Annual Conference on Magnetics in Japan, page 268; magnetic layers of different compositions are exchange-coupled to decrease a stray magnetic field and thereby to improve the response speed to an external magnetic field, as disclosed in Japanese Published, Unexamined (Kokai) Patent Application No. 62-128040; a perpendicular magnetization film, i.e., a film having an easy perpendicular axis of magnetization and an in-plane magnetization film, i.e., a film having an easy in-plane axis of magnetization, are laminated to concentrate the magnetic flux effectively to the perpendicular magnetization film and thereby to reduce the intensity of the modulated magnetic field, as disclosed in Japanese Published, Unexamined (Kokai) Patent Application No. 61-188758; or a TbFeCo layer is deposited with a GdFeCo layer, which is lower in perpendicular magnetization anisotropy than TbFeCo or DyFeCo, in order to limit the stability of micro domains and thereby to improve the magnetic field sensitivity, as disclosed in Japanese Published, Unexamined (Kokai) Patent Application No. 1-281239.

In the conventional recording techniques so far proposed, however, it has been difficult to reduce the intensity of the modulated magnetic field down to below ±100 Oe, and further there exists a problem in that the reproduced signal characteristics are deteriorated when the fourth element is added to the recording medium or when the in-plane magnetization layer is laminated onto the recording medium. To overcome these problems, therefore, prior to this application, the same inventors have already found that it is possible to reduce the intensity of the modulated magnetic field by virtue of such a method of manufacturing a magneto-optical recording medium as to form a recording layer on a leveled underlayer, and this manufacturing method has been already filed as an application for patent. In addition, the same inventors have found that the same effect as above may be obtained by virtue of such a method of manufacturing a magneto-optical recording medium as to add a leveling process during the formation of the recording layer, and this manufacturing method has also been filed as an application for patent. In practice, however, it has been found that a satisfactory effect cannot be still obtained by only the process of leveling the underlayer. These applications of the inventors are Japanese Published, Unexamined (Kokai) Patent Application No. 5-266520, published Oct. 15, 1993; Japanese Published, Unexamined (Kokai) Patent Application No. 4-209205, published Oct. 29, 1993; and Japanese Published, Unexamined (Kokai) Patent Application No. 6-60450, published Mar. 4, 1994, which applications are incorporated herein by reference herein.

Accordingly, an object of this invention is to provide a magneto-optical recording medium employed for the magnetic field modulation recording, by which sufficient recording effect may be realized in spite of a lower intensity of the modulated magnetic field than is conventional, and the method of manufacturing the same recording medium.

SUMMARY OF THE INVENTION

According to this invention, a magneto-optical recording medium has an ultra-thin auxiliary recording film or layer laminated on a recording layer. The recording layer is formed of a rare-earth transition-metal alloy with a Curie temperature $T_{C1}$, and the auxiliary recording layer is formed of a rare-earth transition-metal alloy with a Curie temperature $T_{C2}$ higher than $T_{C1}$ and with a thickness of 70 Å or less. It is particularly preferable that the Curie temperature $T_{C2}$ of the auxiliary recording layer is higher by 10° K or more than the Curie temperature $T_{C1}$ of the recording layer. Further, it is preferable that the squareness ratio of the auxiliary recording layer is 0.7 or more at the Curie temperature $T_{C1}$ of the recording layer. These characteristics for the auxiliary recording layer may be achieved by adjusting the composition of the auxiliary recording layer and by reducing the density of the auxiliary recording layer.

For other materials employed for auxiliary recording layer, it is possible to utilize a transition metal, such as, Fe, Co, etc., non-magnetic metals, such as, Pt, Al, Ti, Cr, etc., or nitride of the rare-earth transition-metal amorphous alloys.

DESCRIPTION OF THE PREFERRED EMBODIMENTS

Examples of this invention are hereinafter described with reference to the attached drawings.

Figure 1:
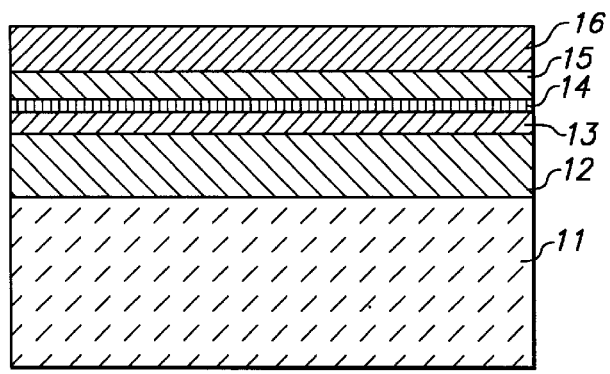
FIG. 1 is a cross-sectional view showing an example of the structure of the magneto-optical recording medium according to this invention.

(1) Examples Related to the Basic Structure of the Auxiliary Recording Layer FIG. 1 shows a cross-sectional structure of the magneto-optical recording medium according to this invention employed for magnetic field modulation recording. A first dielectric layer 12, a recording layer 13, an auxiliary recording layer 14, a second dielectric layer 15 and a reflective layer 16 are sequentially laminated on the surface of a transparent substrate 11. The examples of the materials of these layers are as follows: Transparent substrate 11 is a poly carbonate (PC) substrate. First and second dielectric layers 12 and 15 are AlSiN layers. Recording layer 13 is a NdDyTbFeCo layer. Auxiliary recording layer 14 is a DyFeCo layer. Reflective layer 16 is an Al layer. Further, other materials may be employed for the substrate and the above-mentioned layers. In more detail, for instance, various rare-earth transition-metal alloys such as TbFe, DyFe, GdTbFe, GdDyTbFe, TbFeCo, NdDyFeCo, PrDyFeCo, etc. may be employed as recording layer 13 and auxiliary recording layer 14. Further, it is practically important to add an element, such as, Cr, Ti, Al, Pt, etc. to the above-mentioned composition in order to improve the corrosion resistance.

The Curie temperature of auxiliary recording layer 14 must be higher than that of recording layer 13. For this purpose, it is preferable in auxiliary recording layer 14 of the rare-earth transition-metal alloy to increase the content of the transition-metals, in particular the content of Co, or to increase the content of Gd as the rare earth metal, or to decrease the contents of Nd or Pr. In other words, it is possible to easily increase the Curie temperature of auxiliary recording layer 14 by 10° K degrees or higher than that of recording layer 13, by adjusting the composition of auxiliary recording layer 14.

[EXAMPLE 1]

As the material of recording layer 13, a rare-earth transition-metal alloy having a composition of Nd 5.4 at%, Dy 15.7 at%, Tb 5.1 at%, Fe 58.5 at%, Co 15.3 at% was employed. The above-mentioned thin film was deposited by magnetron DC sputtering technique employing a cast alloy target under the conditions that the argon pressure was 1.8 mTorr and the power was 300 W. Its Curie temperature was 180° C. As clearly understood from its composition, recording layer 13 by itself is provided with the magnetic characteristics wherein the transition metal sublattice magnetization is dominant at room temperature.

As the material of auxiliary recording layer 14, a rare-earth transition-metal alloy having a composition of Dy 29.8 at%, Fe 35.0 at%, Co 35.2 at% was employed. The above-mentioned thin film was deposited by magnetron DC sputtering employing a cast alloy target under the conditions that the argon pressure was 0.4 mTorr and the power was 100 W. Its Curie temperature was 280° C. As clearly understood from its composition, auxiliary recording layer 14 by itself is provided with the magnetic characteristics wherein the rare earth metal sublattice magnetization is dominant at room temperature.

To manufacture the magneto-optical recording medium as shown in FIG. 1, first dielectric layer 12, recording layer 13, the auxiliary recording layer 14, second dielectric layer 15 and reflective layer 16 were deposited in sequence on the surface of transparent substrate 11. In the deposition process, before recording layer 13 is formed, the surface of first dielectric layer 12, which is the underlayer for recording layer 13, had been leveled or planarized. In general, when first dielectric layer 12 with a thickness of several tens nm is formed, it has been so far confirmed by a scanning atomic force microscope that minute roughness is generated on the surface of first dielectric layer 12. AlSiN was employed as the material of first dielectric layer 12. The sputtering conditions were that the sputtering gas was Ar 60%+$N_2$ 40%; the gas pressure was 1.7 mTorr; and the input power was 2500 W RF (radio frequency). An AlSi alloy was employed for the target. As the most simple method of leveling the minute roughness on the surface of first dielectric layer 12, the surface of first dielectric layer 12 was sputtered again employing RF plasma etching technique. Conditions of the RF plasma etching were that the etching gas was Ar; the pressure was 1.8 mTorr; and the input power was RF 50 W.

Under the above-mentioned conditions, the samples of the magneto-optical recording medium according to this invention were formed, by setting the film thicknesses of first dielectric layer 12, recording layer 13, second dielectric layer 15 and reflective layer 16, respectively, at 600 Å, 200 Å, 200 Å and 600 Å, and the film thickness of auxiliary recording layer 14 was changed according to various values, 0 Å, 5 Å, 10 Å, 15 521 , 20 Å, 25 Å, 30 Å, 35 Å, 40 Å, 45 Å and 50 Å, the magnetic field sensitivities of these samples were then examined. The above mentioned film thicknesses of auxiliary recording layer 14 were not actually measured values, but determined by previously measuring the deposition rate of auxiliary recording layer 14 and by calculating the sputtering time required for the respective film thicknesses. Further, the recording was made under the conditions that the linear recording velocity was 1.4 m/s; the recording frequency was 720 kHz; the recording power was 6.0 mW; and the modulated magnetic field was ±50 Oe.

Figure 2:
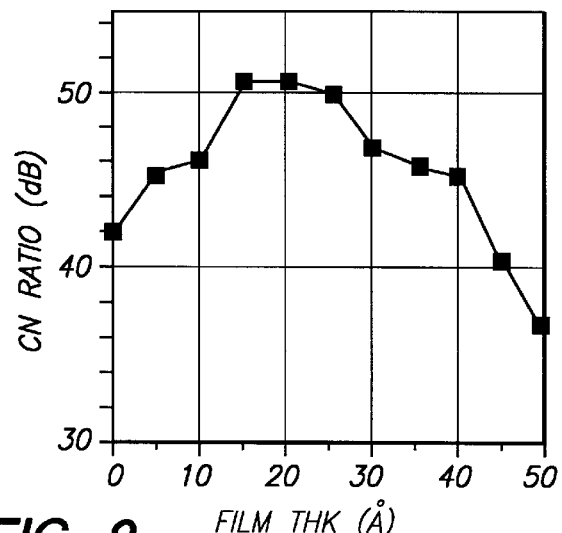
FIG. 2 is a characteristic graph showing the relationship between the film thickness of the auxiliary recording layer and the CN (carrier-to-noise) ratio in a first example of this invention.
Figure 3:
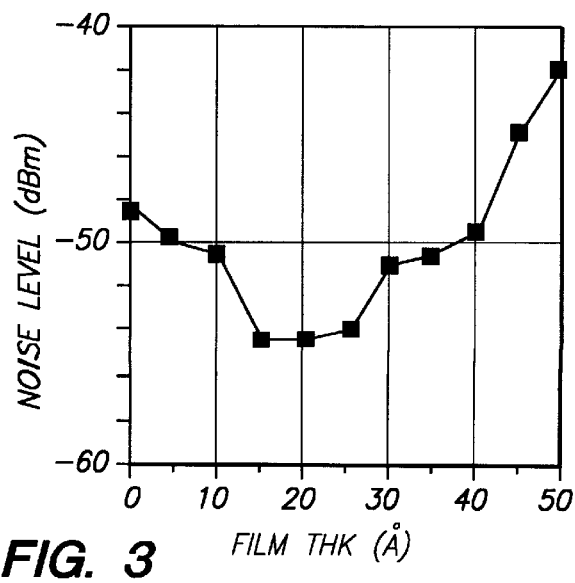
FIG. 3 is a characteristic graph showing the relationship between the film thickness and the noise level of the auxiliary recording layer in the first example of this invention.
Figure 4:
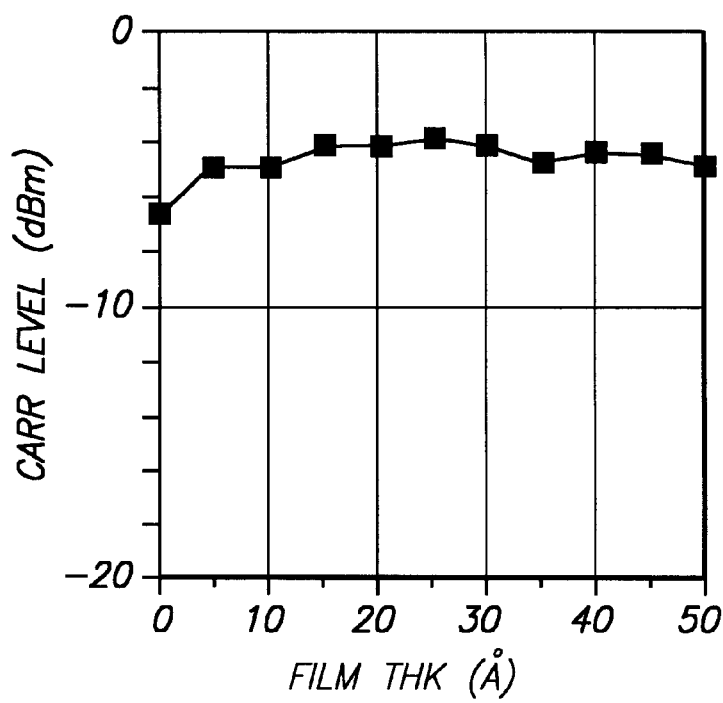
FIG. 4 is a characteristic graph showing the relationship between the film thickness and the carrier level of the auxiliary recording layer in the first example of this invention.

FIG. 2 shows the relationship between the film thickness of auxiliary recording layer 14 and the CN (carrier-to-noise) ratio. It is indicated that an excellent effect may be obtained by only forming auxiliary recording layer 14 as extremely thin as 5 Å. The CN ratio of recording by the modulated magnetic field of ±50 Oe is greatly dependent upon the thickness of auxiliary recording layer 14, and an excellent effect may be recognized in a range between the 5 Å and 40 Å. In particular, a very high CN ratio may be obtained near the range between the 15 Å and 25 Å. In the range of 45 Å or higher, the CN ratio decreases as the film thickness increases. Further, FIG. 3 shows the relationship between the film thickness and the noise level; and the FIG. 4 shows the relationship between the film thickness and the carrier level. It is understood that the change in the CN ratio depending on the film thickness shown in FIG. 2 is caused mainly by the change in the noise level shown in FIG. 3.

[EXAMPLE 2]

As the material of recording layer 13, a rare-earth transition-metal alloy having a composition of Nd 5.4 at%, Dy 15.7 at%, Tb 5.1 at%, Fe 58.5 at%, Co 15.3 at% was employed. The above-mentioned thin film was formed by magnetron DC sputtering employing a cast alloy target under the conditions that the argon pressure was 1.8 mTorr and the power was 300 W. Its Curie temperature was 180° C. As clearly understood from its composition, recording layer 13 by itself is provided with the magnetic characteristics wherein the transition metal sublattice magnetization is dominant at room temperature.

As the material of auxiliary recording layer 14, a rare-earth transition-metal alloy having a composition of Dy 29.8 at%, Fe 35.0 at%, Co 35.2 at%, was employed. This thin film was deposited by magnetron DC sputtering employing a cast alloy target under the conditions that the argon pressure was 0.4 mTorr and the power was 100 W. Its Curie temperature was 280° C. As clearly understood from its composition, this auxiliary recording layer 14 by itself is provided with the magnetic characteristics wherein the rare earth metal sub-lattice magnetization is dominant at room temperature.

To manufacture the magneto-optical recording medium, as shown in FIG. 1, first dielectric layer 12, recording layer 13, auxiliary recording layer 14, second dielectric layer 15 and reflective layer 16 were deposited in sequence on the surface of transparent substrate 11. AlSiN was employed as the material of first dielectric layer 12. The sputtering conditions were such that the sputtering gas was Ar 60%+$N_2$ 40%, the pressure was 1.7 mTorr, and the input power was RF 2500 W. An AlSi alloy was employed as the target. First dielectric layer 12 was not leveled. In other words, without any treatment after first dielectric layer 12 had been deposited, recording layer 13 was deposited on layer 12.

According to a previously patent application of the inventors herein, the conventional magneto-optical recording medium manufactured without leveling first dielectric layer 12 has low sensitivity to a magnetic field. Therefore, when employing a low magnetic field of about ±50 Oe, since the signal components (carrier) is considerably low in level although the noise is small, it is impossible to obtain a CN ratio high enough in practical use. The cause of this is that micro domains are generated in the recorded domains thus reducing the level of the net signal components, and this phenomenon has been confirmed by the same inventors by observing the domains employing a polarization microscope.

Under the above-mentioned conditions, the samples of the magneto-optical recording media according to this invention were formed, by setting the film thicknesses of first dielectric layer 12, recording layer 13, second dielectric layer 15 and reflective layer 16, respectively, at 600 Å, 200 Å, 200 Å and 600 Å, and by changing the film thickness of auxiliary recording layer 14 at regular intervals of 5 Å from 0 Å to 80 Å, and, then, the sensitivities of these samples to a modulated magnetic field are examined. The above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the linear recording velocity was 1.4 m/s; the recording frequency was 720 kHz; the recording power was 6.0 mW; and the modulated magnetic field was ±50 Oe.

Figure 5:
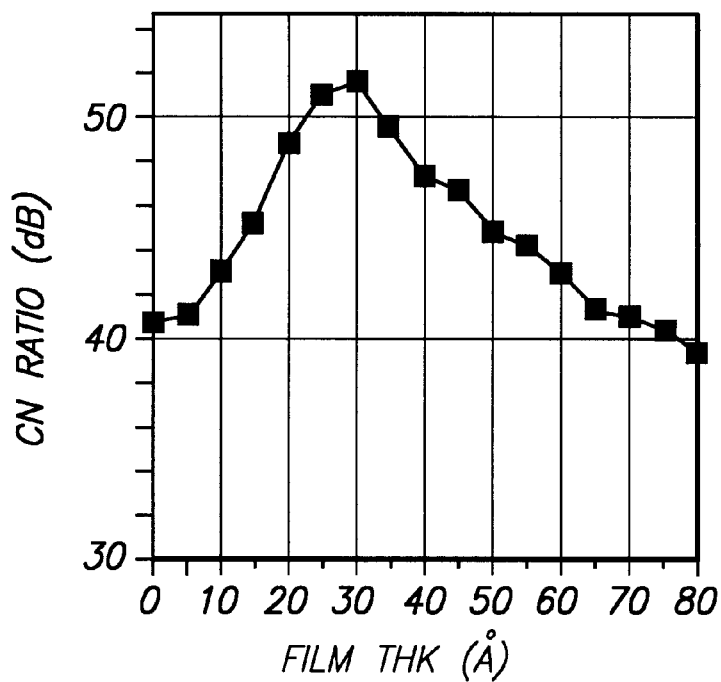
FIG. 5 is a characteristic graph showing the relationship between the film thickness and the CN ratio of the auxiliary recording layer in a second example of this invention.

FIG. 5 shows the relationship between the film thickness of auxiliary recording layer 14 and the CN ratio. FIG. 5 indicates that an excellent effect may be achieved by forming auxiliary recording layer 14 as an extremely thin layer, such as, 5 Å. The CN ratio of recording by the modulated magnetic field of ±50 Oe is greatly dependent upon the thickness of auxiliary recording layer 14, and an excellent effect may be recognized in a range between 5 Å and 70 Å. In particular, a very high CN ratio may be obtained roughly in the range between 20 Å and 35 Å.

Figure 6:
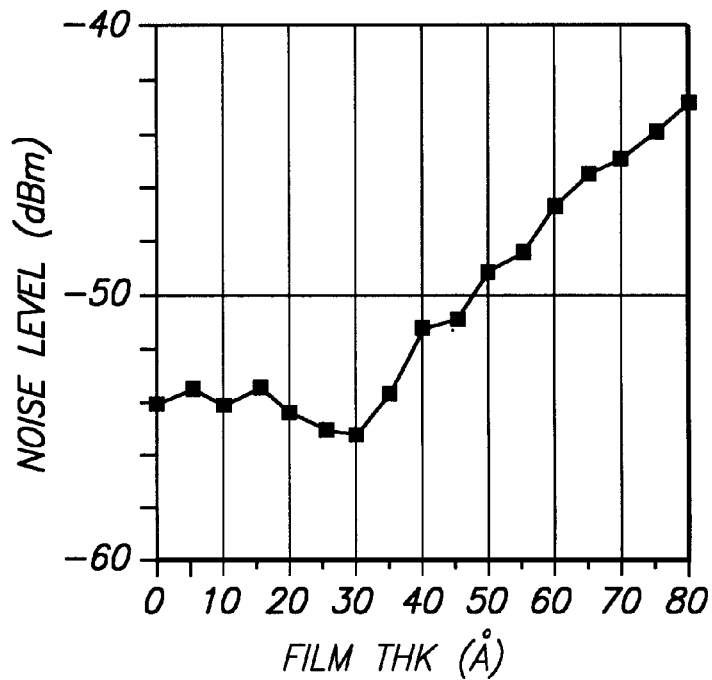
FIG. 6 is a characteristic graph showing the relationship between the film thickness and the noise level of the auxiliary recording layer in the second example of this invention.
Figure 7:
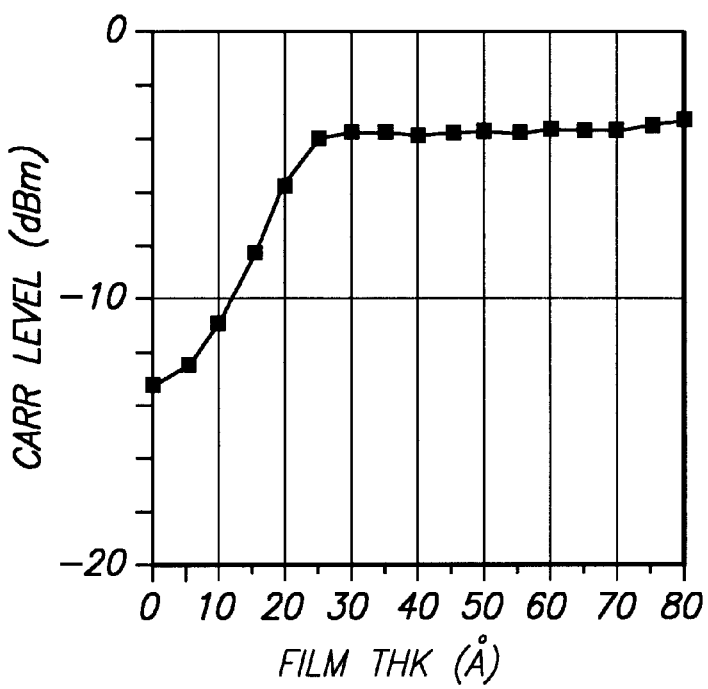
FIG. 7 is a characteristic graph showing the relationship between the film thickness and the carrier level of the auxiliary recording layer in the second example of this invention.

Further, FIG. 6 shows the relationship between the film thickness and the noise level; and the FIG. 7 shows the relationship between the film thickness and the carrier level. As shown in FIGS. 6 and 7, the carrier level and the noise level both change according to change of the film thickness. As the film thickness of auxiliary recording layer 14 increases, the noise level decreases gradually in a range between 5 Å and 30 Å, and increases sharply in a range beyond 35 Å. In contrast, the carrier level increases sharply as the film thickness of auxiliary recording layer 14 increases from 5 Å to 25 Å. However, the carrier level is saturated in a range beyond 25 Å. In particular, the very high CN ratio may be obtained roughly between 20 Å and 35 Å, because the noise level is sufficiently low and, in addition, the carrier level is saturated at a high level.

[EXAMPLE 3]

In the structure as shown in FIG. 1, a rare-earth transition-metal alloy having a composition of Nd 5.4 at%, Dy 15.7 at%, Tb 5.1 at%, Fe 58.5 at%, Co 15.3 at% was employed as the material of recording layer 13. This thin film was deposited by magnetron DC sputtering with the employment of a cast alloy target under the conditions that the argon pressure was 1.8 mTorr and the power was 300 W. Its Curie temperature was 180° C.

As the material of auxiliary recording layer 14, a rare-earth transition-metal alloy of Dy 30.8 at%, Fe 34.5 at%, Co 34.7 at% was employed. This thin film was formed by magnetron DC sputtering employing a cast alloy target under the conditions that the argon pressure was 3.5 mTorr and the power was 100 W. The Curie temperature was 250° C.

In the same way as with the case of Examples 1 and 2, the samples of the magneto-optical recording media having auxiliary recording layers 14 of different film thicknesses, were manufactured to investigate the change in magnetic field sensitivity. In the samples of which first dielectric layer 12 was leveled under the same condition as in Example 1, excellent results were achieved in the film thickness range between 5 Å and 70 Å. In particular, a very high CN ratio was obtained roughly in the range from 25 Å to 35 Å. In the other samples of which first dielectric layer 12 was not leveled, excellent results were obtained in the film thickness range between 5 Å and 90 Å. In particular, a very high CN ratio was achieved roughly in the range from 25 Å to 45 Å.

[EXAMPLE 4]

In the structure as shown in FIG. 1, a rare-earth transition-metal alloy of Nd 5.4 at%, Dy 15.7 at%, Tb 5.1 at%, Fe 58.5 at%, Co 15.3 at% was employed as the material of recording layer 13. This thin film was deposited by magnetron DC sputtering employing a cast alloy target under the conditions that the argon pressure was 1.8 mTorr and the power was 300 W. Its Curie temperature was 180° C.

As the material auxiliary recording layer 14, a rare-earth transition-metal alloy of Dy 30 at%, Fe (70−x) at%, Co (x) at% was employed. This thin film was deposited by x three-element, co-sputtering technique employing a Dy target, an Fe target, and a Co target. The film was deposited by magnetron sputtering under the conditions that the argon gas pressure was 0.4 mTorr. Its Curie temperature was from 150° C. to 280° C.

AlSiN was employed as the material of first dielectric layer 12. The sputtering conditions were such that the sputtering gas was Ar 60%+$N_2$ 40%, the pressure was 1.7 mTorr, and the input power was RF 2500 W. An AlSi alloy was employed as the target. First dielectric layer 12 was not leveled.

Under the above-mentioned conditions, the samples of the magneto-optical recording media according to this invention were manufactured by setting the film thicknesses of first dielectric layer 12, recording layer 13, second dielectric layer 15 and reflective layer 16, respectively, at 600 Å, 200 Å, 200 Å and 600 Å, and by changing the film thickness of auxiliary recording layer 14 at regular intervals of 5 Å from 0 Å to 80 Å, and the sensitivities of these samples to a modulated magnetic field were examined. The recording was made under the conditions that the linear recording velocity was 1.4 m/s; the recording frequency was 720 kHz; the recording power was 6.0 mW; and the modulated magnetic field was ±50 Oe. The investigation was effected to check whether there existed the samples of which magnetic field sensitivities were improved, in comparison with the sample having no auxiliary recording layer 14.

The examination results were as follows. When the Curie temperature of auxiliary recording layer 14 was equal to or lower than the Curie temperature of recording layer 13, the magnetic sensitivity was not improved. However, the magnetic sensitivity was slightly improved, when the Curie temperature of auxiliary recording layer 14 was higher than the Curie temperature of recording layer 13 but the difference between the two temperatures was lower than 10° K. In this case, the CN ratio was improved only by 2 dB when recorded at 50 Oe, in comparison with the sample having no auxiliary recording layer 14. Further, the magnetic sensitivity was remarkably improved when the Curie temperature of auxiliary recording layer 14 was higher than the Curie temperature of recording layer 13 and further the difference between the two temperatures was more than 10° K. In particular, when the difference between the two was more than 30° K, the CN ratio was saturated at as high a value as about 51 dB, when recorded at 50 Oe.

[EXAMPLE 5]

Figure 8:
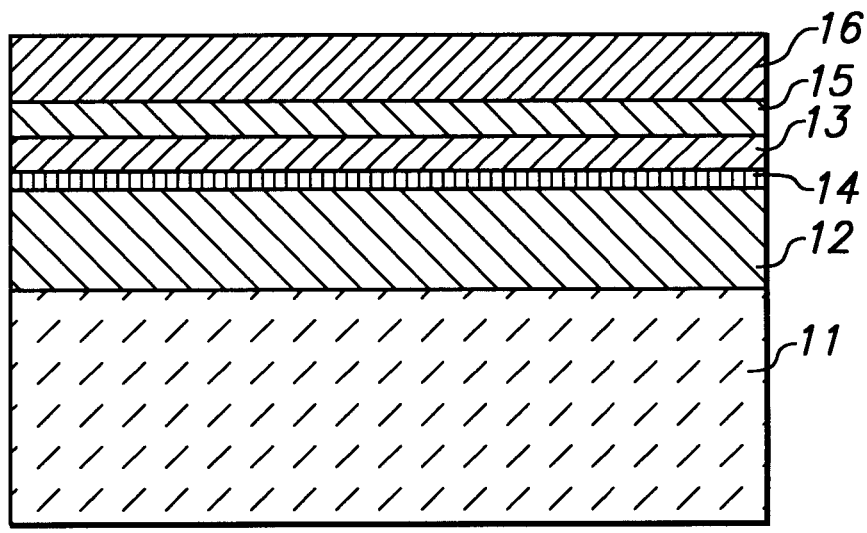
FIG. 8 is a cross-sectional view showing another example of the structure of the magneto-optical recording medium according to this invention.

In this example, the deposition sequence of recording layer 13 and auxiliary recording layer 15 was reversed from that of Examples 1 to 4. In other words, auxiliary recording layer 14 was first deposited and, thereafter, recording layer 13 was deposited. FIG. 8 shows the cross-section of this example.

As the material of recording layer 13, a rare-earth transition-metal alloy having a composition of Nd 5.4 at%, Dy 15.7 at%, Tb 5.1 at%, Fe 58.5 at%, Co 15.3 at% was employed. This thin film was deposited by magnetron DC sputtering employing a cast alloy target under the conditions that the argon pressure was 1.8 mTorr and the power was 300 W. Its Curie temperature was 180° C.

As the material of the auxiliary recording layer 14, a rare-earth transition-metal alloy having a composition of Dy 29.8 at%, Fe 35.0 at%, Co 35.2 at% was employed. This thin film was deposited by magnetron DC sputtering employing a cast alloy target under the conditions that the argon pressure was 0.4 mTorr and the power was 100 W. Its Curie temperature was 280° C.

To manufacture the magneto-optical recording medium as shown in FIG. 8, first dielectric layer 12, recording layer 13, auxiliary recording layer 14, second dielectric layer 15 and reflective layer 16 were deposited in sequence on the surface of transparent substrate 11. AlSiN was employed as the material of first dielectric layer 12. The sputtering conditions were such that the sputtering gas was Ar 60%+$N_2$ 40%, the pressure was 1.7 mTorr, and the input power was RF 2500 W. An AlSi alloy was employed as the target. In Example 5, first dielectric layer 12 was not leveled. In other words, without any treatment after first dielectric layer 12 had been formed, auxiliary recording layer 14 was deposited on layer 12.

Under the above-mentioned conditions, the samples of the magneto-optical recording media according to this invention were manufactured for investigation of the sensitivities to a modulated magnetic field, by setting the film thicknesses of first dielectric layer 12, recording layer 13, second dielectric layer 15 and reflective layer 16 at 600 Å, 200 Å, 200 Å and 600 Å, respectively, and by changing the film thickness of auxiliary recording layer 14 at regular intervals of 5 Å from 0 Å to 80 Å. The above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the linear recording velocity was 1.4 m/s; the recording frequency was 720 kHz; the recording power was 6.0 mW; and the modulated magnetic field was ±50 Oe.

As the results of the investigation, an effect was recognized when the film thickness of auxiliary recording layer 14 was between 5 Å and 70 Å. In particular, a CN ratio as high as about 51 dB was obtained roughly in the range from 20 Å to 35 Å.

[EXAMPLE 6]

Figure 9:
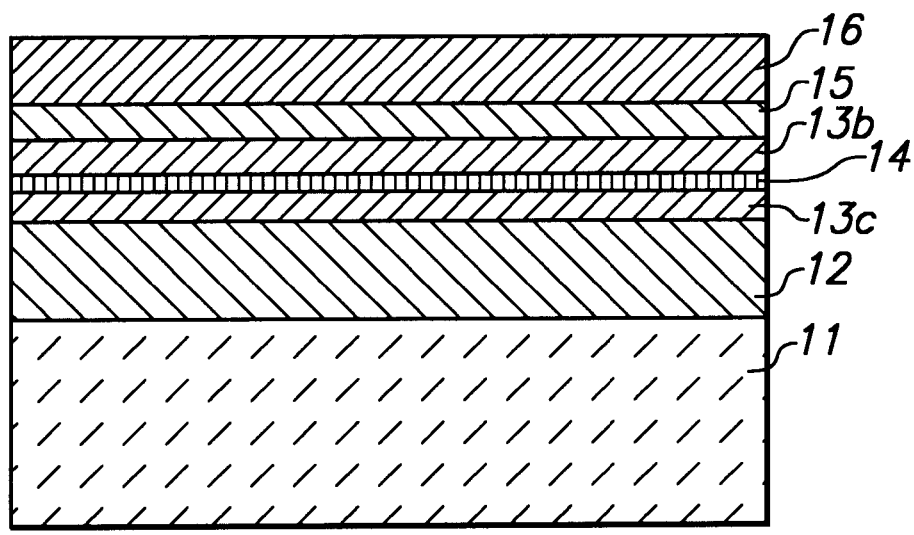
FIG. 9 is a cross-sectional view showing still another example of the structure of the magneto-optical recording medium according to this invention.

In this example, there was tried such a structure that auxiliary recording layer 14 was sandwiched between two recording layers 13. FIG. 9 shows the structure thereof.

As the material of the recording layers 13b and 13c, a rare-earth transition-metal alloy having a composition of Nd 5.4 at%, Dy 15.7 at%, Tb 5.1 at%, Fe 58.5 at%, Co 15.3 at% was employed. This thin film was deposited by magnetron DC sputtering employing a cast alloy target under the conditions that the argon pressure was 1.8 mTorr and the power was 300 W. The Curie temperature was 180° C.

As the material of the auxiliary recording layer 14, a rare-earth transition-metal alloy having a composition of Dy 29.8 at%, Fe 35.0 at%, Co 35.2 at% was employed. This thin film was formed by magnetron DC sputtering employing a cast alloy target under the conditions that the argon pressure was 0.4 mTorr and the power was 100 W. The Curie temperature was 280° C.

To manufacture the magneto-optical recording medium as shown in FIG. 9, first dielectric layer 12, the first recording layer 13b, the auxiliary recording layer 14, the second recording layer 13c, second dielectric layer 15 and reflective layer 16 were deposited in sequence on the surface of the transparent substrate 11. AlSiN was employed as the material of first dielectric layer 12. The sputtering conditions were such that the sputtering gas was Ar 60%+$N_2$ 40%, the pressure was 1.7 mTorr, and the input power was RF 2500 W. An AlSi alloy target was employed. The first dielectric layer 12 was not leveled. In other words, without any treatment after first dielectric layer 12 had been deposited, auxiliary recording layer 14 was formed on first dielectric layer 12.

Under the above-mentioned conditions, the samples of the magneto-optical recording media according to this invention were manufactured for investigation on the sensitivities to a modulated magnetic field, by setting the film thicknesses of first dielectric layer 12, first recording layer 13b, second recording layer 13c, second dielectric layer 15 and reflective layer 16 at 600 Å, 100 Å, 100 Å, 200 Å and 600 Å, respectively, and by changing the film thickness of auxiliary recording layer 14 at regular intervals of 5 Å from 0 Å to 80 Å. The above-mentioned film thicknesses of auxiliary recording layer 14 were not actually measured values, but determined by previously measuring the deposition rate of auxiliary recording layer 14 and by calculating the sputtering time required for the respective film thickness. The recording was made under the conditions that the linear recording velocity was 1.4 m/s; the recording frequency was 720 kHz; the recording power was 6.0 mW; and the modulated magnetic field was ±50 Oe.

An excellent effect was recognized in a range between the 5 Å and 70 Å. In particular, a CN ratio as high as about 51 dB may be obtained roughly in the range between the 20 Å and 35 Å.

The following basic results may be derived from the above-mentioned Examples: it is possible to markedly improve the magnetic field sensitivity of the magneto-optical recording medium. In other words, to enable the medium to record data even in a weak magnetic field, when the auxiliary recording layer with a Curie temperature $T_{C2}$ is laminated in contact with the recording layer with a Curie temperature $T_{C1}$ under the following conditions: (1) the thickness of the auxiliary recording layer is 70 Å or less, and (2) the relationship between the two Curie temperatures is as follows:

$$T_{C2}-T_{C1}>10° \text{ K}$$

(2) Considerations of Conditions and Functions Required for Auxiliary Recording Layer In the above-mentioned examples and other examples described later, the formation state of auxiliary recording layer 14 is represented quantitatively by use of a term such as "film thickness". Therefore, it may be regarded that auxiliary recording layer 14 may be formed with a layer of a uniform thickness. However, it should be noted that layer 14 as extremely thin as several tens Å may be scarcely formed uniformly, in practice. In general, at the very early stage of the thin film growth, a great number of nuclei composed of several to several tens of atoms are formed on the substrate. The formed nuclei are not stable and therefore often easily evaporated again. Further, a great number of stable nuclei are brought into contact with and integrated with one another into an island structure on the substrate. Here, "island structure" implies that the island-shaped aggregates of atoms are dispersed at intervals on the substrate. Here, when the aggregates further grow, the islands are connected to one another into a state where channels remain, further the channels are connected to one another into a state where holes remain, and further the channels are connected to one another into a continuous state.

The rare-earth transition-metal alloy employed for auxiliary recording layer 14 is of amorphous alloy. Although the amorphous thin film is slightly different from the crystalline alloy in the film growth manner, it is regarded that the amorphous thin film grows at the very early stage in almost the same way as with the case of the crystalline alloy; in other words, in accordance with the above-mentioned process. With respect to excellent results obtained by the thin films with a film thickness between 5 Å and 70 Å which was mentioned above, it is inferred that auxiliary recording layer 14 was of island structure, that is, of non-continuous state wherein gaps or channels remain. In the thin film of non-continuous status, the electric conductivity is very low. For experiment, an AlSiN thin film with a thickness of 600 Å was deposited on a Pyrex (Trademark) glass, and then a rare-earth transition-metal alloy film with a thickness of 5 Å to 70 Å was deposited on the AlSiN. It was confirmed that the electric conductivity of this thin film was very low. Consequently, it is possible to consider that there exists such a possibility that auxiliary recording layer 14 of non-continuous and nonuniform film as of island structure contributes to an improvement of the magnetic field sensitivity.

The structural differences between ultra-thin films as described above exert a large influence upon the magnetic characteristics of these magnetic films. Therefore, with the use of samples, the magnetic characteristics and the magneto-optical characteristics were both investigated as follows: An AlSiN thin film with a thickness of 100 Å was deposited on a Pyrex glass; various auxiliary recording layers 14 with different thicknesses of the same composition (DyFeCo) were deposited on the AlSiN film; another AlSiN thin film was deposited on auxiliary recording layer 14 for prevention from oxidation; and further an Al film of 600 Å was deposited thereon. In the case of the relatively thick DyFeCo film of 200 Å, the obtained results were the magnetic characteristics that the rare earth metal sublattice magnetization is dominant, wherein the coercivity was from 4 to 5 kOe at room temperature. On the other hand, in the case of the relatively thin DyFeCo film of 50 Å, the obtained results were the magnetic characteristics wherein the transition metal sublattice magnetization is dominant and the coercivity is about 1.8 kOe at room temperature. When the film thickness was further reduced to 30 Å, the obtained results were the magnetic characteristics wherein the transition metal sublattice magnetization is dominant and the coercivity is as small as 0.4 kOe at room temperature. However, when the film thickness is reduced less than 20 Å, the magnetic characteristics indicative of perpendicular magnetization anisotropy were not recognized. Further, when the test was made by increasing the temperature, the sample with a film thickness of 200 Å had a compensation temperature near 150° C., and the squareness of the Kerr hysteresis curve was excellent up to near the Curie temperature of about 280° C. In the case of the film thickness of 50 Å, the squareness of 1 was retained up to 200° C. At temperatures higher than 200° C., however, such a Kerr hysteresis curve as that of an in-plane magnetization film was recognized. In the case of the film thickness of 30 Å, the squareness of 1 was retained only up to 100° C. As described above, in the thin film with a thickness less than 100 Å, the temperature at which the coercivity, the compensation temperature and the temperature at which the squareness may be retained changes markedly according to the film thickness, irrespective of the composition of the film.

[Comparative Example 1]

In this comparative example, as the material of recording layer 13 of the structure as shown in FIG. 1, a rare-earth transition-metal alloy having a composition of Nd 5.4 at%, Dy 15.7 at%, Tb 5.1 at%, Fe 58.5 at%, Co 15.3 at% was employed, which is the same composition as with the case of Examples 1 and 2. This thin film was deposited by magnetron DC sputtering employing a cast alloy target under the conditions that the argon pressure was 1.8 mTorr and the power was 300 W. Its Curie temperature was 180° C. As clearly understood from its composition, this recording layer 13 by itself is provided with the magnetic characteristics wherein the transition metal sublattice magnetization is dominant at room temperature.

As the material of auxiliary recording layer 14, a rare-earth transition-metal alloy having a composition of Dy 16.2 at%, Fe 47.2 at%, Co 35.9 at% was employed. This thin film was formed by magnetron DC sputtering employing a cast alloy target under the conditions of argon pressure of 0.4 mTorr and power of 100 W. Its Curie temperature was 350° C. As clearly understood from its composition, this auxiliary recording layer 14 by itself is provided with the magnetic characteristics wherein the transition metal sublattice magnetization is dominant at room temperature.

To manufacture the magneto-optical recording medium as shown in FIG. 1, first dielectric layer 12, recording layer 13, auxiliary recording layer 14, second dielectric layer 15 and reflective layer 16 were deposited in sequence on the surface of the transparent substrate 11. AlSiN was employed as the material of first dielectric layer 12. The sputtering conditions were such that the sputtering gas was Ar 60%+$N_2$ 40%, the pressure was 1.7 mTorr, and the input power was RF 2500 W. An AlSi alloy target was employed. The first dielectric layer 12 was not leveled. In other words, without any treatment after first dielectric layer 12 had been deposited, recording layer 13 was deposited on the layer 12.

Under the above-mentioned conditions, the samples of the magneto-optical recording media were manufactured for investigation on the sensitivities to a modulated magnetic field, by setting the film thicknesses of first dielectric layer 12, recording layer 13, second dielectric layer 15 and reflective layer 16 at 600 Å, 200 Å, 200 Å and 600 Å, respectively, and by changing the film thickness of auxiliary recording layer 14 at regular intervals of 5 Å from 0 Å to 80 Å. The above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the linear recording velocity was 1.4 m/s; the recording frequency was 720 kHz; the recording power was 6.0 mW; and the modulated magnetic field was ±50 Oe.

Figure 10:
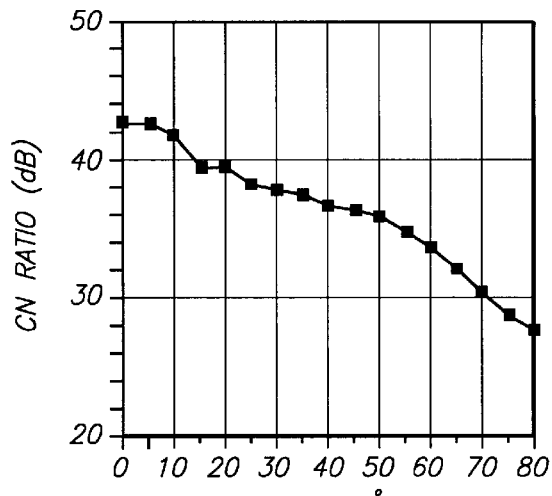
FIG. 10 is a characteristic graph showing the relationship between the film thickness and the CN ratio of the auxiliary recording layer in a first comparative example.
Figure 11:
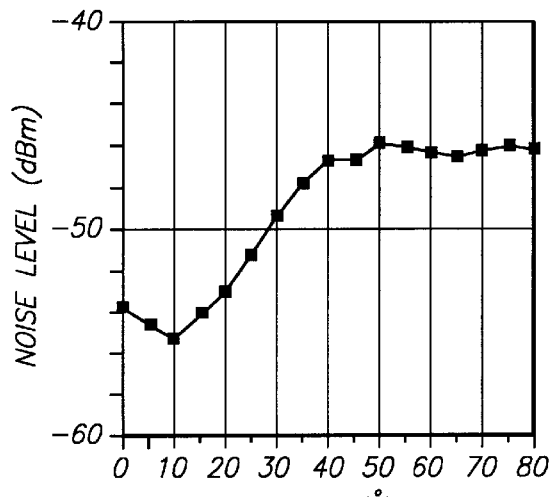
FIG. 11 is a characteristic graph showing the relationship between the film thickness and the noise level of the auxiliary recording layer in the first comparative example.
Figure 12:
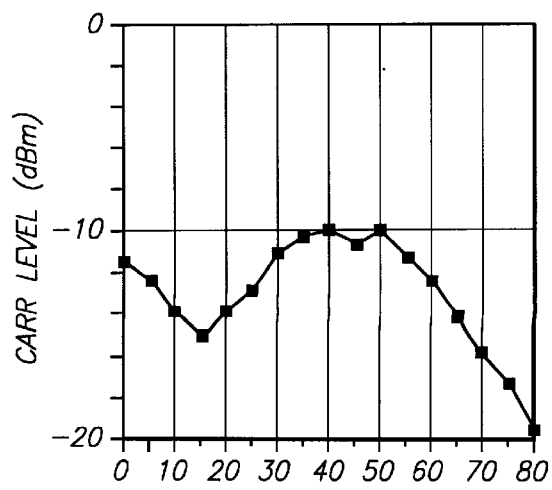
FIG. 12 is a characteristic graph showing the relationship between the film thickness and the carrier level of the auxiliary recording layer in the first comparative example.

FIG. 10 shows the relationship between the film thickness of auxiliary recording layer 14 and the CN (carrier-to-noise) ratio. FIG. 11 shows the relationship between the film thickness of auxiliary recording layer 14 and the noise level. FIG. 12 shows the relationship between the film thickness of auxiliary recording layer 14 and the carrier level. In the foregoing Examples 1 and 2, when the film thickness of auxiliary recording layer 14 is increased, the CN ratio changes in an angle-shape such that the CN ratio is once improved and then deteriorated. In comparison with this, in Comparative example 1, the CN ratio deteriorates monotonously with increasing film thickness of auxiliary recording layer 14. Further, the carrier level does not increase abruptly as in Example 2, even if the film thickness of auxiliary recording layer 14 is increased. In contrast with this, the CN ratio deteriorates monotonously, because the noise level increases abruptly.

Figure 13:
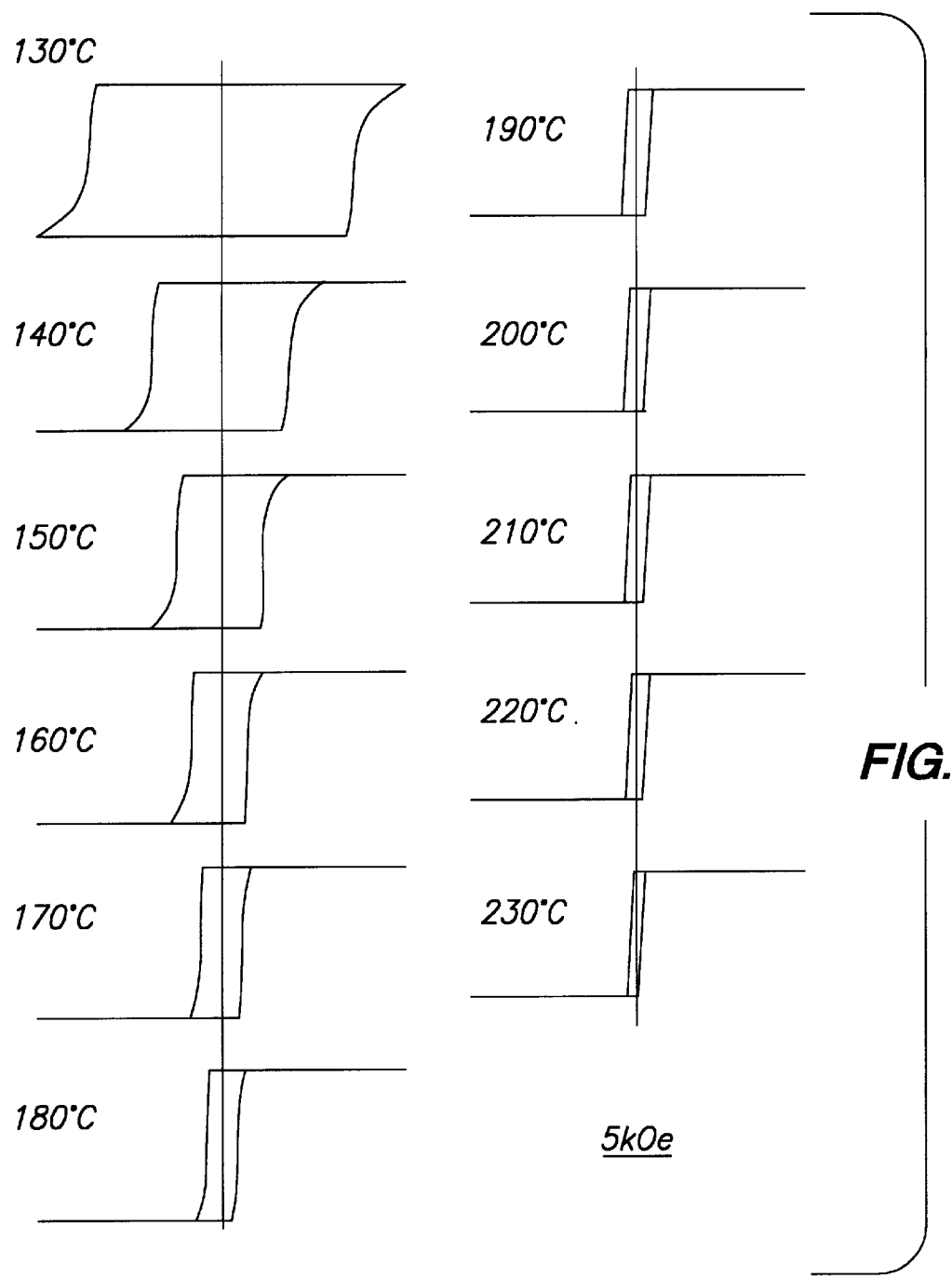
FIG. 13 is a temperature characteristic graph of the Kerr hysteresis curves of the magnetic film employed for the auxiliary recording layer in the first and second examples.
Figure 14:
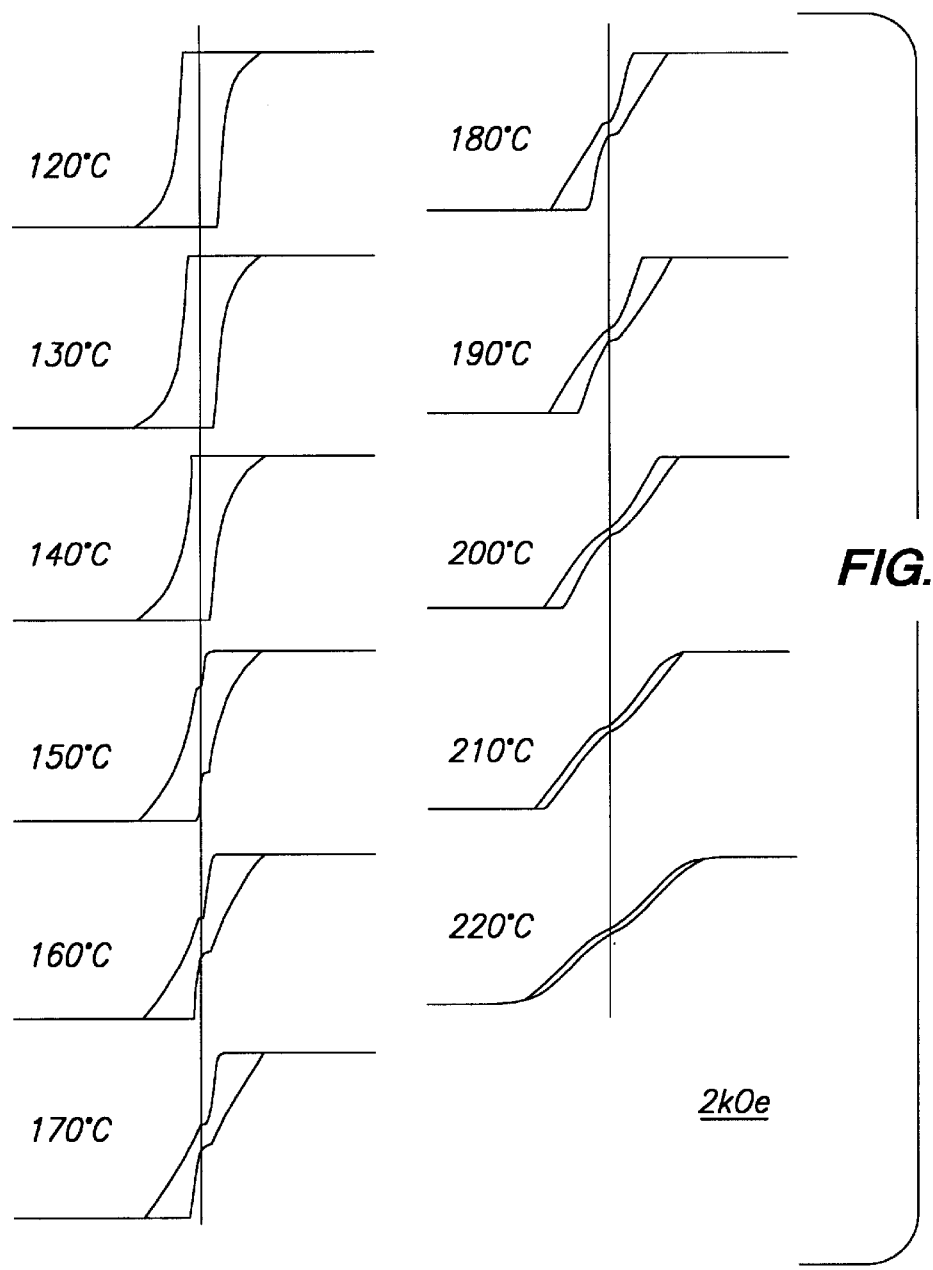
FIG. 14 is a temperature characteristic graph of the Kerr hysteresis curves of the magnetic film employed for the auxiliary recording layer in the first and second comparative examples.

The DyFeCo employed for auxiliary recording layer 14 of Comparative example 1 has the magnetic characteristics wherein the transition metal sublattice magnetization is dominant at room temperature. The coercivity thereof is about 3 kOe. Although the Curie temperature is as high as 350° C., the squareness is not excellent at high temperature. In other words, as shown in FIG. 14, the squareness ratio is reduced less than 1 at 150° C. In the cases of Examples 1 and 2, since the ratio of Dy to the composition DyFeCo employed for auxiliary recording layer 14 is as large as 29.8%, the squareness is excellent up to 220° C., as shown in FIG. 13. Further, the magnetic field required for saturation is small at temperature higher than 220° C. Here, the squareness ratio implies a value obtained by dividing the residual magnetization value by the saturation magnetization value. Alternatively, the value obtained by dividing the residual Kerr rotation by the saturation Kerr rotation may be employed. In the composition employed for auxiliary recording layer 14 of Comparative example 1, the squareness of auxiliary recording layer 14 is already deteriorated markedly at Curie temperature 180° C. of recording layer 13, so that the squareness ratio is 0.07. In contrast with this, in the composition employed for auxiliary recording layer 14 in the foregoing Examples, the squareness of auxiliary recording layer 14 is retained at 1 at Curie temperature 180° C. of recording layer 13, so that the squareness ratio is excellent. Accordingly, it is required for the composition of auxiliary recording layer 14 that not only the Curie temperature thereof is higher than that of recording layer 13 but also the squareness thereof is excellent near the Curie temperature of recording layer 13.

Figure 15:
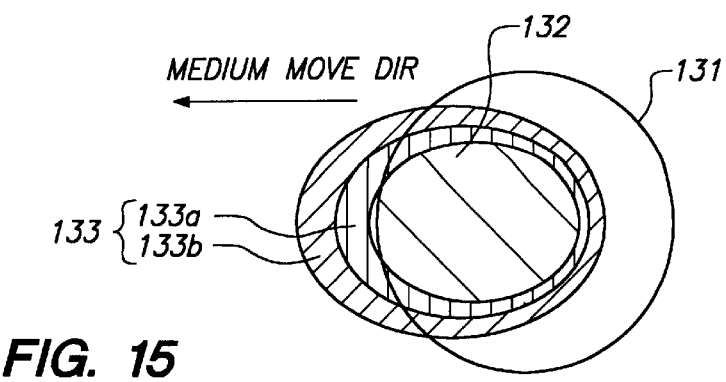
FIG. 15 is an illustration for assistance in explaining the status wherein the magneto-optical recording medium is irradiated with a beam spot.

The reason why the recording characteristics to the recording magnetic field may be improved, when an ultrathin perpendicular magnetization film having a squareness excellent at temperature near the Curie temperature of recording layer 13 is employed for auxiliary recording layer 14, may be inferred as follows:

When the magneto-optical recording medium is irradiated with a beam spot 131 obtained by converging a laser light as shown in FIG. 15, since the medium is locally heated, the medium may be roughly classified into three regions of a region 132 heated beyond the Curie temperature, a region 133, referred to as a domain forming zone), heated below the Curie temperature but above the temperature at which the domain walls are fixed, where changes occur when a modulated magnetic field is applied, and the third region heated below the temperature at which the domain wall is fixed, where no change occurs even when a modulated magnetic field is applied. It is estimated that the width of domain forming zone 133 is about 1 $\mu$m and the temperature difference therein is from 10° C. to 15° C. In the case of the thermo-magnetic recording, the domains are recorded by the interaction between the magnetic film and the applied magnetic field in domain forming zone 133. In the case of the magnetic field modulation recording, the magnetic field sensitivity is decided by the width and the magnetic characteristics, such as, magnetization, perpendicular anisotropy energy, etc., of domain forming zone 133. In consideration of the recording process, a simplified model is often employed such that the recording is made at "Curie temperature". In consideration of such a delicate problem as the magnetic field sensitivity, however, a model such that the recording is made in "temperature range corresponding to domain forming zone 133" should be employed.

The Kerr hysteresis curve of the single-layer NdDyTbFeCo film wherein the transition metal sublattice magnetization is dominant, deteriorates in squareness near the Curie temperature. In this case, although the saturation occurs at a relatively small magnetic field, the residual Kerr rotation is roughly zero. In other words, the squareness of the Kerr hysteresis curve is roughly zero. This is because maze domains are generated when the applied magnetic field reaches zero. When the underlayer is not treated by the RF plasma etching before the magnetic layer is deposited thereon, extremely minute maze domains are generated. It is regarded that the micro domains, which are developed in the recorded domains when a single-layer magnetic film is recorded by a small modulated magnetic field, are result of freeze of the maze domains. This is explained in more detail with reference to FIG. 15 as follows:

(1) Minute maze domains are generated at high temperature portion 133a, very close to the Curie temperature, in domain forming zone 133.

(2) At low temperature portion 133b of domain forming zone 133, since the magnetization, the perpendicular anisotropy energy and the exchange stiffness constant are large in comparison with those at high temperature portion 133a, the magneto-static energy between the applied magnetic field and the spontaneous magnetization, or the domain wall energy density is large. Accordingly, the maze domains change to a single-domain magnetized in the direction of the applied magnetic field. In this case, the domain walls must move so that the maze domains once generated change to the single-domain. At low temperature portion 133b, however, since the frictional force is large and prevents the domain walls from moving, a large magnetic field is required to change the maze domains to the single-domain.

(3) When the temperature further drops out of domain forming zone 133, the above-mentioned frictional force further increases and thereby the movement of the domain walls stop, with the result that the domains will not change. Where the modulated magnetic field is small, the recorded domains are fixed without perfectly eliminating the maze domains, that is, the maze domains are frozen and thus remain in the recorded domains as the micro domains.

Here, in the rare-earth transition-metal amorphous alloy film, the frictional force against the domain wall movement is a source of the coercivity and is very essential and indispensable nature in order to fix the domain wall at any desired positions, without limitation due to the magnetic field and impurity distribution. However, on the other hand, this essential nature is one of causes of deteriorating the magnetic field sensitivity as described above.

As already described, when recorded by a small magnetic field, the micro domains are generated and thereby the carrier level is inevitably lowered. In order to improve the magnetic field sensitivity by suppressing the generation of the micro domains within the recorded domains, it is effective to prevent the generation of the maze domains, in particular the minute maze domains, and further to reduce the frictional force which prevents the movement of the domain walls at domain forming zones 133.

As one of the method of realizing both of the above-mentioned effects, there is a method of applying the RF plasma etching treatment on the dielectric layer before the magnetic layer is formed. By this etching treatment, the domain width may be widened, and the temperature range wherein the domain walls may be moved spreads to the lower temperature side. Therefore, if such an effect that the width of the maze domains may be widened to roughly the same degree as that of the recorded domains is obtained by the etching treatment, it is possible to consider that this method is sufficient as the countermeasures against the micro domains. Therefore, the effect of the etching treatment upon the magnetic field sensitivity was examined. As a result, the CN ratio was improved at such a small modulated magnetic field as 50 Oe to 100 Oe with increasing etching time. Further, owing to the etching treatment, the carrier level was saturated even by a small magnetic field. However, this effect was reduced half due to a rise in the noise level. Therefore, the recorded domains were observed, and it was found that although the micro domains within the recorded domains were extinguished, the outline of the recorded domains were not uniform. In other words, the reason why the noise rises due to the etching treatment was that the recorded domains was not uniform in shape.

If so, what is changed due to the etching treatment? Dose the change in the width of the maze domains cause an easy movement of the magnetic walls? Here, if the Kittel's theory of strip domains may be applied to the rare-earth transition-metal amorphous film, the width W of the maze domains may be given by the following formula:

$$W = (\pi/4M_s) \cdot (\sigma_w \cdot D/C)^{1/2}, \text{ where}$$

Ms is the spontaneous magnetization, σw is the domain wall energy density, D is the film thickness, and C is a constant.

The qualitative meaning of the above formula indicates that when the spontaneous magnetization Ms increases, the width W of the domain decreases to decrease the magneto-static energy to the demagnetization field; and when the domain wall energy density σw increases, the width W of the domain increases to decrease the area of the domain walls. Further, it is understood that the phenomenon that the width of the domains increases due to the etching treatment is caused by a reduction of difference between the maximum value and the minimum value in fluctuation of the domain wall energy density σw. Since the domain wall is to be generated near the minimum point of the domain wall energy density, the fact that the domain wall energy density is averaged and thereby the difference between the maximum value and the minimum value thereof is reduced, causes a substantial rise in the domain wall energy density σw, so that the domain width W increases in accordance with the above-mentioned formula. Further, it is possible to explain that the phenomenon of the easy movement of the domain wall by the etching treatment results from the reduction of the width in fluctuation of the domain wall energy density σw, that is, the reduction of potential peak to be passed over during the domain wall movement. In other words, it is possible to say that the frictional force which prevents the domain wall movement may be reduced by the etching treatment. In practice, the coercivity may be reduced half by the etching treatment.

When the domain wall energy density increases and further the domain wall movement may be facilitated as described above, what happens during the magnetic field modulation recording? When the intensity of the modulated magnetic field is small, the domain wall energy density cannot be disregarded in comparison with the magnetostatic energy term. Here, if the recorded domains are accurately shaped the temperature distribution, the shape of the recorded domains must be crescent shape. However, the rear end portions, or the sharp ends thereof, of the crescent-shaped or arrow shaped domain are unstable in shape from the standpoint of domain wall energy density. Rather, the domain wall energy density is stable when the rear end portions are rounded into an oval shape. Therefore, in the state where the domain wall energy density is large and the domain wall may be moved easily, a force is generated in the domain walls to reduce and to minimize the domain wall energy density in the recording domain, so that the shape of the domains is changed into a more stable shape. This indicates that it is difficult to obtain crescent-shaped domains correctly shaped correctly to the temperature distribution, with the result that domain deformed into non-uniform shape, like a rounded crescent-shaped domain, is recorded. Consequently, the noise increases. As described above, it is understood that a rise in noise due to the etching treatment is a phenomenon caused due to the deterioration of "the frictional force against the domain wall movement", which is a very essential and indispensable nature in the rare-earth transition-metal amorphous alloy film.

Here, the countermeasures for suppressing the micro domains are summarized as follows:

(1) The generation of maze domains, in particular minute maze domains must be prevented, and (2) The frictional force preventing the domain wall movement in domain forming zone 133 must be reduced.

However, the etching treatment, which is effective to both the countermeasures, has not been so far sufficiently successful. Therefore, priority must be given to "the prevention of the maze domain generation" over "the reduction of the frictional force against the domain wall movement".

The generation of the maze domains relates closely to the squareness of the magnetic layer. In the case where the squareness does not deteriorate at high temperature, the width of the maze domains is extremely large, so that there exists the case where only the single-domain state may be observed. In the case of the rare-earth transition-metal alloy having a large content ratio of the rare earth metal, since the squareness is kept in an excellent condition at high temperature, it is regarded that the maze domains may be suppressed even at high temperature. In the case of DyFeCo, for instance, when the ratio of Dy is more than 20 at%, the width of the maze domains increases; and further when more than 25 at%, the single-domain state sometimes develops. However, in the case of the medium manufactured by a single-layer film of the composition having a large content ratio of the rare earth metal, a satisfied CN ratio has not so far been obtained in the magnetic field modulation recording. In this connection, when recording under the optimum conditions was applied to the single-layer film having a thickness of 200 Å and formed of the same composition as with the case of auxiliary recording layer 14 of Examples 1 and 2, the obtained CN ratio was as low as 46 dB. On the other hand, in the case where the composition was employed as same as recording layer 13 of Examples 1 and 2, 53 dB was obtained. Therefore, it is considered that the single-layer film formed of composition containing much rare earth metal is not practical.

However, as represented by Examples 1 and 2, in the case of employing the two-layer structure composed of recording layer 13 and auxiliary recording layer 14 which is formed of the composition whose Curie temperature is higher than that of recording layer 13 and which is excellent in the squareness at the temperature near the Curie temperature of recording layer 13, it is possible to improve the squareness of the Kerr hysteresis curve near the Curie temperature. Further, such effect is obtained that the domain width of the maze domains observed near the Curie temperature increases and the maze domains change into the single-domain state. This phenomenon may be due to the fact that the perpendicular anisotropy energy Ku at high temperature portion 133a of domain forming zone 133 increases by the presence of auxiliary recording layer 14 and thereby the domain wall energy density σw increases. Further, as described later, it is important that the spontaneous magnetization Ms is reduced so that the demagnetizing field is decreased.

The reason why the magnetic sensitivity may be improved when adopting the two-layer structure having both recording layer 13 and auxiliary recording layer 14 as already described, will be further considered later. The dependency of the recording characteristics at a weak magnetic field upon the film thickness of auxiliary recording layer 14, may be represented by an angle-shaped curve as typically shown in FIGS. 2 and 5. In the range less than the optimum film thickness (the peak of the angle-shaped curve), the carrier level increases sharply with increasing film thickness, and the noise level decreases gradually with increasing film thickness. In the range more than the optimum film thickness, the carrier level is saturated without change, but the noise level increases sharply. The reason why the carrier level increases with increasing film thickness of auxiliary recording layer 14 has already been explained. In other words, since the domain wall energy density σw increases by the presence of auxiliary recording layer 14, the generation of the minute maze domains is suppressed and thereby the micro domains in the recorded domains are eliminated, with the result that the carrier level is increased.

On the other hand, the explanation of change in the noise level is rather complicated. First, the phenomenon that the noise level increases sharply when the film thickness exceeds the optimum value, is very similar to the phenomenon that the noise level rises when the RF plasma etching treatment has been applied, in view of the results of the recording domain observation or the dependency of the recording characteristics upon the intensity of the modulated magnetic field. When the recorded domains has been observed in the two-layer structure having auxiliary recording layer 14 thicker than the optimum film thickness, it was confirmed that the rear ends of the crescent-shaped domain are not shaped sharply but deformed into the rounded-shape, so that the noise level increases. This may be due to the fact that the contribution of the domain wall energy density to the domain formation increases due to increases of Ku and σw, so that the movement of the domain wall occurs in the direction so that the domain wall areas decrease, in the same way as with the case of the RF plasma etching treatment. Even if Ku and σw increase, if the frictional force against the movement of the domain wall is large, the domain will not be deformed easily. Consequently, there exists a large possibility that an addition of auxiliary recording layer 14 has such an additional effect as to facilitate the movement of the domain walls. The most interesting point of the two-layer structure according to this invention is such a phenomenon that the noise level decreases gradually with increasing film thickness of auxiliary recording layer 14 in the range less than the optimum film thickness. Why does not the noise level increase as with the case of the RF etching treatment but rather decrease in spite of the fact that Ku and σw both increase? Further, why the deformation of the crescent-shaped domains occur so as to decrease the domain wall areas?

The formation process of the recorded domains in the two-layer structure will now be described with reference to FIG. 15.

(1) At high temperature portion 133a of the domain forming zone, i.e., at a temperature just below the Curie temperature of recording layer 13, since the spontaneous magnetization of recording layer 13 is very small, auxiliary recording layer 14 higher in Curie temperature exerts a greater influence upon the formation of the domains. Due to auxiliary recording layer 14, the effect of increasing Ku and σw and the effect of facilitating the movement of the domain walls are both dominant, so that even in a weak magnetic field the generation of the minute maze domains is suppresses.

(2) At low temperature portion 133b of the domain forming zone, the spontaneous magnetization of recording layer 13 is restored. Since the film thickness of recording layer 13 is about ten times thicker than that of auxiliary recording layer 14, when the spontaneous magnetization of recording layer 13 is restored, the influence of recording layer 13 upon the domain formation increases. In other words, such characteristics become dominant that the maze domains are easily generated but the frictional force of preventing the movement of the domain walls is large. If the medium were kept for a long time at this temperature, the maze domains would be generated. In the actual recording process, however, the recording medium is cooled quickly. In this case, at high temperature portion 133a of the domain forming zone, the maze domains are suppressed and rather the internal portion in the recording domain becomes the single-domain state, as already explained. Therefore, at low temperature portion 133b of the domain forming zone, the maze domains are not generated but rather the frictional force for preventing the movement of the domain walls retains the single-domain state, so that the domains are fixed in the crescent-shape faithfully shaped to the temperature distribution. In other words, the rear portions of the crescent-shaped domains are formed sharply.

As described above, auxiliary recording layer 14 is dominant at high temperature portion 133a of domain forming zone 133 (at the initial stage of domain formation), and recording layer 13 is dominant at the low temperature portion 133b of domain forming zone 133 (for deciding the shape of the domain), so that it is possible to conclude that both the suppression of the maze domains and the sharp and stable recording of the crescent-shaped domains can coexist with each other. The effects obtained by the two-layer magnetic film are related to the realization of two recording phases by the respective layers in domain forming zone 133. When the film thickness of auxiliary recording layer 14 is thinner than the optimum film thickness, the temperature range wherein recording layer 13 is dominant is supposed to be broad in domain forming zone 133, and when the film thickness of auxiliary recording layer 14 is thicker than the optimum film thickness, the temperature range wherein auxiliary recording layer 14 is dominant is supposed to be broad in domain forming zone 133. Accordingly, when auxiliary recording layer 14 is excessively thick, since auxiliary recording layer 14 is dominant in the major part of domain forming zone 133, it is possible to explain that the characteristics of auxiliary recording layer 14 (an increase in Ku or σw, a decrease in the frictional force against the domain wall movement, etc.) exert influences upon the recording, with the result that the noise level increases. Domain forming zone 133 is as small a range as 10° C. to 15° C. in temperature range. The magnetic field sensitivity may be improved under the conditions that the temperature range at which auxiliary recording layer 14 is dominant and the temperature range at which recording layer 13 is dominant can coexist well in the small temperature range. The above-mentioned consideration allows us to understand that the magnetic field sensitivity changes very sensitively to the film thickness of auxiliary recording layer 14.

The case where, as with the case of Comparative example 1, auxiliary recording layer 14 is formed on recording layer 13, and squareness ratio of auxiliary layer 14 is small at the Curie temperature of recording layer 13, will now be described.

Even in the Comparative Example, since the Curie temperature of auxiliary recording layer 14 is higher than that of recording layer 13, it is possible to select the film thickness of auxiliary recording layer so as to satisfy the conditions that both of the temperature ranges at which auxiliary recording layer 14 is dominant and at which recording layer 13 is dominant, can coexist. However, as depicted in FIG. 14, the composition of auxiliary recording layer 14 of the Comparative example 1 is fairly inferior to the other Examples in the squareness at high temperature, for instance as low as 0.07 at the Curie temperature 180° C. of recording layer 13. At this temperature, the domains of the single layer film composed of this composition were observed by an optical microscope. In the observation, maze domains too minute to be resolved by the optical microscope were recognized. Further, a magnetic field of 1.7 kOe was required during the observation to obtain an single-domain state wherein the domains were arranged in the same direction. In other words, in the magnetic film of this composition (Comparative Example), stable and minute maze domains are generated at the Curie temperature 180° C. of recording layer 13. In the case where the magnetic film of the characteristics as described above is employed for auxiliary recording layer 14, since auxiliary recording layer 14 is dominant in the domain formation at high temperature portion 133a of the domain forming zone, it is impossible to prevent the maze domains from being generated. On the contrary, the maze domains difficult to arrange in the same direction are generated. As described above, the magnetic field sensitivity was deteriorated in the case of the composition of auxiliary recording layer 14 of Comparative Example 1.

Therefore, it is preferable to select the composition of auxiliary recording layer 14 on the basis of the point of whether the maze domain generation may be promoted or suppressed in the vicinity of at the Curie temperature of recording layer 13. In this case, a composition having the effect of suppressing the generation of the maze domains must be of course selected. In this selection, the superiority and the inferiority of the squareness of the hysteresis curve of the composition may be employed as the practical selecting criterion. The effect of suppressing the maze domain generation increases when the squareness of the composition is excellent, that is, when the squareness thereof reaches 1. In other words, the composition having the squareness of roughly 1 may be considered as being preferable as the composition of auxiliary recording layer 14.

One of the characteristic features of the two-layer structure according to this invention is to use an ultra-thin rare-earth transition-metal amorphous alloy film, such as 70 Å or less, as auxiliary recording layer 14. As already explained, the examination results of the characteristics of the ultra-thin rare-earth transition-metal amorphous alloy layer are as follows:

(1) Even in the case of a composition wherein the rare earth metal sublattice magnetization is dominant when the film thickness is about 200 Å, the Kerr hysteresis wherein the transition metal sublattice magnetization is dominant, is obtained when the film thickness is as extremely thin as being less than 70 Å.

(2) When the film thickness is as extremely thin as being less than 70 Å, a difference in the Kerr rotation is large between the calculated value and the actual value; and when the film thickness is less than 20 Å, the characteristics as the perpendicular magnetization film cannot be recognized.

(3) When the film thickness is less than 70 Å, the coercivity is small.

(4) The thinner the film thickness, the more the feature of perpendicular anisotropy (the squareness of nearly 1) decreases at a lower temperature.

As the causes of the above-mentioned phenomena, the following possibilities may be considered:

(a) Influences of the magnetic characteristics in the vicinity of the interface between the magnetic film and the dielectric layers:

Since exchange-coupled atom pairs decrease at this interface, the magnetic characteristics at this interface are different from those of the interior of the magnetic film. To explain on the basis of the mean-field theory, the mean-field is decreased, so that a region susceptible to thermal vibration exists near this interface. Since the rare earth metal atoms are susceptible to the thermal vibration, the compensation temperature decreases down to room temperature and as a result, a Kerr hysteresis wherein the transition metal sublattice magnetization is dominant, is obtained.

(b) Mixing of dielectric atoms into magnetic film:

In the sputtering technique, the kinetic energy of the atoms reaching the substrate is large as compared with the case of the evaporation technique. As a result, different atoms are mixed near this interface, so that there exists a possibility that there are regions wherein the composition of the magnetic layer is mixed with the composition of the dielectric material so that the magnetic characteristics are deteriorated.

(c) Super-paramagnetism:

As already explained, the thin film with a thickness of about several tens Å is not of uniform layer but of island structure. In other words, the thin film structure is of two-dimensional aggregate structure of minute particles, rather than a thin film structure. Under these conditions, super-paramagnetism is developed, so that the spontaneous magnetization of the respective minute particles are in random directions due to thermal vibration, and that the spontaneous magnetization is deteriorated as a whole. The above mentioned features from (2) to (4) of the ultra-thin RE-TM film may be explained on the basis of this super-paramagnetism effect.

When the ultra-thin rare-earth transition-metal amorphous alloy film is formed into a single layer, it is considered that the above-mentioned "change in the magnetic characteristics" occurs. However, when the ultra-thin film or auxiliary recording layer 14, is magnetically coupled with recording layer 13, the situation ought to be different. The "change in the magnetic characteristics" will not occur in the ultra-thin auxiliary recording layer 14 due to the exchange-coupling with recording layer 13 at least up to the Curie temperature $T_{C1}$ of recording layer 13. However, above the Curie temperature $T_{C1}$, since recording layer 13 behaves as a mere paramagnetic metal, the "change in the magnetic characteristics" of the ultra-thin auxiliary recording layer 14 may become noticeable. In the case where the upper limit of the temperature at which the single layer of auxiliary recording layer 14 is kept as the perpendicular magnetization film is lower than the Curie temperature $T_{C1}$ of recording layer 13, even in the two-layer structure, the perpendicular spontaneous magnetization of auxiliary recording layer 14 is disabled at the temperature higher than the Curie temperature $T_{C1}$ of recording layer 13, thus taking no part in the domain formation. For the reasons as described above, even in the case of adopting auxiliary recording layer 14 having the Curie temperature $T_{C2}$ higher than the Curie temperature $T_{C1}$ of recording layer 13, since the temperature corresponding to domain forming zone 133 is kept neat the $T_{C1}$ without rising up to the $T_{C2}$. Therefore, both of regions where auxiliary recording layer 14 is dominant and where recording layer 13 is dominant can coexist in domain forming zone 133, as already explained.

When the thickness of auxiliary recording layer 14 is considerably large, since the "change in the magnetic characteristics" of auxiliary recording layer 14 will not occur noticeably at the temperature higher than the Curie temperature $T_{C1}$ of recording layer 13, the temperature corresponding to domain forming zone 133 rises up to the temperature $T_{C2}$. Under these conditions, since the domain formation is mainly subjected to only auxiliary recording layer 14, the effect of the two layer lamination cannot be obtained. In other words, the recording is made in accordance with such process that data are first recorded in auxiliary recording layer 14 at the temperature higher than the Curie temperature $T_{C1}$ of recording layer 13, and then the recorded data are transferred to recording layer 13 when the temperature drops down to the $T_{C1}$ of recording layer 13. Conventionally, the two-layer structures such that two layers of different Curie temperatures are laminated have been so far proposed. In these conventional two-layer structures, however, the recording may be divided into two of the first process of "recording is first made to the layer of higher Curie temperature" and the second process of "the recorded domains are then transferred to the layer of lower Curie temperature", which is referred to as transfer method. In this conventional transfer method, it is impossible to improve the sensitivity to the magnetic field in essence. This is because the formation of the recorded domains and the state of the micro domains are both decided by the first process wherein recording is made to the layer of higher Curie temperature. In the second process, on the other hand, the recorded domains are simply transferred to the layer of lower Curie temperature, with the result that the magnetic field sensitivity of the two-layer structure based upon the transfer method is decided by only the magnetic field sensitivity of the magnetic film having higher Curie temperature. Consequently, in the conventional two-layer structure of transfer method, it is possible to obtain characteristics superior to the magnetic field sensitivity of a single-layer of the magnetic film having lower Curie temperature, but it is impossible to obtain characteristics superior to the magnetic field sensitivity of a single-layer of the magnetic film having higher Curie temperature.

In contrast with this, in the magneto-optical recording medium of the two-layer structure including an ultra-thin film according to this invention, it is possible to improve the magnetic field sensitivity beyond that obtained from a single-layer structure of the respective layer. In this case, only when the layer of higher Curie temperature is formed as the ultra-thin film of 70 Å or less, both of the regions where auxiliary recording layer 14 is dominant and where recording layer 13 is dominant can coexist in domain forming zone 133, as already explained, so that the magnetic field sensitivity may be improved. As understood above, the fact that auxiliary recording layer 14 is extremely thin is an indispensable condition for the two-layer structure of this invention.

(3) Examples Related to Rare Earth Metal Content and Squareness Desirable for Auxiliary Recording Layer

[EXAMPLE 7]

In the same structure as shown in FIG. 1, as the material of recording layer 13, a rare-earth transition-metal alloy having a composition of Nd 5.4 at%, Dy 15.7 at%, Tb 5.1 at%, Fe 58.5 at%, Co 15.3 at% was employed. This thin film was formed by magnetron DC sputtering employing a cast alloy target under the conditions that the argon pressure was 1.8 mTorr and the power was 300 W. The Curie temperature was 180° C.

Further, as the material of auxiliary recording layer 14, rare-earth transition-metal alloys wherein the rare earth metal ratios were modified were employed. These thin films were deposited by magnetron DC sputtering employing a cast alloy target under the conditions that the argon pressure was 0.4 mTorr and the power was 100 W. The film thickness of auxiliary recording layer 14 was changed from 0 Å to 50 Å in a pitch of 5 Å.

With respect to the samples of the magneto-optical recording media manufactured as described above, the change in magnetic field sensitivity was examined under the conditions that the linear recording velocity was 1.4 m/s; the recording frequency was 720 kHz; the recording power was 6.0 mW; and the modulated magnetic field was ±50 Oe. Table 1 lists the respective composition of each auxiliary recording layer 14, the squareness ratios of each auxiliary recording layer 14 at the Curie temperature 180° C. of recording layer 13, the optimum thickness of each auxiliary recording layer 14, and the CN ratio at the optimum film thickness. With respect to the compositions where the CN ratio decreases monotonously with increasing film thickness of auxiliary recording layer 14, the CN ratio was measured employing a sample having auxiliary recording layer 14 with a thickness of 20 Å. The squareness ratio was determined by measuring the Kerr hysteresis curve of a single-layer with a thickness of 200 Å which was manufactured by the same composition as auxiliary recording layer 14.

Table 1 indicates that it is preferable to form auxiliary recording layer 14 of the composition higher in content ratio of rare earth metal. Since the CN ratio of recording layer 13 of the single-layer structure is 41 dB, advantage was recognized when the content ratio of the rare earth metal in the composition of auxiliary recording layer 14 is more than 18 at% and less than 50 at%. Further, the preferable range thereof is more than 20 at% and less than 45 at%, and more preferable range thereof is more than 25 at% and less than 45 at%. Further, advantage was recognized when the squareness ratio is more than 0.3. The preferable squareness ratio is more than 0.7 and the more preferable squareness ratio is more than 0.95.

TABLE 1

| COMPOSITION | SQ R | THK(Å) | CNR(dB) |
|---|---|---|---|
| Dy 8.5 at% • Fe 63.0 at% • Co 28.5 at% | 0.0 | 20 | 20.6 |
| Dy 13.5 at% • Fe 56.4 at% • Co 30.1 at% | 0.02 | 20 | 25.9 |
| Dy 13.7 at% • Fe 53.8 at% • Co 32.5 at% | 0.02 | 20 | 26.7 |
| Dy 15.2 at% • Fe 56.2 at% • Co 28.6 at% | 0.04 | 20 | 35.9 |
| Dy 15.3 at% • Fe 50.5 at% • Co 34.2 at% | 0.06 | 20 | 38.6 |
| Dy 16.2 at% • Fe 47.2 at% • Co 35.9 at% | 0.07 | 20 | 39.5 |
| Dy 17.3 at% • Fe 53.8 at% • Co 28.9 at% | 0.15 | 20 | 40.9 |
| Dy 18.6 at% • Fe 50.2 at% • Co 31.2 at% | 0.30 | 20 | 42.1 |
| Dy 19.2 at% • Fe 50.2 at% • Co 30.6 at% | 0.42 | 35 | 43.2 |
| Dy 19.9 at% • Fe 50.5 at% • Co 29.6 at% | 0.53 | 40 | 43.9 |
| Dy 20.9 at% • Fe 47.6 at% • Co 31.5 at% | 0.65 | 35 | 45.1 |
| Dy 21.4 at% • Fe 46.0 at% • Co 32.6 at% | 0.70 | 35 | 47.5 |
| Dy 22.3 at% • Fe 43.8 at% • Co 33.9 at% | 0.80 | 35 | 48.5 |
| Dy 23.5 at% • Fe 43.8 at% • Co 32.7 at% | 0.95 | 35 | 49.6 |
| Dy 24.3 at% • Fe 39.2 at% • Co 36.5 at% | 0.95 | 30 | 49.5 |
| Dy 25.6 at% • Fe 39.0 at% • Co 35.4 at% | 0.98 | 30 | 49.8 |
| DY 26.3 at% • Fe 41.1 at% • Co 32.6 at% | 0.98 | 30 | 50.4 |
| Dy 28.1 at% • Fe 35.4 at% • Co 36.5 at% | 1.0 | 25 | 51.3 |
| Dy 29.8 at% • Fe 38.0 at% • Co 35.2 at% | 1.0 | 25 | 51.6 |
| Dy 33.6 at% • Fe 29.5 at% • Co 36.9 at% | 1.0 | 25 | 51.4 |
| Dy 37.9 at% • Fe 24.5 at% • Co 37.6 at% | 1.0 | 25 | 51.7 |
| Dy 40.2 at% • Fe 20.7 at% • Co 39.1 at% | 0.85 | 30 | 51.1 |
| Dy 45.6 at% • Fe 13.7 at% • Co 40.7 at% | 0.08 | 30 | 48.9 |
| Dy 50.6 at% • Fe 5.5 at% • Co 43.9 at% | 0.42 | 20 | 45.3 |

[EXAMPLE 8]

In the same structure as shown in FIG. 1, as the material of recording layer 13, a rare-earth transition-metal alloy having a composition of Tb 21.0 at%, Fe 75.0 at%, Co 4.0 at% was employed. This thin film was deposited by magnetron DC sputtering employing a cast alloy target under the conditions that the argon pressure was 1.8 mTorr and the power was 300 W. Its Curie temperature was 140° C.

Further, as the material of auxiliary recording layer 14, rare-earth transition-metal alloys wherein the content ratios of the rare earth were modified were employed. These thin films were deposited by magnetron DC sputtering employing a cast alloy target under the conditions that the argon pressure was 0.4 mTorr and the power was 100 W.

With respect to the samples of the magneto-optical recording media manufactured as described above, the change in magnetic field sensitivity was examined under the conditions that the linear recording velocity was 1.4 m/s; the recording frequency was 720 kHz; the recording power was 5.0 mW; and the modulated magnetic field was ±50 Oe. Table 2 lists the respective composition of each of auxiliary recording layer 14, the squareness ratio of each auxiliary recording layer 14 at the Curie temperature 140° C. of recording layer 13, the optimum thickness of each auxiliary recording layer 14, and the CN ratios at each optimum film thickness. With respect to the compositions where the CN ratio decreases monotonously with increasing film thickness of auxiliary recording layer 14, the CN ratio was measured employing a sample having auxiliary recording layer 14 with a thickness of 20 Å. The squareness ratio was determined by measuring the Kerr hysteresis curve of a single-layer with a thickness of 200 Å which was manufactured by the same composition as auxiliary recording layer 14.

Table 2 indicates that it is preferable to form auxiliary recording layer 14 of the composition higher in the content ratio of rare earth metal. In other words, good results were recognized when the ratio of the rare earth metal in the composition of auxiliary recording layer 14 is more than 15 at% and less than 50 at%. Further, the preferable range thereof is more than 18 at% and less than 45 at%, and more preferable range thereof is more than 23 at% and less than 45 at%. Further, good results were was recognized when the squareness ratio is more than 0.3. The preferable squareness ratio is more than 0.7 and the more preferable squareness ratio is more than 0.95. In the case of the composition Dy 16.2 at%, Fe 47.2 at%, Co 35.9 at% employed for auxiliary recording layer 14 of Comparative example 1, the magnetic field sensitivity was deteriorated when auxiliary recording layer 14 was laminated on recording layer 13 having the Curie temperature of 180° C., but improved when deposited on recording layer 13 having the Curie temperature of 140° C. As described above, the composition desired for auxiliary recording layer 14 changes according to the Curie temperature of recording layer 13. On the other hand, since the squareness ratio desired for auxiliary recording layer 14 at the Curie temperature of recording layer 13 does not change, the squareness ratio may be employed as an index for selecting the composition required for auxiliary recording layer 14.

TABLE 2

| COMPOSITION | SQ R | THK(Å) | CNR(dB) |
|---|---|---|---|
| Dy 8.5 at% • Fe 63.0 at% • Co 28.5 at% | 0.05 | 20 | 34.5 |
| Dy 13.5 at% • Fe 56.4 at% • Co 30.1 at% | 0.07 | 20 | 38.5 |
| Dy 13.7 at% • Fe 53.8 at% • Co 32.5 at% | 0.12 | 20 | 40.1 |
| Dy 15.2 at% • Fe 56.2 at% • Co 28.6 at% | 0.31 | 30 | 42.3 |
| Dy 15.3 at% • Fe 50.5 at% • Co 34.2 at% | 0.68 | 35 | 43.4 |
| Dy 16.2 at% • Fe 47.2 at% • Co 35.9 at% | 0.95 | 40 | 47.1 |
| Dy 17.3 at% • Fe 53.8 at% • Co 28.9 at% | 1.0 | 30 | 48.6 |
| Dy 18.6 at% • Fe 50.2 at% • Co 31.2 at% | 1.0 | 30 | 48.6 |
| Dy 19.2 at% • Fe 50.2 at% • Co 30.6 at% | 1.0 | 30 | 48.6 |
| Dy 19.9 at% • Fe 50.5 at% • Co 29.6 at% | 1.0 | 30 | 49.4 |
| Dy 20.9 at% • Fe 47.6 at% • Co 31.5 at% | 1.0 | 30 | 49.3 |
| Dy 21.4 at% • Fe 46.0 at% • Co 32.6 at% | 1.0 | 30 | 50.1 |
| Dy 22.3 at% • Fe 43.8 at% • Co 33.9 at% | 1.0 | 30 | 50.1 |
| Dy 23.5 at% • Fe 43.8 at% • Co 32.7 at% | 1.0 | 30 | 49.6 |
| Dy 24.3 at% • Fe 39.2 at% • Co 36.5 at% | 1.0 | 30 | 50.1 |
| Dy 25.6 at% • Fe 39.0 at% • Co 35.4 at% | 1.0 | 30 | 50.3 |
| Dy 26.3 at% • Fe 41.1 at% • Co 32.6 at% | 1.0 | 25 | 50.1 |
| Dy 28.1 at% • Fe 35.4 at% • Co 36.5 at% | 1.0 | 25 | 50.7 |
| Dy 29.8 at% • Fe 38.0 at% • Co 35.2 at% | 1.0 | 25 | 50.6 |
| Dy 33.6 at% • Fe 29.5 at% • Co 36.9 at% | 1.0 | 20 | 49.5 |
| Dy 37.9 at% • Fe 24.5 at% • Co 37.6 at% | 0.95 | 20 | 49.8 |
| Dy 40.2 at% • Fe 20.7 at% • Co 39.1 at% | 0.82 | 15 | 49.6 |
| Dy 45.6 at% • Fe 13.7 at% • Co 40.7 at% | 0.71 | 20 | 46.3 |
| Dy 50.6 at% • Fe 5.5 at% • Co 43.9 at% | 0.31 | 20 | 44.1 |

Examples 7 and 8 indicate that it is possible to improve the magnetic field sensitivity markedly and thereby to enable recording in a weak magnetic field, as far as the Curie temperature $T_{C2}$ of auxiliary recording layer 14 is higher than that $T_{C1}$ of recording layer 13; the film thickness of auxiliary recording layer 14 is 70 Å or less; and further the squareness ratio of auxiliary recording layer 14 is more than 0.3 or preferably more than 0.7 at the Curie temperature $T_{C1}$.

(4) Examples Related to Desired Difference in Composition Between Recording Layer and Auxiliary Recording Layer As already explained, in formation of the two-layer structure, it is the essential condition that auxiliary recording layer 14 is an ultra-thin film. Further, it is possible to obtain more excellent magnetic field sensitivity characteristics when recording layer 13 and auxiliary recording layer 14 can satisfy the following magnetic characteristics:

(1) The Curie temperature $T_{C2}$ of auxiliary recording layer 14 is higher than the Curie temperature $T_{C1}$ of recording layer 13.

(2) At the Curie temperature $T_{C1}$ of recording layer 13, the squareness of auxiliary recording layer 14 is excellent.

The Curie temperature and the squareness ratio of auxiliary recording layer 14 change according to the film thickness thereof, as already explained. In the following description, however, the Curie temperature $T_{C2}$ and the squareness ratio of auxiliary recording layer 14 designate the characteristics obtained when the film thickness thereof is considerably thick, as far as not being specified.

As one of the methods of heightening the Curie temperature $T_{C2}$ in relation to Section (1) above, it is possible to increase the content ratio of Gd or Tb in the rare earth metals in the composition of auxiliary recording layer 14 more than that of recording layer 13. In comparison of GdFeCo, TbFeCo and DyFeCo of the same Co ratio, the Curie temperature of GdFeCo is the highest; that of TbFeCo is the medium; and that of DyFeCo is the lowest. In other words, it is possible to heighten the Curie temperature easily by increasing Gd or Tb ratio in the rare earth metals. It is of course effective to increase both the Gd and Tb ratios simultaneously. Further, at the same time, it is possible to obtain such an effect as to improve the squareness of auxiliary recording layer 14 in relation to Item (2) above. The rare earth metal sublattice constituted by rare earth metal atoms is susceptible to the influence of thermal vibration. By nature, since the perpendicular magnetization anisotropy of the rare-earth transition-metal amorphous alloy film results from the very large magnetic anisotropy of the rare earth metal atoms, the perpendicular magnetization anisotropy deteriorates with decreasing magnetization of the rare earth metal sublattice caused by the influence of the thermal vibration at high temperature, that is, the squareness is degraded. Further, when the magnetization of the rare earth metal sublattice decreases at high temperature, since the whole magnetization is increased, the squareness is deteriorated. In order to obtain an excellent squareness at high temperature, it is effective to increase the ratio of the rare earth metal in the alloy or to use an alloy containing much rare earth metal Gd or Tb which is large in magnetization even at high temperature. When the ratio of the rare earth metal is increased in the alloy, the Curie temperature thereof is decreased. However, when the ratio of the Gd or Tb in the rare earth metals is increased, it is possible to heighten the Curie temperature thereof and further to improve the squareness thereof at high temperature, both effectively.

Further, in order to heighten the Curie temperature as described in Section (1) above, it is also effective to increase the content ratio of Co the transition metals in the composition of auxiliary recording layer 14 more than that of recording layer 13. When combined with the above-mentioned increase in ratio of Gd or Tb in the rare earth metals, it is possible to satisfy both the requirements of higher Curie temperature and excellent squareness at high temperature simultaneously.

Alternatively, it is also effective to heighten the Curie temperature and to improve the squareness simultaneously at high temperature, by decreasing the content ratio of light rare earth metal Sm, Nd, Pr in the rare earth metals in the composition of auxiliary recording layer 14 less than that of recording layer 13.

In the following examples, the influence upon the magnetic field sensitivity was examined by changing the composition as explained above.

[EXAMPLE 9]

In this example, the content ratio of Gd or Tb in the rare earth metals was changed for both recording layer 13 and auxiliary recording layer 14 in the structure as shown in FIG. 1.

Table 3 lists the results obtained when DyFeCo is employed for recording layer 13 and GdDyFeCo is employed for auxiliary recording layer 14. In the remaining tables and the following description of the alloy composition, only a numerical value indicative of content ratio (at%) of each element is added after each element symbol, without displaying unit of "at%".

TABLE 3

| | COMPOSITION | CUR.TEMP | CHG IN CN |
|---|---|---|---|
| REC LAY | Dy 22 • Fe 64 • Co 14 | 180° C. | — |
| SEC REC LAY | (Gd 10 • Dy 90)22 • Fe 64 • Co 14 | 190° C. | 1.5 dB |
| | (Gd 20 • Dy 80)22 • Fe 64 • Co 14 | 205° C. | 3.0 dB |
| | (Gd 30 • Dy 70)22 • Fe 64 • Co 14 | 215° C. | 4.0 dB |
| | (Gd 40 • Dy 60)22 • Fe 64 • Co 14 | 230° C. | 6.5 dB |
| | (Gd 50 • Dy 50)22 • Fe 64 • Co 14 | 240° C. | 10.5 dB |
| | (Gd 60 • Dy 40)22 • Fe 64 • Co 14 | 255° C. | 11.0 dB |
| | (Gd 70 • Dy 30)22 • Fe 64 • Co 14 | 270° C. | 10.0 dB |
| | (Gd 80 • Dy 20)22 • Fe 64 • Co 14 | 285° C. | 10.0 dB |
| | (Gd 90 • Dy 10)22 • Fe 64 • Co 14 | 295° C. | 9.5 dB |
| | Gd 22 • Fe 64 • Co 14 | 305° C. | 9.0 dB |

Auxiliary recording layer 14 was deposited by magnetron DC co-sputtering employing an FeCo alloy target, a Gd target and a Dy target. The argon pressure in the sputtering was 0.4 mTorr. The ratio of the rare earth metal to the transition metal and the ratio of Fe to Co in the transition metal were both kept at constant values, while only the ratios of Dy and Gd in the rare earth metals were changed. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å.

Table 3 lists the "change in CN ratio" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity.

As understood by Table 3, the Curie temperature increases by replacing a part of Dy with Gd in the composition of auxiliary recording layer 14, so that the CN ratio at the modulated magnetic field ±50 Oe may be improved. The squareness of auxiliary recording layer 14 at the Curie temperature 180° C. of recording layer 13 may be improved increasingly with increasing amount of replacement of Dy with Gd. In particular, the squareness may be improved remarkably when Dy is replaced with Gd of 30 at% or more. Further, when the composition wherein Dy is replaced with Gd of 80 at% or more is employed for auxiliary recording layer 14, it is recognized that the noise level increases slightly, so that the CN ratio decreases slightly.

Table 4 lists the results of the samples wherein DyFeCo is employed for recording layer 13 and TbDyFeCo is employed for auxiliary recording layer 14.

TABLE 4

| | COMPOSITION | CUR.TEMP | CHG IN CN |
|---|---|---|---|
| REC LAY | Dy 22 • Fe 64 • Co 14 | 180° C. | — |
| SEC REC LAY | (Gd 20 • Dy 80)22 • Fe 64 • Co 14 | 190° C. | 1.5 dB |
| | (Gd 40 • Dy 60)22 • Fe 64 • Co 14 | 200° C. | 4.5 dB |
| | (Gd 60 • Dy 40)22 • Fe 64 • Co 14 | 215° C. | 5.5 dB |
| | (Gd 80 • Dy 20)22 • Fe 64 • Co 14 | 230° C. | 7.5 dB |
| | Dy 22 • Fe 64 • Co 14 | 245° C. | 9.5 dB |

Auxiliary recording layer 14 was deposited by magnetron DC co-sputtering employing an FeCo alloy target, a Tb target and a Dy target. The argon pressure in the sputtering was 0.4 mTorr. The ratio of the rare earth metals to the transition metals and the ratios of Fe and Co in the transition metals were both kept at constant values, while only the ratios of Dy and Tb in the rare earth metals were changed. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å.

Table 4 lists the "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity.

Although not so remarkable as with the case of the replacement of Dy with Gd, even when replaced with Tb, Table 4 indicates that the Curie temperature increased and the squareness of auxiliary recording layer 14 at the Curie temperature of recording layer 13 was improved. As listed in Table 4, the CN ratio in the modulated magnetic field ±50 Oe was improved increasingly with increasing amount of replacement of the Dy with Tb. Further, in the case of the replacement with Tb, an increase in noise level as with the case of Gd was not recognized.

Table 5 lists the results of the samples wherein TbFeCo was employed for recording layer 13 and GdTbFeCo was employed for auxiliary recording layer 14.

TABLE 5

| | COMPOSITION | CUR.TEMP | CHG IN CN |
|---|---|---|---|
| REC LAY | Tb 22 • Fe 69 • Co 9 | 180° C. | — |
| SEC REC LAY | (Gd 20 • Tb 80)22 • Fe 69 • Co 9 | 200° C. | 1.5 dB |
| | (Gd 40 • Tb 60)22 • Fe 69 • Co 9 | 220° C. | 3.0 dB |
| | (Gd 60 • Tb 40)22 • Fe 69 • Co 9 | 240° C. | 4.0 dB |
| | (Gd 80 • Tb 20)22 • Fe 69 • Co 9 | 260° C. | 6.5 dB |
| | Gd 22 • Fe 69 • Co 9 | 280° C. | 6.5 dB |
| COMP | Dy 22 • Fe 69 • Co 9 | 130° C. | -0.5 dB |
| SEC REC LAY | (Dy 80 • Tb 20)22 • Fe 69 • Co 9 | 145° C. | -0.5 dB |
| | (Dy 40 • Tb 60)22 • Fe 69 • Co 9 | 160° C. | 0.0 dB |

Auxiliary recording layer 14 was deposited by magnetron DC co-sputtering employing an FeCo alloy target, a Gd target and a Tb target. The argon pressure in the sputtering was 0.4 mTorr. The ratio of the rare earth metals to the transition metals and the ratios of Fe and Co in the transition metals were both kept at constant values, while only the ratios of Tb and Dy in the rare earth metals were changed. Further, TbDyFeCo was employed for auxiliary recording layer 14 as the comparative examples. In these comparative examples, the ratio of the rare earth metals to the transition metals and the ratios of Fe and Co in the transition metals were both kept at constant values, while only the ratios of Tb and Gd in the rare earth metals were changed. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±0 Oe. The film thickness of auxiliary recording layer 14 was changed at a pitch of 5 Å between 5 Å and 50 Å. Table 5 lists "change in CN" obtained by subtracting the CN ratio of the magneto-optical recording medium having no auxiliary recording layer 14 from the CN ratio of the recording medium having auxiliary recording layer of which film thickness was most suitable for the highest magnetic field sensitivity. With respect to comparative examples, Table 5 lists the CN ratio obtained when the film thickness of auxiliary recording layer 14 was 25 Å.

As understood by Table 5, in comparison with the composition of recording layer 13, when the ratio of Gd in the rare earth metals of auxiliary recording layer 14 was increased, it is recognized that the Curie temperature increased and further the squareness at the Curie temperature of recording layer 13 was also improved. Further, it was obtained such results that the CN ratio in the modulated magnetic field of ±50 Oe was improved with increasing ratio of Gd in the rare earth metal of auxiliary recording layer 14. In contrast with this, in the comparative examples, it is recognized that the Curie temperature decreased with increasing ration of Dy in the rare earth metal of auxiliary recording layer 14, without increasing the CN ratio.

Further, the test was made of the case where GdTdDyFeCo was employed for auxiliary recording layer 14. When the ratio of Gd or Tb in the rare earth metal of auxiliary recording layer 14 was increased in comparison with the composition of recording layer 13, it was recognized that the Curie temperature was increased and the squareness at the Curie temperature of recording layer 13 was improved. Further, it was obtained such results that the CN ratio at the modulated magnetic field of ±50 Oe was improved with increasing ratio of Gd or Th in the rare earth metal of auxiliary recording layer 14.

[EXAMPLE 10]

In this example, in the composition of auxiliary recording layer 14 shown in FIG. 1, the content ratios of Fe and Co in the transition metals and the content ratio of the rare earth metals to the transition metals of auxiliary recording layer 14 were changed, in comparison with the composition of recording layer 13.

First, Table 6 lists the results obtained when DyFeCo is employed both for recording layer 13 and auxiliary recording layer 14, wherein the content ratio of the rare earth metal Dy and the content ratio of Co in the transition metals are higher in auxiliary recording layer 14 than in recording layer 13.

TABLE 6

| | COMPOSITION | CUR.TEMP | CHG IN CN |
|---|---|---|---|
| REC LAY | Dy 22 • (Fe 82 • Co 18)78 | 180° C. | — |
| COMP | Dy 16 • (Fe 50 • Co 50)84 | 350° C. | -2.5 dB |
| SEC REC LAY | Dy 18 • (Fe 50 • Co 50)82 | 340° C. | -1.0 dB |
| | Dy 20 • (Fe 50 • Co 50)80 | 330° C. | 0.0 dB |
| SEC REC LAY | Dy 22 • (Fe 50 • Co 50)78 | 320° C. | 2.0 dB |
| | Dy 24 • (Fe 50 • Co 50)76 | 310° C. | 4.5 dB |
| | Dy 26 • (Fe 50 • Co 50)74 | 300° C. | 8.0 dB |
| | Dy 28 • (Fe 50 • Co 56)72 | 290° C. | 11.0 dB |
| | Dy 30 • (Fe 50 • Co 50)70 | 280° C. | 11.0 dB |
| | Dy 32 • (Fe 50 • Co 50)68 | 270° C. | 10.5 dB |
| | Dy 34 • (Fe 50 • Co 50)66 | 255° C. | 10.5 dB |
| | Dy 36 • (Fe 50 • Co 50)64 | 230° C. | 9.5 dB |

These layers were deposited by magnetron DC co-sputtering employing a Dy target. The argon pressure in the sputtering was 0.4 mTorr. The atomic ratio of Fe to Co in the transition metals of recording layer 13 was 82:18, and the same atomic ratio in auxiliary recording layer 14 was 50:50. Further, with respect to the ratios of the rare earth metal and the transition metals, the ratio of the rare earth metal was set to be higher than that of recording layer 13. Further, the comparative examples were prepared such that auxiliary recording layer 14 was formed of the composition wherein the content ratio of the rare earth metal was lower than that of recording layer 13. In these samples and comparative samples, the change in the magnetic field sensitivity was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å.

Table 6 lists "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity. In the comparative samples, Table 6 lists the CN ratio obtained when the film thickness of auxiliary recording layer 14 was 25 Å.

As understood by Table 6, in the composition of auxiliary recording layer 14, when the ratio of Co in the transition metals was increased as compared with that of recording layer 13, the Curie temperature was heightened. In the composition of auxiliary recording layer 14 wherein the ratio of the rare earth metal was increased more than that of recording layer 13, the squareness at the Curie temperature of recording layer 13 was excellent, so that the CN ratio at the modulated magnetic field ±50 Oe was improved.

On the other hand, in the composition of auxiliary recording layer 14 of the comparative samples wherein the ratio of the rare earth metal is lower than that of recording layer 13, although the Curie temperature was heightened, the squareness at the Curie temperature of recording layer 13 was deteriorated as below 0.3 in squareness ratio. However, the CN ratio at the modulated magnetic field ±50 Oe was not changed or deteriorated. In other words, in the comparative samples, although the Curie temperature of auxiliary recording layer 14 was heightened as compared with that of recording layer 13, there existed a case where the magnetic field sensitivity was not improved, when the ratio of the rare earth metal in auxiliary recording layer 14 was lower than that of recording layer 13.

Further, Table 7 lists the test results of comparative samples, obtained when the ratio of the rare earth metal to the transition metals in auxiliary recording layer 14 is changed, while the atomic ratios of Fe and Co in the transition metals was kept at 8:18 (i.e., the same ratio as that of recording layer 13).

TABLE 7

| | COMPOSITION | CUR.TEMP | CHG IN CN |
|---|---|---|---|
| REC LAY | Dy 22•(Fe 82•Co 18)78 | 180° C. | — |
| COMP | Dy 16•(Fe 82•Co 18)84 | 220° C. | -1.5 dB |
| SEC REC LAY | Dy 18•(Fe 82•Co 18)82 | 195° C. | -0.5 dB |
| | Dy 20•(Fe 82•Co 18)80 | 185° C. | 0.0 dB |
| | Dy 24•(Fe 82•Co 18)76 | 180° C. | 0.5 dB |
| | Dy 26•(Fe 82•Co 18)74 | 165° C. | 0.0 dB |
| | Dy 28•(Fe 82•Co 18)72 | 150° C. | 0.0 dB |
| | Dy 30•(Fe 82•Co 18)70 | 140° C. | -0.5 dB |
| | Dy 32•(Fe 82•Co 18)68 | 130° C. | -0.5 dB |
| | Dy 34•(Fe 82•Co 18)66 | 120° C. | -0.5 dB |

In the range wherein the ratio of the rare earth metal was lower than that of recording layer 13, the Curie temperature of auxiliary recording layer 14 was higher than that of recording layer 13. However, the squareness at the Curie temperature of recording layer 13 was deteriorated below 0.1. In other words, although the Curie temperature was heightened, the squareness was degraded markedly. Further, in the range wherein the ratio of the rare earth metal was higher than that of recording layer 13, the Curie temperature was lowered than that of recording layer 13. Table 7 lists the change in CN ratio of each composition obtained when the thickness of auxiliary recording layer 14 was 25 Å. Table 7 indicates that the magnetic sensitivity was not improved, irrespective of the ratio of the rare earth metal.

Table 8 lists the test results obtained when DyFeCo was employed for recording layer 13, wherein the ratio of the rare earth metal Dy in auxiliary recording layer 14 was higher than that of recording layer 13 and further the ratio of Co in the transition metals was changed in auxiliary recording layer 14.

TABLE 8

| | COMPOSITION | CUR.TEMP | CHG IN CN |
|---|---|---|---|
| REC LAY | Dy 22•(Fe 82•Co 18)78 | 180° C. | — |
| COMP | Dy 30 • Fe 70 | 80° C. | -0.5 dB |
| SEC REC LAY | Dy 30 • (Fe 95 • Co 5)70 | 100° C. | -0.5 dB |
| | Dy 30 • (Fe 90 • Co 10)70 | 125° C. | 0.0 dB |
| SEC REC LAY | Dy 30 • (Fe 80 • Co 20)70 | 160° C. | 0.0 dB |
| | Dy 30 • (Fe 70 • Co 30)70 | 210° C. | 6.5 dB |
| | Dy 30 • (Fe 60 • Co 40)70 | 250° C. | 8.0 dB |
| | Dy 30 • (Fe 50 • Co 50)70 | 280° C. | 11.0 dB |
| | Dy 30 • (Fe 40 • Co 60)70 | 310° C. | 11.0 dB |
| | Dy 30 • (Fe 30 • Co 70)70 | 345° C. | 10.5 dB |
| | Dy 30 • (Fe 20 • Co 80)70 | >350° C. | 11.0 dB |
| | Dy 30 • (Fe 10 • Co 90)70 | >350° C. | 10.0 dB |
| | Dy 30 • Co 70 | >350° C. | 9.5 dB |

These thin films were deposited by magnetron DC co-sputtering employing an FeCo alloy target and a Dy target. The argon pressure in the sputtering was 0.4 mTorr. The atomic ratio of the rare earth metal Dy in recording layer 13 was 22 at%, and the same atomic ratio in auxiliary recording layer 14 was 30 at%. When formed as a considerably thick film, this composition has the magnetic characteristics that the rare earth metal sublattice magnetization is dominant at room temperature. Table 8 lists the results obtained when the ratio of Co in the transition metals in auxiliary recording layer 14 was changed. Further, as the comparative samples, auxiliary recording layer 14 of the composition, wherein the ratio of Co and the Curie temperature thereof is lower than those of recording layer 13, are also listed. In these samples and comparative samples, the change in the magnetic field sensitivity was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å. Table 8 lists "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity. In the comparative examples, Table 8 lists the CN ratio obtained when the film thickness of auxiliary recording layer 14 was 25 Å.

As understood by Table 8, in the composition of auxiliary recording layer 14, when the ratio of Co in the transition metals was increased, the Curie temperature is heightened monotonously. In the composition wherein the Curie temperature of auxiliary recording layer 14 is higher than that of recording layer 13, the squareness at the Curie temperature of recording layer 13 was excellent, so that the CN ratio at the modulated magnetic field ±50 Oe was improved.

Further, various examples were examined by employing recording layer 13 of Tb 22, Fe 69, Co 9 and auxiliary recording layers 14 of Tb 30, Fe(70−X), Co(X), wherein X is, respectively, 4, 8, 12, 16, 20, 30, 40, 50, 60, 70, 80, 90 and 100. In the case of the composition wherein X was more than 12, the Curie temperature of auxiliary recording layer 14 was higher than that of recording layer 13, so that the CN ratio at the modulated magnetic field ±50 Oe was improved.

As described above, it is possible to improve the magnetic field sensitivity by increasing the ratio of Co in the transition metals and further the ratio of the rare earth metal in the composition of auxiliary recording layer 14, as compared with the composition of recording layer 13.

[EXAMPLE 11]

Table 9 lists the test results obtained when the ratio of Gd or Tb in the rare earth metal was increased in the composition of auxiliary recording layer 14, as compared with the composition of recording layer 13, and further the ratio of the rare earth metal was changed.

TABLE 9

| COMPOSITION | | CUR. TEMP | CHG IN CN |
|---|---|---|---|
| REC LAY | Dy 22 • (Fe 82 • Co 18)78 | 180° C. | — |
| SEC REC LAY | (Gd 70 • Dy 30)18•(Fe 82 • Co 18)82 | 300° C. | 3.5 dB |
| | (Gd 70 • Dy 30)20 • (Fe 82 • Co 18)80 | 285° C. | 6.0 dB |
| | (Gd 70 • Dy 30)22 • (Fe 82 • Co 18)78 | 270° C. | 10.0 dB |
| | (Gd 70 • Dy 30)24 • (Fe 82 • Co 18)76 | 250° C. | 10.0 dB |

TABLE 9-continued

| COMPOSITION | CUR. TEMP | CHG IN CN |
|---|---|---|
| (Gd 70 • Dy 30)26 • (Fe 82 • Co 18)82 | 235° C. | 9.5 dB |
| (Gd 70 • Dy 30)28 • (Fe 82 • Co 18)80 | 220° C. | 9.5 dB |

Auxiliary recording layer 14 was deposited by magnetron DC co-sputtering employing an FeCo alloy target, a Gd target and a Dy target. The argon pressure in the sputtering was 0.4 mTorr. In the composition of auxiliary recording layer 14, the ratio of Gd in the rare earth metals was increased higher than that of recording layer 13, and the atomic ratio of the rare earth metals was changed. Further, the ratio of Co in the transition metals was kept at the same ratio of recording layer 13. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å. Table 9 lists "change in CN" obtained by subtracting the CN ratio of the magneto-optical recording medium having no auxiliary recording layer 14 from the CN ratio of the recording medium having auxiliary recording layer of which film thickness was most suitable for the highest magnetic field sensitivity.

Table 9 indicates that when the ratio of Gd in the rare earth metals of auxiliary recording layer 14 was increased, an effect of the higher magnetic sensitivity was obtained, even if the ratio of the whole rare earth metals was lower than that of recording layer 13. However, it is preferable from the standpoint of composition that the ratio of the whole rare earth metals in auxiliary recording layer 14 is higher than that of recording layer 13, because the magnetic field sensitivity may be improved markedly. The same tendency as above was confirmed when the ratio of Tb in the rare earth metals was increased.

[EXAMPLE 12]

Table 10 lists the test results obtained when the ratio of Gd or Tb in the rare earth metals in the composition of auxiliary recording layer 14 was higher than that of recording layer 13 and additionally the ratio of Co in the transition metals was also increased.

TABLE 10

| COMPOSITION | | CUR. TEMP | CHG IN CN |
|---|---|---|---|
| REC LAY | Dy 22 • (Fe 82 • Co 18)78 | 180° C. | — |
| SEC REC LAY | (Gd 40 • Dy 60)22(Fe 80 • Co 20)78 | 240° C. | 6.5 dB |
| | (Gd 40 • Dy 60)22(Fe 70 • Co 30)78 | 270° C. | 7.5 dB |
| | (Gd 40 • Dy 60)22(Fe 60 • Co 40)78 | 300° C. | 9.5 dB |
| | (Gd 40 • Dy 60)22(Fe 50 • Co 50)78 | 330° C. | 9.5 dB |
| | (Gd 40 • Dy 60)22(Fe 40 • Co 60)78 | >350° C. | 8.5 dB |
| | (Gd 40 • Dy 60)22(Fe 30 • Co 70)78 | >350° C. | 6.5 dB |

Auxiliary recording layer 14 was deposited by magnetron DC co-sputtering employing an FeCo alloy target, a Gd target and a Dy target. The argon pressure in the sputtering was 0.4 mTorr. In the composition of auxiliary recording layer 14, the ratio of Gd in the rare earth metals and the ratio of Co in the transition metals were increased higher than those of recording layer 13. Further, the ratio of the rare earth metals to the transition metals of auxiliary recording layer 14 was kept at the same ratio of recording layer 13. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å. Table 10 lists "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity.

Table 10 indicates that when the ratio of Gd in the rare earth metals and the ratio of Co in the transition metals of auxiliary recording layer 14 were both increased more than those of recording layer 13, an increase in the Curie temperature of auxiliary recording layer 14 was remarkable, so that the CN ratio at the modulated magnetic field ±50 Oe was increased.

The same tendency was confirmed when the ratio of Tb in the rare earth metals was increased.

[EXAMPLE 13]

In this example, Examples 11 and 12 were combined with each other. In more detail, in the composition of auxiliary recording layer 14, the ratio of Gd or Tb in the rare earth metals was increased more than that of recording layer 13. In addition, the ratio of Co in the transition metals was increased, and the ratio of the rare earth metals was increased more than that of recording layer 13.

Table 11 lists the test results obtained when DyFeCo is employed for recording layer 13 and GdDyFeCo was employed for auxiliary recording layer 14.

TABLE 11

| COMPOSITION | | CUR. TEMP | CHG IN CN |
|---|---|---|---|
| REC LAY | Dy 22 • (Fe 82 • Co 18)78 | 180° C. | — |
| SEC REC LAY | Dy 30 • (Fe 70 Co 30)70 | 210° C. | 5.5 dB |
| | (Gd 10 • Dy 90)30 • (Fe 70 • Co 30)70 | 220° C. | 7.5 dB |
| | (Gd 20 • Dy 80)30 • (Fe 70 • Co 30)70 | 230° C. | 8.5 dB |
| | (Gd 30 • Dy 70)30 • (Fe 70 • Co 30)70 | 245° C. | 10.5 dB |
| | (Gd 40 • Dy 60)30 • (Fe 70 • Co 30)70 | 255° C. | 11.0 dB |
| | (Gd 50 • Dy 50)30 • (Fe 70 • Co 30)70 | 270° C. | 11.0 dB |
| | (Gd 60 • Dy 40)30 • (Fe 70 • Co 30)70 | 280° C. | 11.0 dB |
| | (Gd 70 • Dy 30)30 • (Fe 70 • Co 30)70 | 295° C. | 11.0 dB |
| | (Gd 80 • Dy 20)30 • (Fe 70 • Co 30)70 | 310° C. | 10.5 dB |
| | (Gd 90 • Dy 10)30 • (Fe 70 • Co 30)70 | 325° C. | 9.5 dB |
| | Gd 30 • (Fe 70 • Co 30)70 | 340° C. | 8.0 dB |

Auxiliary recording layer 14 was deposited by magnetron DC co-sputtering employing an FeCo alloy target, a Gd target and a Dy target. The argon pressure in the sputtering was 0.4 mTorr. In the composition of auxiliary recording layer 14, the ratio of the rare earth metals and the ratio of Co in the transition metals were both increased to higher constant ratios than those of recording layer 13 and further the ratio of Gd in the rare earth metals was changed. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å. Table 11 lists "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity.

When the ratio of Gd in the rare earth metals, the ratio of Co in the transition metals and the ratio of the rare earth metals were all increased in auxiliary recording layer 14, the Curie temperature was increased markedly, and the squareness at the Curie temperature of recording layer 13 was extremely excellent. As the results, the CN ratio at the modulated magnetic field ±50 Oe was superior to those of Examples 11 and 12. However, when the ratio of Gd exceeded 80 at%, the noise level increased and thereby the CN ration was deteriorated.

Table 12 lists the test results obtained when the same test as above was applied to the magneto-optical recording medium wherein recording layer 13 was formed of DyFeCo and auxiliary recording layer 14 was formed of TbDyFeCo.

TABLE 12

| COMPOSITION | | CUR. TEMP | CHG IN CN |
|---|---|---|---|
| REC LAY | Dy 22 • (Fe 82 • Co 18)78 | 180° C. | — |
| SEC REC LAY | Dy 30 • (Fe 70 • Co 30)70 | 210° C. | 5.5 dB |
| | (Tb 10 • Dy 90)30 • (Fe 70 • Co 30)70 | 215° C. | 6.5 dB |
| | (Tb 20 • Dy 80)30 • (Fe 70 • Co 30)70 | 225° C. | 7.5 dB |
| | (Tb 30 • Dy 70)30 • (Fe 70 • Co 30)70 | 235° C. | 9.5 dB |
| | (Tb 40 • Dy 60)30 • (Fe 70 • Co 30)70 | 245° C. | 10.5 dB |
| | (Tb 50 • Dy 50)30 • (Fe 70 • Co 30)70 | 255° C. | 11.0 dB |
| | (Tb 60 • Dy 40)30 • (Fe 70 • Co 30)70 | 265° C. | 11.5 dB |
| | (Tb 70 • Dy 30)30 • (Fe 70 • Co 30)70 | 270° C. | 11.0 dB |
| | (Tb 80 • Dy 20)30 • (Fe 70 • Co 30)70 | 280° C. | 11.0 dB |
| | (Tb 90 • Dy 10)30 • (Fe 70 • Co 30)70 | 290° C. | 11.0 dB |
| | Tb 30 • (Fe 70 • Co 30)70 | 300° C. | 11.0 dB |

Auxiliary recording layer 14 was deposited by magnetron DC co-sputtering employing an FeCo alloy target, a Tb target and a Dy target. The argon pressure in the sputtering was 0.4 mTorr. In the composition of auxiliary recording layer 14, the ratio of the rare earth metals in the rare-earth transition-metal alloy and the ratio of Co in the transition metals were fixed at higher constant values, and the ratio of Tb in the transition metals was changed. The change in the magnetic field sensitivity of the magneto-optical recording medium samples thus manufactured was examined under the conditions that the linear recording velocity was 1.4 m/s; the recording frequency was 720 kHz; the recording power was 6.0 mW; and the modulated magnetic field was ±50 Oe. The film thickness of auxiliary recording layer 14 was changed at a pitch of 5 Å between 5 Å and 50 Å. Table 12 lists "change in CN" obtained by subtracting the CN ratio of the magneto-optical recording medium having no auxiliary recording layer 14 from the CN ratio of the recording medium having auxiliary recording layer 14 of which film thickness was most suitable for the highest magnetic field sensitivity.

In the same way as with the case where the ratio of Gd was increased, when the ratio of Tb in the rare earth metals, the ratio of Co in the transition metals and the ratio of the rare earth metals were all increased in auxiliary recording layer 14, the Curie temperature was increased markedly, and the squareness at the Curie temperature of recording layer 13 was extremely excellent. As the results, the CN ratio at the modulated magnetic field ±50 Oe was superior to those of Examples 11 and 12. When the ratio of Gd exceeded 80 at%, the noise level increased. However, when the ratio of Tb in the rare earth metals was increased, even if the whole Dy was replaced with Tb, an increase in the noise level was not recognized, with the result that excellent characteristics was obtained within a wide composition range.

Table 13 lists the test results obtained when the same test as above was applied to the magneto-optical recording medium wherein recording layer 13 was replaced with TbFeCo having the approximately same Curie temperature as the DyFeCo listed in Table 12.

TABLE 13

| COMPOSITION | | CUR. TEMP | CHG IN CN |
|---|---|---|---|
| REC LAY | Tb 22 • (Fe 88 • Co 12)78 | 185° C. | — |
| SEC REC LAY | Dy 30 • (Fe 70 • Co 30)70 | 210° C. | 5.0 dB |
| | (Tb 10 • Dy 90)30 • (Fe 70 • Co 30)70 | 215° C. | 6.0 dB |
| | (Tb 20 • Dy 80)30 • (Fe 70 • Co 30)70 | 225° C. | 7.5 dB |
| | (Tb 30 • Dy 70)30 • (Fe 70 • Co 30)70 | 235° C. | 9.5 dB |
| | (Tb 40 • Dy 60)30 • (Fe 70 • Co 30)70 | 245° C. | 10.5 dB |
| | (Tb 50 • Dy 50)30 • (Fe 70 • Co 30)70 | 255° C. | 11.0 dB |
| | (Tb 60 • Dy 40)30 • (Fe 70 • Co 30)70 | 265° C. | 11.5 dB |
| | (Tb 70 • Dy 30)30 • (Fe 70 • Co 30)70 | 270° C. | 11.5 dB |
| | (Tb 80 • Dy 20)30 • (Fe 70 • Co 30)70 | 280° C. | 11.0 dB |
| | (Tb 90 • Dy 10)30 • (Fe 70 • Co 30)70 | 290° C. | 11.0 dB |
| | Tb 30 • (Fe 70 • Co 30)70 | 300° C. | 10.5 dB |

In Example 13, the ratio of Tb in the rare earth metals of auxiliary recording layer 14 was lower than that of recording layer 13. In this case, since the ratio of the rare earth metal and the ratio of Co in the transition metal were both high, the magnetic field sensitivity was improved in the same way as with the case of Example 10. In other words, Example listed in Table 13 should be classified into the same category as Example 4, so that it is possible to replace TbFeCo with DyFeCo or vice versa in recording layer 13, without changing the magnetic field sensitivity, because these materials are almost the same in Curie temperature.

[EXAMPLE 13]

The magneto-optical recording medium having recording layer 13 containing a light rare earth metal in composition, will now be described. Table 14 below lists the test results of recording layer 13 composed of NdTbFeCo; Table 15 lists the test results of recording layer 13 of PrTbFeCo; and Table 16 lists the test results of recording layer 13 of SmTbFeCo, respectively.

TABLE 14

| COMPOSITION | | CUR.TEMP | CHG IN CN |
|---|---|---|---|
| REC LAY | Nd 11 • (Tb 24 • Fe 56 • Co 20)89 | 190° C. | — |
| SEC REC | Nd 5 • (Tb 24 • Fe 56 • Co 20)95 | 220° C. | 8.5 dB |
| LAY | Tb 24 • Fe 56 • Co 20 | 250° C. | 10.0 dB |

TABLE 15

| COMPOSITION | | CUR.TEMP | CHG IN CN |
|---|---|---|---|
| REC LAY | Pr 11 • (Tb 24 • Fe 56 • Co 20)89 | 185° C. | — |
| SEC REC | Pr 5• (Tb 24 • Fe 56 • Co 20)95 | 225° C. | 8.0 dB |
| LAY | Tb 24 • Fe 56 • Co 20 | 250° C. | 10.5 dB |

TABLE 16

| COMPOSITION | | CUR.TEMP | CHG IN CN |
|---|---|---|---|
| REC LAY | Sm 11 • (Tb 24 • Fe 61• Co 15)89 | 185° C. | — |
| SEC REC | Sm 5 • (Tb 24 • Fe 61 • Co 15)95 | 200° C. | 2.0 dB |
| LAY | Tb 24 • Fe 61 • Co 15 | 210° C. | 3.5 dB |

Recording layer 13 and auxiliary recording layer 14 were both deposited by magnetron DC co-sputtering employing a TbFeCo target, and a Nd target or a Pr target or a Sm target. The argon pressure in sputtering was 0.4 mTorr. In the composition of auxiliary recording layer 14, the ratios of the heavy rare earth metal Tb, and the transition metals Fe and Co to the sum total of these metals (Tb+Fe+Co) were kept at the same ratios of recording layer 13, and only the ratio of the light rare earth metal to the sum total of these metals was changed. The change in the magnetic field sensitivity of the samples thus manufactured were checked under conditions that the linear recording velocity was 1.4 m/s; the recording frequency was 720 kHz; the recording power was 6.0 mW; and the modulated magnetic field was ±50 Oe. The optimum film thickness of auxiliary recording layer 14 was examined, and the optimum film thickness achieved was employed for the samples, respectively.

In any cases of Tables 14, 15 and 16, it is recognized that when the ratio of the light rare earth metal in auxiliary recording layer 14 was decreased, the Curie temperature increased and therefore the squareness at the Curie temperature of recording layer 13 was improved, so that the CN ratio at the modulated magnetic field ±50 Oe was improved. When the ratio of Nd or Pr was changed, the change in the Curie temperature was larger and therefore the magnetic field sensitivity was improved more markedly, as compared with when the ratio of Sm was changed.

The similar test was made for the composition wherein the light rare earth metal was added to DyFeCo. Table 17 below lists the test results of recording layer 13 composed of NdDyFeCo; Table 18 lists the test results of recording layer 13 of PrDyFeCo; and Table 19 lists the test results of recording layer 13 of SmDyFeCo, respectively.

TABLE 17

| COMPOSITION | | CUR.TEMP | CHG IN CN |
|---|---|---|---|
| REC LAY | Nd 10 • (Dy 25 • Fe 50 • Co 25)89 | 190° C. | — |
| SEC REC | Nd 5 • (Dy 25 • Fe 50 • Co 25)95 | 220° C. | 5.5 dB |
| LAY | Dy 25 • Fe 50 • Co 25 | 240° C. | 8.5 dB |

TABLE 18

| COMPOSITION | | CUR.TEMP | CHG IN CN |
|---|---|---|---|
| REC LAY | Pr 11 • (Dy 25 • Fe 50 • Co 25)89 | 185° C. | — |
| SEC REC | Pr 5 • (Dy 25 • Fe 50 • Co 20)95 | 215° C. | 5.0 dB |
| LAY | Dy 25 • Fe 50 • Co 25 | 240° C. | 9.0 dB |

TABLE 19

| COMPOSITION | | CUR.TEMP | CHG IN CN |
|---|---|---|---|
| REC LAY | Sm 10 • (Dy 25 • Fe 54 • Co 21)89 | 185° C. | — |
| SEC REC LAY | Sm 5 • (Dy 25 • Fe 54 • Co 21)95 | 200° C. | 1.5 dB |
| | Dy 25 • Fe 54 • Co 21 | 210° C. | 2.5 dB |

Recording layer 13 and auxiliary recording layer 14 were both deposited by magnetron DC co-sputtering employing a DyFeCo target, and a Nd target or a Pr target or a Sm target. The argon pressure in sputtering was 0.4 mTorr. In the composition of auxiliary recording layer 14, the ratios of the heavy rare earth metal Dy, and the transition metals Fe and Co to the sum total of these metals (Dy+Fe+Co) were kept at the same ratios of recording layer 13, and only the ratio of the light rare earth metal to the sum total of these metals was changed. The change in the magnetic field sensitivity of the samples thus manufactured were checked. The test results were qualitatively the same as those of the composition wherein the light rare earth metal was added to TbFeCo, so that it was recognized that the kind of the heavy rare earth metal was not so important in auxiliary recording layer 14.

Further, it is also possible to select the composition wherein light rare earth metal is added to the composition of recording layer 13, as the composition of auxiliary recording layer 14. Table 20 lists the test results of the composition wherein the ratio of Gd or Tb in the rare earth metals was increased; of the composition wherein the ratio of the rare earth metals and the ratio of Co in the transition metals were both increased, as compared with recording layer 13; and of the composition wherein these were combined with one another was employed as auxiliary recording layer 14.

Table also shows test sample where a composition including light rare earth metal is employed for recording layer 14. In any compositions of auxiliary recording layer 14, the magnetic field sensitivity was improved markedly. Further, even if the ratio of the light rare earth metal in the composition of auxiliary recording layer 14 was higher than that of recording layer 13, it was possible to obtain the composition suitable for auxiliary recording layer 14 by increasing the ratio of the heavy rare earth metals and the ratio of Co in the transition metals. In other words, when the ratio of the light rare earth metals in recording layer 13 and auxiliary recording layer 14 was increased, there exist the effect that the Kerr rotation of light with wavelength of 600 nm or less is increased, and that the cast alloy target may be manufactured easily, so that the cost is reduced.

TABLE 20

| COMPOSITION | | CUR TEMP | CHG IN CN |
|---|---|---|---|
| REC LAY | Nd 5 • (Dy 25 • (Fe 73 • Co 27)75)95 | 190° C. | — |
| SEC REC LAY | (Gd 50 • Dy 50)25 • (Fe 73 • Co 27)75 | 265° C. | 10.5 dB |
| | Tb 25 • (Fe 73 • Co 27)75 | 270° C. | 11.5 dB |
| | (Gd 25 • Tb 50 • Dy 25)25 • (Fe 73 • Co 27)75 | 265° C. | 11.5 dB |
| | Dy 30 • (Fe 50 • Co 50)70 | 280° C. | 11.0 dB |
| | Tb 30 • (Fe 65 • Co 35)70 | 290° C. | 11.5 dB |
| | (Gd 50 • Dy 50)30 • (Fe 65 • Co 35)70 | 290° C. | 11.0 dB |
| | (Tb 50 • Dy 50)30 • (Fe 65 • Co 35)70 | 270° C. | 11.5 dB |
| | Nd 5 • (Dy 35)(Fe 45 • Co 55)65)95 | 280° C. | 11.5 dB |
| | Nd 8 • (Dy 35)(Fe 45 • Co 55)65)92 | 250° C. | 9.5 dB |

(5) Examples for Supplementing Example 2

[EXAMPLE 15]

The sensitivity to the modulated magnetic field was examined with respect to the magneto-optical recording medium samples manufactured in the same cross-sectional structure and the same composition as with the case of Example 2, wherein the film thickness of auxiliary recording layer 14 was changed to 0 Å, 25 Å and 35 Å, respectively. Here, the thickness of auxiliary recording layer 14 is not an actually measured value, but a value determined by calculating the sputtering time required for a necessary film thickness, respectively on the basis of the deposition rate of auxiliary recording layer 14 previously measured. Further, the sensitivity was examined by changing the intensity of the modulated magnetic field under condition that the linear recording velocity was 1.4 m/s; the recording frequency was 720 kHz; and the recording power was 6.0 mW.

Figure 16A:
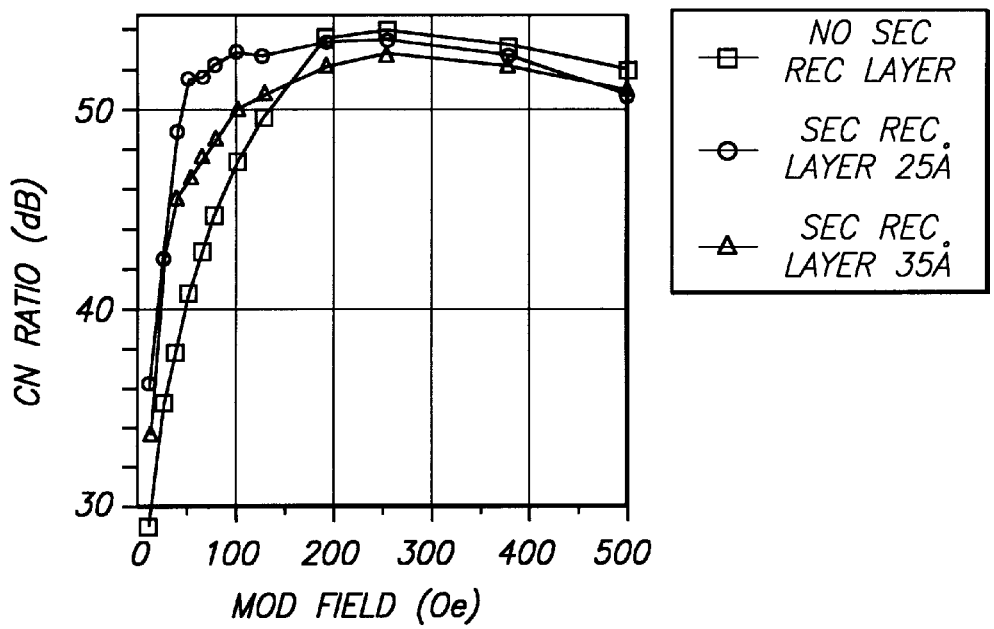
FIG. 16A and FIG. 16B are characteristic graphs showing the relationship between the modulated magnetic field intensity and the CN ratio or the carrier level, respectively in a fourteenth example of this invention.
Figure 16B:
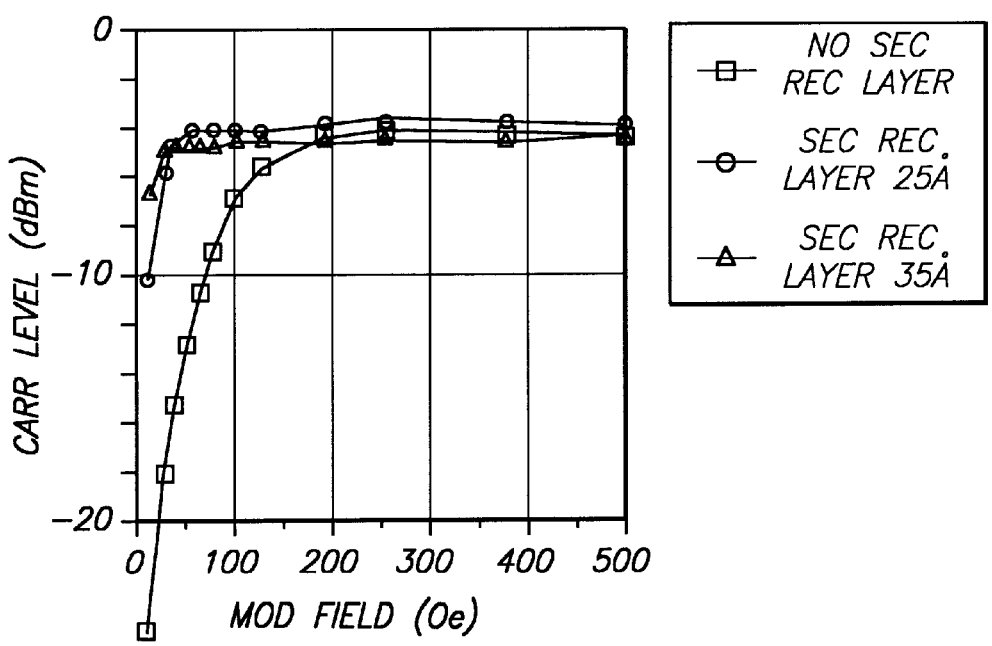

FIG. 16A shows the relationship between the CN ratio and the intensity of the modulated magnetic field, and FIG. 16B shows the relationship between the carrier level and the modulated magnetic field. In the case of the samples having no auxiliary recording layer 14, the modulated magnetic field of about 200 Oe was required to saturate the CN ratio, and the sufficient CN ratio was not obtained at 100 Oe or less. This is because the CN ratio is dependent upon the change in the carrier level, and further a strong magnetic field is required to saturate the carrier level. On the other hand, in the case of the samples having auxiliary recording layer 14 with a film thickness of 25 Å, the CN ratio was saturated at about 50 Oe. As understood with reference to the carrier level data shown in FIG. 16B, when auxiliary recording layer 14 is formed additionally, the carrier level may be saturated at even a weak modulated magnetic field, thus contributing to an improvement of the magnetic field sensitivity. Further, in the case of the samples having auxiliary recording layer 14 with a film thickness of 35 Å, the sensitivity of the CN ratio to the modulated magnetic field was deteriorated as shown in FIG. 16A. Further, the CN ratio of the sample with 35 Å thick auxiliary recording layer 14 was deteriorated. As compared with the samples having auxiliary recording layer 14 with a film thickness of 25 Å, although the carrier level was saturated at a lower magnetic field, the noise level increased in the range of 30 Å or more of the film thickness as shown in FIG. 6, so that the CN ratio was deteriorated.

(6) Supplemental Considerations Related to Conditions Required for the Auxiliary Recording Layer and Its Functions In Section (2), the reason why the magnetic field sensitivity may be improved markedly when the auxiliary recording layer having a specific ultra-thin thickness is formed, has been already considered. Here, further supplemental consideration will be made.

Figure 17:
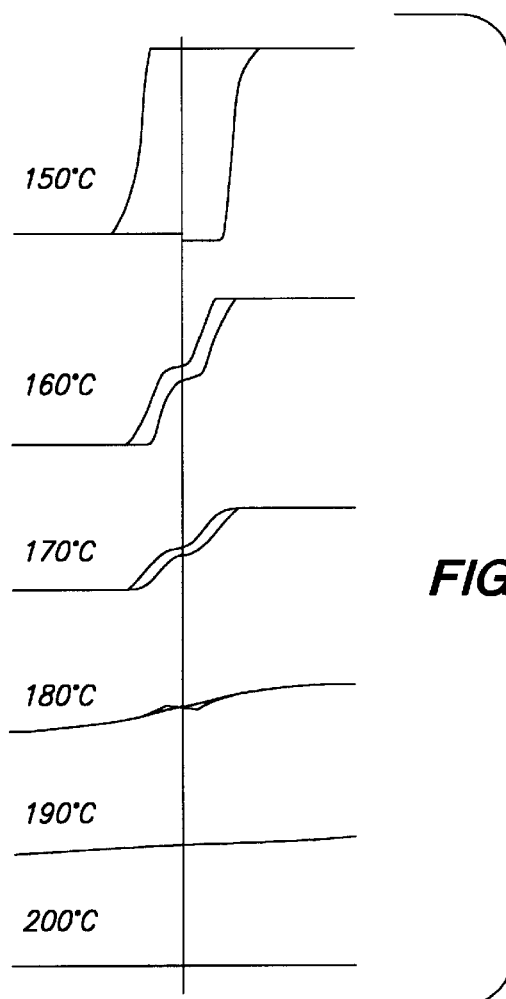
FIG. 17 is a temperature characteristic graph of the Kerr hysteresis curves of the magnetic film employed for the recording layer of this invention.

In the magneto-optical recording medium having the recording layer of a rare-earth transition-metal amorphous alloy, the practical composition by which a high CN ratio may be obtained is basically the composition of TbFeCo or DyFeCo, whose Curie temperature is about from 150° C. to 200° C. and which is close to the compensation composition at room temperature. In the composition as described above, the squareness is degraded, as shown in FIG. 17, at temperature corresponding to domain forming zone 133 (See FIG. 15), in particular near the Curie temperature, with the result that a Kerr hysteresis loop is obtained that the magnetic field for saturating the Kerr rotation is high. When observed at the temperature at which the squareness of the Kerr hysteresis loop is deteriorated, that is, near the Curie temperature, maze domains with very minute width are observed under the condition that the applied magnetic field is zero. Under the state as described above, if a magnetic field as weak as 30 Oe is applied, the maze domains still exist and thereby cannot be magnetized in one direction.

When the magnetic field modulation recording is applied on the magneto-optical recording medium having a recording layer formed of rare-earth transition-metal amorphous alloy of the composition as described above, as with the case of the recording medium formed with no auxiliary recording layer shown in FIG. 16, the carrier level is not sufficient at the modulated magnetic field of 20 Oe or less, so that a sufficient CN ratio cannot be obtained. In other words, when the recorded domains are observed, domains (i.e., micro domains) very minute and not uniform in shape are recognized. Since these micro domains are minute beyond the resolution power of the magneto-optical head employed for reproduction, the reproduction results are such that the contrast of the recorded domains is lowered, rather than the noise level is deteriorated, with the result that the reproduced signal is not sufficient in carrier level. The phenomenon that the micro domains as described above are generated in the recorded domains is caused by the fact that the maze domains are easily produced at the temperature range near the Curie temperature. The recording process will now be described with reference to FIG. 15.

As already explained in detail in Section (2), there exists a close relationship between the micro domains and the maze domain generation. On the other hand, when the composition of the rare-earth transition-metal amorphous alloy film is appropriately selected, it is possible to prevent the generation of the minute maze domains at the temperature corresponding to domain forming zone 133, or to increase the domain width of the generated maze domains beyond that of the recorded domains even if the maze domains are generated. It is known that the domain width of the maze domains is proportional to ½ power of the domain wall energy density σw and further inversely proportional to the spontaneous magnetization Ms. In other words, it is possible to increase the domain width of the maze domains, by selecting such a composition that the domain wall energy density σw is large at the temperature corresponding to domain forming zone 133 and further the spontaneous magnetization Ms is small. In the composition provided with the magnetic characteristics that the rare earth metal sublattice magnetization is dominant at room temperature, since the compensation temperature at which the magnetization intensity becomes zero is higher than room temperature, it is possible to decrease the intensity of magnetization at domain forming zone 133.

Further, it is possible to increase the domain width of the maze domains in the GdFeCo-based composition. It is stated that GdFeCo-based composition is lower in the perpendicular anisotropic energy Ku than that of TbFeCo-based composition and DyFeCo-based composition. Since the domain wall energy density σw is proportional to ½ power of the perpendicular anisotropic energy Ku, in the GdFeCo-based composition, the domain wall energy density σw must be small and thereby the width of the maze domains must be decreased. As the practical observation results, however, in contrast with this, an increase in the width of the maze domains was observed. This may be considered due to the fact that the fluctuation of the perpendicular anisotropic energy Ku is small. The TbFeCo-based and DyFeCo-based compositions are large in coercivity, and the reason of this may be explained to be that there exist microscopic fluctuations in the intensity and the angle of the perpendicular anisotropic energy Ku, and these fluctuations prevent the domain movement. Since the domain walls are fixed in a stable manner at a position at which the intensity of the perpendicular anisotropic energy Ku is near its minimum, the net domain wall energy density becomes a value far smaller than the average domain wall energy density estimated from the average perpendicular anisotropic energy Ku. In contrast with this, the GdFeCo-based composition is small in coercivity, and this means that the microscopic fluctuation of in the perpendicular anisotropic energy Ku is small. In this case, the net domain wall energy density must be a value close to the average domain wall energy density estimated from the intensity of the average perpendicular anisotropic energy Ku. In other words, although the average domain wall energy density of the GdFeCo-based composition is smaller than that of the TbFeCo-based and DyFeCo-based compositions, since the net domain wall energy density for determining the width of the maze domains is large, it is considered that the width of the maze domains may be increased.

As described above, when the magneto-optical recording medium is formed of the composition wherein the maze domain width may be increased at the temperature corresponding to the domain forming zone, since the micro domains are not easily formed, the recording medium must have high quality in magnetic field sensitivity. In practice, however, when the magnetic field modulation recording was applied on the recording medium as described above, no CN ratio practically usable was obtained even if a high magnetic field was applied thereto, far from a higher magnetic filed sensitivity. For instance, a single-layer DyFeCo film with a thickness of 200 Å (which composition had already been employed as auxiliary recording layer 14 in various Examples) was formed and the recording was made to this single-layer film under the optimum conditions. The test results were such that the obtained CN ratio was as low as 46 dB, and indicates that this composition is not considered to be practical, while 53 dB was obtained in the case of compositions already employed for recording layer 13. Further, in the case of the GdFeCo composition which is close to the compensation composition at room temperature and has a coercivity of 15 kOe or higher, the noise level was high even under the optimum recording conditions and the obtained CN ratio was as low as about 28 dB.

Figure 18A:
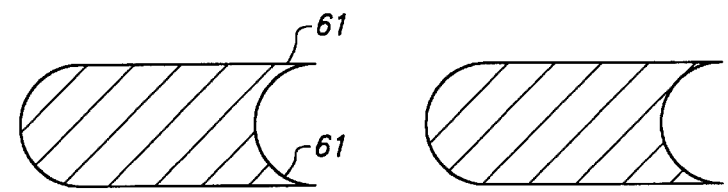
FIG. 18 is a model view showing the shapes of crescent-shaped domains.
Figure 18B:
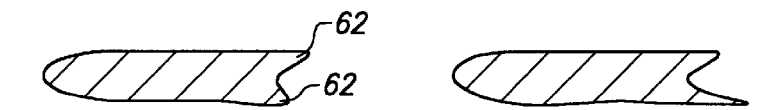

The causes thereof may be clarified by observing the recorded domains through a polarization microscope. FIG. 18 shows the model illustration of the observation results. FIG. 18A shows recorded domains of the medium for providing a high CN ratio, which are referred to as a crescent-shape, respectively faithfully shaped to the temperature distribution obtained when heated by a recording beam. In particular, the rear end portions 61 of the crescent-shaped domain are shaped sharply. In contrast with this, FIG. 18B shows recorded domains of the medium, at which the maze domain width is wide, respectively at the temperature corresponding to domain forming zone 133. In this domain, although no micro domain is recognized in the recording domain, the shape of the domain is distorted irregularly. In particular, the rear end portions 62 of the recording domain are deformed into a rounded shape. The recording domain must be formed into the crescent-shaped domain as shown in FIG. 18A, as far as being formed correctly in accordance with the temperature distribution. However, the rear end portions 16 of the crescent-shaped domain are unstable in shape from the standpoint of domain wall energy density. In this case, the rear end portions 61 become more stable when rounded into an oval shape, respectively, as shown by the rear end portions 62 in FIG. 18B. In other words, when the domain wall energy density is large and further the domain wall is easily shifted, the domain is deformed by such a force as to reduce or further minimize the domain wall energy density of the recording domain. Under the deformed condition, since the crescent-shaped domain cannot be shaped to the temperature distribution faithfully, the recording domain becomes irregular in shape as shown in FIG. 18B, with the result that noise increases.

An objective of the magneto-optical recording medium according to this invention is to provide excellent magnetic sensitivity characteristics by laminating two different kinds of magnetic films each other (a single layer of each of which cannot provide sufficient characteristics). In more detail, recording layer 13 is formed of a composition for generating minute maze domains at the temperature corresponding to domain forming zone 133, and auxiliary recording layer 14 is formed of a composition having a higher Curie temperature and a wider maze domain width than those of recording layer 13, and these two layers 13 and 14 are laminated each other. In addition, auxiliary recording layer 14 is formed as extremely thin as 70 Å or less. The reasons why the magnetic field sensitivity may be improved by the above-mentioned formation and structure have been already considered in detail under Section (2) above. In summary, in domain forming zone 133, auxiliary recording layer 14 becomes dominant at the high temperature portion 133a at the initial stage of the domain formation, and recording layer 13 becomes dominant at the low temperature portion 133b at the stage of determining the shape of the recording domain, so that it is possible to consider the generation of the maze domains may be suppressed and further the stable recording based upon the sharp crescent-shaped magnetic domains may be realized simultaneously. Here, domain forming zone 133 is produced in such a narrow temperature range as its width is from 10° C. to 15° C. The magnetic field sensitivity may be improved under the condition that the range wherein auxiliary recording layer 14 is dominant and the range wherein recording layer 13 is dominant can coexist in such a narrow temperature range.

Even in the conventional magneto-optical recording medium, there has been so far proposed a method of laminating magnetic films of different kinds in order to improve the magnetic field sensitivity. For instance, Japanese Published, Unexamined (Kokai) Patent Application No. 62-128040 discloses such a structure that a composition wherein the transition metal sublattice magnetization is dominant and another composition wherein the rare-earth sublattice magnetization is dominant up to the Curie temperature are laminated each other, to reduce the intensity of the stray magnetic field so that the applied magnetic field can effectively work. In this example, since the two magnetic films are arranged in such a way that the orientations of the stray magnetic fields are opposite to each other for cancellation thereof, a considerably large film thickness is required for both the magnetic films. If the thickness ratio between the two magnetic films is as 10:1 as with the case of this invention, the stray magnetic field will not be canceled each other. Further, in the magneto-optical recording medium according to this invention, since such a composition is not required as having the characteristics that the rare earth metal sublattice magnetization is dominant up to the Curie temperature, the magneto-optical recording medium according to this invention is quite different in structure from the multilayer magnetic film structure disclosed in this Japanese Patent Application No. 62-128040.

Further, Japanese Published, Unexamined (Kokai) Patent Application No. 4-281239 discloses such a structure wherein a composition of GdFeCo and a composition of TbFeCo are laminated to each other. In this publication, there are disclosed various samples wherein the Curie temperature of the GdFeCo layer is higher than that of the TbFeCo layer, and further having various combinations of the film thicknesses of the DyFeCo layer and the TbFeCo layer such as 60 Å and 190 Å, 100 Å and 150 Å, and 150 Å and 100 Å. Also described is that the second combination of the film thicknesses provides the most excellent characteristics. The reason why the thickness of the GdFeCo layer is larger than that of auxiliary recording layer 14 of this invention is that the recording process is essentially different from the two-layer structure of this invention. The recording process of this conventional recording medium may be classified as a "transfer or copy method", which is composed of a first process where "recording is first made to the layer higher in the Curie temperature" and a second process where "the recorded domains are transferred to the layer lower in the Curie temperature". As already stated in Section (2), this transfer method cannot essentially improve the magnetic field sensitivity.

In contrast with this, in the magneto-optical recording medium according to this invention, since the medium is formed of two-layer structure having an ultra-thin auxiliary recording layer 14, it is possible to improve the magnetic field sensitivity, as compared with single-layer the structure formed of each layer. This is because since auxiliary recording layer 14 having a higher Curie temperature is formed into an ultra-thin film of 70 Å or less, the range wherein auxiliary recording layer 14 is dominant and the range wherein recording layer 13 is dominant coexist in the domain forming zone 43, as already explained, with the result that the magnetic field sensitivity may be improved. When the film thickness of auxiliary recording layer 14 having a higher Curie temperature exceeds 70 Å, the recording is made in accordance with the transfer method as explained above. In the case of auxiliary recording layer 14 with a film thickness more than 70 Å, since auxiliary recording layer 14 is spontaneously magnetized independently even at the temperature higher than the Curie temperature of recording layer 13 and further has a large coercivity and perpendicular anisotropic energy, the recorded domains are formed in accordance with only the characteristics of the auxiliary recording layer 14. In contrast with this, in the case of auxiliary recording layer 14 with a film thickness less than 70 Å according to this invention, at the temperature higher than the Curie temperature of recording layer 13, the spontaneous magnetization, the coercivity and the perpendicular anisotropic energy are immediately all deteriorated with increasing temperature. This is because in the magnetic film with thickness as extremely thin as 70 Å or less, the intensity of the spontaneous magnetization is reduced and further the Curie temperature is lowered, as compared with the bulk (thick film). At the temperature lower than the Curie temperature of recording layer 13, auxiliary recording layer 14 can retain the spontaneous magnetization as with the case of a sufficiently thick film on the basis of the exchange-coupling with recording layer 13. On the other hand, at the temperature higher than the Curie temperature of recording layer 13, since recording layer 13 is a mere paramagnetic metal having no spontaneous magnetization, auxiliary recording layer 14 has characteristics mainly corresponding to those of an ultra-thin magnetic film, so that the spontaneous magnetization, the coercivity and the perpendicular anisotropic energy are all lowered sharply, without causing the recording process of transfer type. Therefore, the fact that auxiliary recording layer 14 is of ultra-thin film is an essential condition for the two-layer structure of this invention.

(7) Example Related to Film Thickness of Recording Layer 13

[EXAMPLE 15]

An example wherein the film thickness of recording layer 13 is changed will now be described.

In the structure as shown in FIG. 1, as recording layer 13, a rare-earth transition-metal amorphous alloy having a composition of Nd 5 at%, Dy 16 at%, Tb 5 at%, Fe 59 at%, Co 15 at% was employed. This thin film was deposited magnetron DC sputtering employing a cast alloy target under argon pressure of 1.2 mTorr. It Curie temperature was 180° C. As clearly understood by the composition, this recording layer 13 by itself is provided with the magnetic characteristics wherein the transition metal sublattice magnetization is dominant at room temperature.

Further, for auxiliary recording layer 14A, a rare-earth transition-metal alloy having a composition of Dy 30 at%, Fe 35 at%, Co 35 at% was employed. This thin film was deposited by magnetron DC sputtering technique employing a cast alloy target under argon pressure of 0.4 mTorr. Its Curie temperature was 280° C. As clearly understood by the composition, this auxiliary recording layer 14 by itself is provided with the magnetic characteristics wherein the rare earth metal sublattice magnetization is dominant at room temperature. The compensation temperature of this auxiliary recording layer 14 is 130° C. This auxiliary recording layer 14 has the magnetic characteristics that the transition metal sublattice magnetization is dominant at the temperature higher than 130° C.

To manufacture the magneto-optical recording medium as shown in FIG. 1, first dielectric layer 12 and second dielectric layer 15 were prepared by use of $Si_3N_4$ so as to have a film thickness of 750 Å and 200 Å, respectively. The reflective layer 16 was prepared by AlTi alloy so as to have a film thickness of 600 Å. Further, the transparent substrate 1 was a polycarbonate substrate.

Under the above-mentioned conditions, the samples of the magneto-optical recording media according to this invention were formed for investigation of the sensitivities to a modulated magnetic field, by changing the film thickness of recording layer 13 to 120 Å, 200 Å and 320 Å and further by changing the film thickness of auxiliary recording layer 14 from 0 Å to 80 Å at intervals of 5 Å. Here, the above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the recording linear velocity was 1.4 m/s; the recording frequency was 720 kHz; the recording power was 6.0 mW; and the modulated magnetic field was ±50 Oe.

Figure 19:
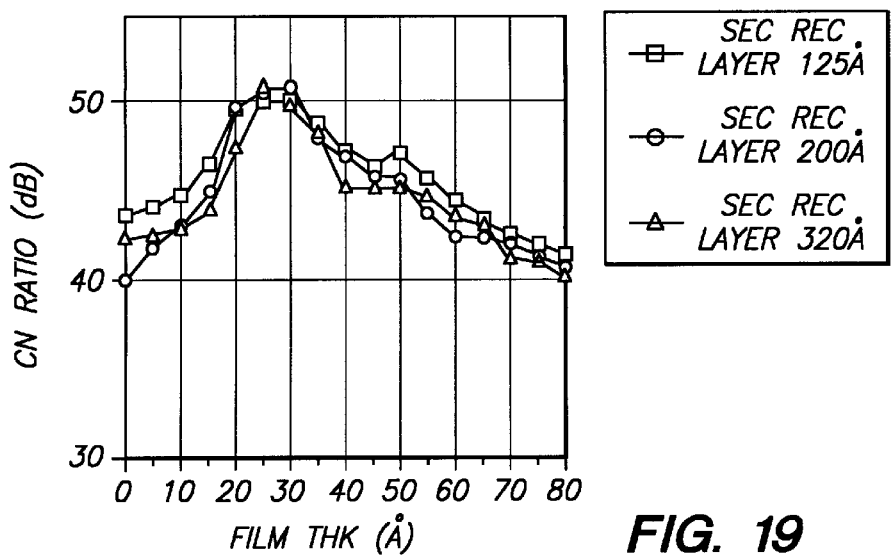
FIG. 19 is a characteristic graph showing the relationship between the film thickness and the CN ratio of the auxiliary recording layer in a fifteenth example.

FIG. 19 shows the relationship between the film thickness of auxiliary recording layer 14 and the CN (carrier-to-noise) ratio. FIG. 19 indicates that a high CN ratio may be obtained, in particular when the film thickness of auxiliary recording layer 14 lies between 20 Å and 30 Å in any thicknesses 120, 200 and 320 Å of recording layer 13. The film thicknesses of recording layer 13 in the above-mentioned range are the most practical film thicknesses for the structure having reflective layer 16, as shown in FIG. 1. In other words, even if the film thickness of recording layer 13 changes within this range, there exists no large change in the required film thickness of the auxiliary recording layer 14.

Further, the experiment was made by changing the film thickness of recording layer 13 from 400 Å to 2000 Å at intervals of 100 Å. The test results were that a sufficient effect was obtained when the film thickness of auxiliary recording layer 14 was 70 Å or less and a desirable effect was obtained when the film thickness thereof was 50 Å or less.

As described above, in the two-layer structure according to this invention, it is possible to improve the magnetic field sensitivity by forming auxiliary recording layer 14 with a film thickness of 70 Å or less, without being subjected to a serious influence of the film thickness of recording layer 13. However, when the film thickness of recording layer 13 was 80 Å or less, although a tendency of an increase of the magnetic field sensitivity was recognized, a practically sufficient CN ratio was not obtained even if the film thickness of auxiliary recording layer 14 was the optimum value. Consequently, it is preferable that the film thickness of recording layer 13 of the magneto-optical recording medium according to this invention is 80 Å or more.

(8) Example Related to the Other Compositions of Auxiliary Recording Layer 14

[EXAMPLE 16]

In Examples 1 and 2, the composition DyFeCo was employed for the auxiliary recording layer 14. In this example, however, GdFeCo and TbFeCo were employed as the composition for the auxiliary recording layer 14.

In the structure as shown in FIG. 1, as recording layer 13, a rare-earth transition-metal amorphous alloy having a composition of Nd 6 at%, Dy 15 at% Tb 6 at%, Fe 56 at%, Co 17 at% was employed. This thin film was deposited by magnetron DC sputtering employing a cast alloy target under argon pressure of 1.9 mTorr. Its Curie temperature was 180° C. As clearly understood by the composition, this recording layer 13 by itself is provided with the magnetic characteristics wherein the transition metal sublattice magnetization is dominant at room temperature.

Figure 20:
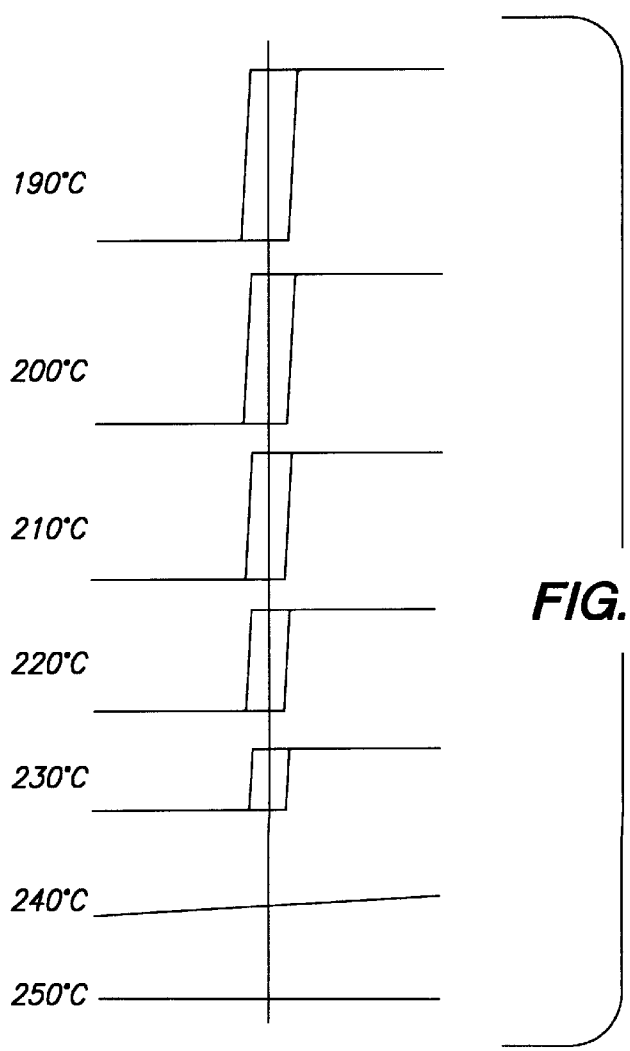
FIG. 20 is a temperature characteristic graph of the Kerr hysteresis curves of the magnetic film employed for the auxiliary recording layer in a sixteenth example.

Further, for auxiliary recording layer 14, a rare-earth transition-metal alloy having a composition of Gd 25 at%, Fe 70 at%, Co 5 at% was employed. This thin film was deposited by magnetron DC sputtering employing a cast alloy target under argon pressure of 1.2 mTorr. Its Curie temperature was 240° C. This auxiliary recording layer 14 by itself has the magnetic characteristics roughly the same as that of the compensation composition at room temperature. FIG. 20 shows the Kerr hysteresis loop of this single GdFeCo layer near the Curie temperature. FIG. 20 indicates that although the coercivity is small, this magnetic film has magnetic characteristics wherein the squareness is kept at 1 up to just below the Curie temperature.

Further, as auxiliary recording layer 14 of another composition, a rare-earth transition-metal alloy having a composition of Tb 30 at%, Fe 32 at%, Co 38 at% was employed. This thin film was deposited by magnetron DC sputtering employing a cast alloy target under argon pressure of 1.2 mTorr. Its Curie temperature was about 360° C. As clearly understood by the composition, this auxiliary recording layer 14 by itself has the magnetic characteristics that the rare earth metal sublattice magnetization is dominant at room temperature. The compensation temperature of this auxiliary recording layer 14 is 150° C. This auxiliary recording layer 14 has the magnetic characteristics that dominant in the transition metal sublattice magnetization is dominant in at the temperature range higher than 150° C.

The first dielectric layer 12 and second dielectric layer 15 were prepared by use of $Si_3N_4$ so as to have a film thickness of 750 Å and 200 Å, respectively. The reflective layer 16 was prepared by AlTi alloy so as to have a film thickness of 600 Å. Further, the transparent substrate 1 was a polycarbonate substrate.

Under the above-mentioned conditions, the samples of the magneto-optical recording media according to this invention were formed for investigation of the sensitivities to a modulated magnetic field, by changing the film thickness of auxiliary recording layer 14 from 0 Å to 50 Å at intervals of 10 Å. Here, the above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the recording linear velocity was 1.4 m/s; the recording frequency was 720 kHz; the recording power was 6.0 mW; and the modulated magnetic field was ±50 Oe.

Figure 21:
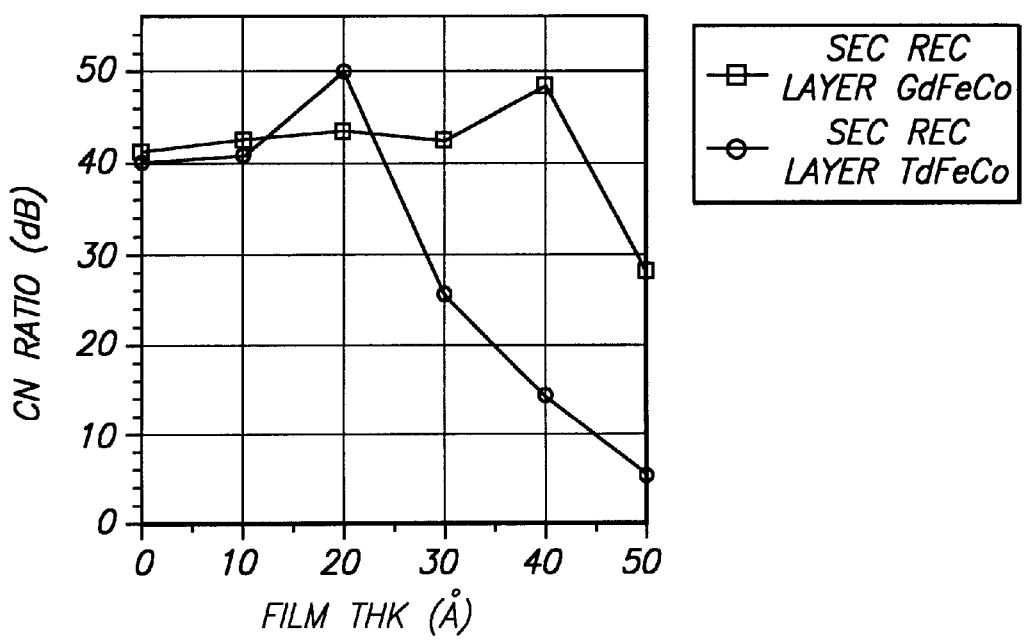
FIG. 21 is a characteristic graph showing the relationship between the film thickness and the CN ratio of the auxiliary recording layer in the sixteenth example.

FIG. 21 shows the relationship between the film thickness of auxiliary recording layer 14 and the CN (carrier-to-noise) ratio. FIG. 21 indicates that the magnetic field sensitivity (i.e., the CN ratio) was improved when the film thickness of auxiliary recording layer 14 was 40 Å in the case of auxiliary recording layer 14 of GdFeCo having the Curie temperature 240° C., and when the film thickness of auxiliary recording layer 14 was 20 Å in the case of auxiliary recording layer 14 of TbFeCo having the Curie temperature about 360° C. In these compositions, it may be understood that there exists an ultra-thin film thickness range wherein the magnetic filed sensitivity may be improved, in the same way as with the case of the composition of DyFeCo.

In the case of the compositions GdFeCo and TbFeCo, however, the CN ratio dropped sharply when the film thickness exceeded the optimum value. In the case of auxiliary recording layer 14 of GdFeCo, the CN ratio is markedly lowered mainly due to an increase in the noise level, while the carrier level was not changed. In contrast with this, in the case of auxiliary recording layer 14 of TbFeCo, the carrier level was also lowered markedly. This is because since the Curie temperature of TbFeCo is as high as about 360° C., the optimum recording power increases with increasing film thickness of the auxiliary recording layer 14. In this test, since the recording power was fixed at 6 mW, an increase of difference in recording power between the optimum value and 6 mW exerted an influence upon the test results shown in FIG. 21. On the other hand, in the case of auxiliary recording layer 14 of GdFeCo, the CN ratio was reduced mainly due to high noise level, irrespective of the recording power. The observation results of the recorded domains of auxiliary recording layer 14 of GdFeCo with a thickness of 50 Å indicated that no micro domains were recognized in the recorded domains; however, irregular domain shape (far from an ideal crescent shape) was recognized.

As described above, since the noise is increased markedly when the film thickness of auxiliary recording layer 14 of GdFeCo exceeds the optimum value, it is preferable to use the composition DyFeCo or TbFeCo as the main component of the auxiliary recording layer 14.

(9) Examples Related to Manufacturing Method

[EXAMPLE 17]

A method of manufacturing the magneto-optical recording medium according to this invention will now be described.

As the sputtering gas, an inert Ar gas is generally employed. The particles coming out of the target collide against the sputtering gas and then scattered, before reaching the substrate. Since the mean free path of the sputtering gas becomes short as the sputtering gas pressure becomes high, the number of collisions increases. Therefore, the pressure of the sputtering gas is one of the important factors which can control the distribution of incident angle of the sputtered particles upon the substrate and the distribution of energy of the sputtered particles. For instance, with respect to the incident angle distribution of the sputtered particles upon the substrate, when the proportion of the sputtered particles incident upon the substrate obliquely to those incident thereupon perpendicularly increases, since the self-shadowing effect becomes prominent, the thin film may be formed on the basis of growth of columnar structure. Accordingly, it is possible to control the magnetic field sensitivity characteristics by controlling the pressure of the sputtering gas, during the process of forming the auxiliary recording layer 14.

To obtain the structure as shown in FIG. 1, the magneto-optical recording medium was manufactured by depositing first dielectric layer 12, recording layer 13, the auxiliary recording layer 14, second dielectric layer 15, and reflective layer 16 in sequence.

As recording layer 13, a rare-earth transition-metal amorphous alloy having a composition of Nd 5 at%, Dy 16 at%, Tb 5 at%, Fe 59 at%, Co 15 at%, was employed. This thin film was deposited by magnetron DC sputtering employing a cast alloy target under argon pressure of 1.2 mTorr. Its Curie temperature was 180° C. As clearly understood by the composition, this recording layer 13 by itself is provided with the magnetic characteristics wherein the transition metal sublattice magnetization is dominant at room temperature.

Further, for auxiliary recording layer 14, a composition of DyFeCo was employed, which has the magnetic characteristics wherein the rare earth metal sublattice magnetization is dominant at room temperature. This thin film was deposited by magnetron DC sputtering employing a cast alloy target of a composition of Dy 36 at%, Fe 34 at%, Co 30 at%. In employing this DC sputtering, various samples were manufactured under various argon pressures, respectively, at 0.42 mTorr, 1.5 mTorr, 3.5 mTorr, 5.5 mTorr, 7.5 mTorr and 9.5 mTorr. The argon pressure was measured by a B-A type ionization vacuum gauge. In this ionization vacuum gauge, there is the case where a measurement error of about 10% to 20% exists. Further, when the same gas pressure is measured, since the measured pressure is often different according to the kinds of the vacuum gauges, there exists a possibility that the above-mentioned gas pressure values differ when measured with a vacuum gauge other than the ionization vacuum gauge. In any cases, although the composition is changed slightly according to the argon pressure, the Curie temperatures of any compositions were between 250° C. and 280° C.

First dielectric layer 12 and second dielectric layer 15 were prepared by use of $Si_3N_4$ so as to have a film thickness of 750 Å and 200 Å, respectively. The reflective layer 16 was prepared by AlTi alloy so as to have a film thickness of 600 Å. Further, the transparent substrate 1 was a polycarbonate substrate.

Under the above-mentioned manufacturing conditions, the samples of the magneto-optical recording media according to this invention were formed for investigation of the sensitivities to a modulated magnetic field, by changing the film thickness of auxiliary recording layer 14 from 0 Å to 70 Å at intervals of 5 Å or 10 Å. Here, the above-mentioned film thicknesses of auxiliary recording layer 14 were not actually measured values, but determined by previously measuring the deposition rate of auxiliary recording layer 14 and by calculating the sputtering time required for the respective film thicknesses. The recording was made under the conditions that the recording linear velocity was 1.4 m/s; the recording frequency was 720 kHz; the recording power was 6.0 mW; and the modulated magnetic field was ±50 Oe.

Figure 22:
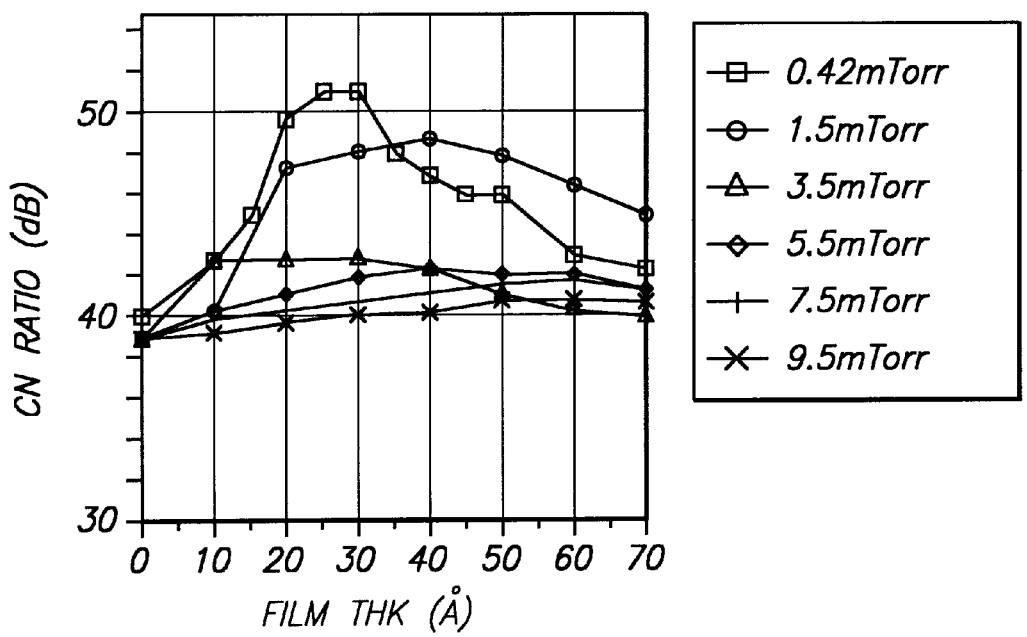
FIG. 22 is a characteristic graph showing the relationship between the film thickness and the CN ratio of the auxiliary recording layer in a seventeenth example.

FIG. 22 shows the relationship between the film thickness of auxiliary recording layer 14 and the CN (carrier-to-noise) ratio. FIG. 22 indicates that when auxiliary recording layer 14 was deposited under the argon pressure between 0.42 mTorr and 1.5 mTorr, a high CN ratio was obtained when the film thickness of auxiliary recording layer 14 ranged between 10 Å and 70 Å. Further, when auxiliary recording layer 14 was deposited under the argon pressure of 3.5 mTorr to 9.5 mTorr, although the CN ratio was slightly improved, the improvement rate of the CN ratio decreases with increasing argon pressure.

Further, the similar test was made under the argon pressure higher than 10 mTorr. However, the improvement rate of the CN ratio was less than 1 dB, without providing any noticeable effect.

As described above, it is preferable to determine the sputtering gas pressure to be 10 mTorr or less in the process of depositing the auxiliary recording layer 14, and more preferable to determine it to be 3.5 mTorr or less. Further, the most preferable sputtering gas pressure is 1.5 mTorr or less. The lower the sputtering gas pressure under which auxiliary recording layer 14 is deposited, the more excellent will be the magnetic field sensitivity characteristics obtained at the optimum film thickness of the auxiliary recording layer 14. However, the range of the film thickness wherein the excellent characteristics is obtained is narrowed.

[EXAMPLE 18]

In this example, the manufacturing method of heat-treating recording layer 13 and auxiliary recording layer 14 will now be described. An object of the heat treatment is to prevent a change in characteristics due to aging phenomenon.

In manufacturing the magneto-optical recording medium of ultra-thin two-layer structure according to this invention, it is very important to prevent the recording medium from a change in characteristics due to aging phenomenon. In the case where the rare-earth transition-metal amorphous alloy is employed for recording layer 13 and the auxiliary recording layer 14, a change in magnetic characteristics due to structural relaxation is unavoidable. Here, "structural relaxation" implies a phenomenon such that in the case of amorphous metal, the atoms are dislocated within the range of the short range order, even at such a low temperature as room temperature.

Figure 23:
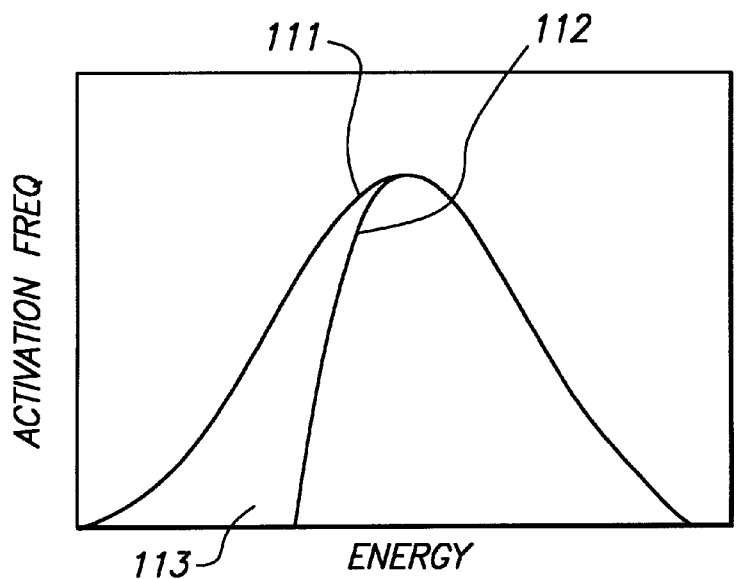
FIG. 23 is a model view showing an activation energy spectrum for structural relaxation of the amorphous metal.

FIG. 23 is a model view showing the activation energy spectrum for structural change of the amorphous metal. Immediately after the manufacturing, spectrum 111 is of wide energy distribution, so that the structure can changed by the thermal energy corresponding to such a low temperature as between room temperature and 100° C. Once activated, however, since the frequency of structural relaxation corresponding to the activation energy decreases gradually, the activation energy spectrum changes to that 112, so that the low energy region of the spectrum changes into a vacant state 113. As a result, the structural relaxation will not further proceed at such a low temperature as from room temperature to about 100° C.

The change in the magnetic characteristics due to the structural relaxation of the rare-earth transition-metal amorphous metal will now be described. With respect to the nature based upon macroscopic observation, the coercivity and the perpendicular anisotropy constant both decrease, because these are determined on the basis of the short range order of atoms. Further, in relation to a decrease of the coercivity, since the net domain wall energy density increases as already explained, it is regarded that the width of the maze domains increases. As a result, when the magnetic field modulation recording is applied, the tendency of occurrence of micro domains in recording layer 13 changes so that the extremely minute domains which exert influence upon the carrier level are not generated easily. Further, from the functional standpoint of auxiliary recording layer 14, it is possible to consider that the generation of the micro domains is suppressed and thereby the effect of improving the carrier level may be promoted.

Figure 24:
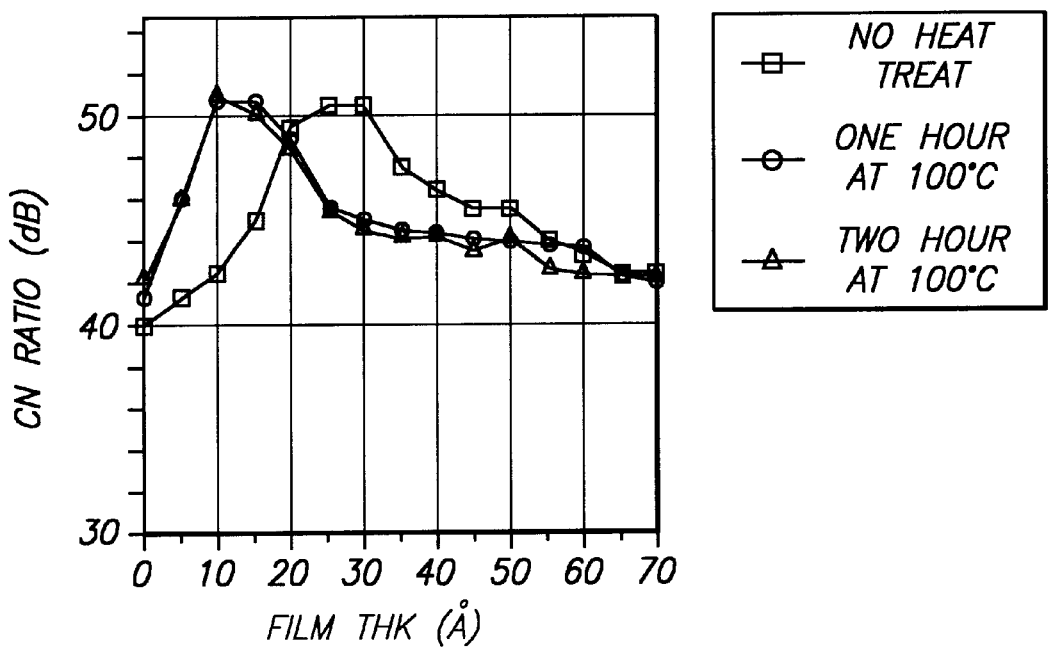
FIG. 24 is a characteristic graph showing the relationship between the film thickness and the CN ratio of the auxiliary recording layer in an eighteenth example.

The samples of the magneto-optical recording medium the same as Example 1 in composition, structure and manufacturing method were heat treated in air under the heating conditions that the temperature was 100° C. and heating time was 1 and 2 hours, respectively. FIG. 24 shows the relationship between the CN ratio and the film thickness of auxiliary recording layer 14, obtained when the recording was made under the conditions that the linear recording velocity was 1.4 m/s, the recording frequency was 720 kHz, the recording power was 6.0 mW and the modulated magnetic field was ±50 Oe.

FIG. 24 indicates that the optimum range of the film thickness of auxiliary recording layer 14 was from 20 Å to 30 Å before heat treatment, but changed to 10 Å to 20 Å after heat treatment of 100° C. In other words, in the film thickness range of auxiliary recording layer 14 between 5 Å and 15 Å wherein the CN ratio is not sufficient before heat treatment, the magnetic field sensitivity may be improved markedly after the heat treatment. However, almost no difference in the CN ratio was not recognized even if the heating time was increased from 1 to 2 hours.

In the ultra-thin two-layer structure of the magneto-optical recording medium according to this invention, it has been confirmed that heat treatment at a relatively low temperature causes an important change in the magnetic filed sensitivity. In the case of the conventional magneto-optical recording medium, an auxiliary recording layer 14 with a film thickness of zero in FIG. 24, no noticeable change in the magnetic filed sensitivity characteristics was recognized between before and after the heat treatment.

The magneto-optical recording medium according to this invention heat-treated under the above-mentioned conditions and the same recording medium not heat-treated were tested in a life test at relative humidity of 85% for 100 hours, 200 hours, 500 hours and 1,000 hours at the temperature of 80° C., respectively.

In the case of the magneto-optical medium not heat-treated, the magnetic field sensitivity characteristics changed after 100 hours. This change in the sensitivity characteristics was quite the same as that produced by the heat treatment at 100° C. shown in FIG. 24. In other words, although the optimum film thickness of auxiliary recording layer 14 was from 20 Å to 30 Å before the life test, the optimum film thickness after the 100-hour life test changed to between 10 Å and 20 Å. Further, even in the film thickness range between 5 Å and 15 Å wherein the effect of auxiliary recording layer 14 was insufficient before the life test, the magnetic field sensitivity was improved markedly. However, no noticeable change in the magnetic field sensitivity characteristics was recognized, even when the life test time was further increased to 200 hours, 500 hours and 1,000 hours, respectively.

On the other hand, in the case of the magneto-optical recording medium heat-treated according to this invention, no change in the magnetic field sensitivity was recognized even after the life test. Further, almost no difference was recognized in the life test result between the heat treatment times 1 and 2 hours.

As described above, it is possible to suppress the change in the magnetic field sensitivity characteristics due to aging phenomenon by applying the heat treatment. In other words, when the film thickness of auxiliary recording layer 14 at which the most excellent magnetic field sensitivity characteristics may be obtained without applying the heat treatment is determined to be $D_{max}$, it is possible to manufacture the magneto-optical recording medium free from the aging phenomenon of the magnetic field sensitivity characteristics, by forming the film thickness of auxiliary recording layer 14 less than $D_{max}$ and by further heat treating formed auxiliary recording layer 14. The film thickness $D_{max}$ may be changed between 0 Å and 70 Å by changing the manufacturing conditions and the compositions of recording layer 13 and auxiliary recording layer 14. In the case where heat treated, it is possible to obtain excellent magnetic field sensitivity characteristics by forming auxiliary recording layer 14 so as to have a film thickness from ⅛ to ⅔ of $D_{max}$.

Further, with respect to the temperature of the heat treatment, although the effect was recognized from about 50° C., a long heat treatment time was required or the heat treatment was not sufficient because of the aging phenomenon. The higher the heat treatment temperature was, the shorter the heat treatment time was. For instance, the required heat treatment time was 50 hours at the heat treatment temperature 80° C., and the necessary heat treatment time was 40 minutes at the heat treatment temperature 100° C. From the manufacturing standpoint, since it is desired to reduce the heat treatment time as much as possible, a higher heat treatment temperature is desired. However, when polycarbonate was employed as transparent substrate 11 of the magneto-optical recording medium, the upper limit of the heat treatment temperature was 120° C. because the polycarbonate began to be softened. In this material, a sufficient effect was obtained by the heat treatment time of 5 minutes or less at 120° C.

As described above, the reason why the aging phenomenon of the magnetic sensitivity of the magneto-optical recording medium according to this invention may be suppressed by the heat treatment at a relatively low temperature is that the structural relaxation of the amorphous metal due to aging phenomenon is previously generated by the heat treatment. In other words, as already explained, since activation energy spectrum 111 required for the structural change of the amorphous alloy is wide in energy distribution, the structure may be changed by a sufficiently low thermal energy, so that the low energy region of activation energy spectrum 113 becomes a vacant status 113 after the heat treatment. As a result, the structural relaxation at low temperature from room temperature to 100° C. will not further proceed, so that the aging phenomenon may be suppressed.

[EXAMPLE 19]

As shown in FIG. 23, when the low energy portion of activation energy spectrum 111 required for the structural relaxation of the amorphous alloy is small, it is possible to suppress the aging phenomenon. On the other hand, however, activation energy spectrum 111 changes according to the manufacturing conditions or the composition of the amorphous alloy. In this example, as one of the manufacturing conditions thereof, the method of leveling the surfaces of first dielectric layer 12 and recording layer 13 will now be described.

In general, a composition based upon $Si_3N_4$ or AlN or AlSiN is employed as the material of first dielectric layer 12, which is deposited before recording layer 13 is formed. Further, when dielectric layer 12 with a film thickness of about several hundreds Å is formed of this composition by the sputtering technique, it has been so far known that a minute roughness of about several tens Å is generated on the surface of dielectric layer 12. When the rare-earth transition-metal amorphous alloy is deposited on the dielectric layer having a minute roughness, the magnetic characteristics thereof are influenced by the minute roughness. In other words, when the rare-earth transition-metal amorphous alloy is deposited on the dielectric layer having a roughness of about several tens A, a relatively large coercivity may be achieved. On the other hand, when the dielectric layer having a minute roughness with plasma of inert gas is dry-etched, the surface roughness may be reduced, i.e., the surface may be leveled. When the rare-earth transition-metal amorphous alloy is deposited on such a leveled dielectric layer, a drop of coercivity may be realized, as compared with a non-leveled dielectric layer. Further, we have found that when the surface of the dielectric layer is leveled, not only the coercivity is lowered, but also the width of the maze domains generated near the Curie temperature may be widened. These above-mentioned issues exert influence upon the magnetic field sensitivity characteristics of the magneto-optical recording medium.

In the structure shown in FIG. 1, as recording layer 13, a rare-earth transition-metal amorphous alloy having a composition of Nd 5 at%, Dy 16 at%, Tb 5 at%, Fe 59 at%, Co 15 at% was employed. This thin film was deposited by magnetron DC sputtering employing a cast alloy target under argon pressure of 1.2 mTorr. Its Curie temperature was 180° C. As clearly understood by the composition, recording layer 13 by itself is provided with the magnetic characteristics wherein the transition metal sublattice magnetization is dominant at room temperature.

Further, for auxiliary recording layer 14, a rear-earth transition-metal alloy having a composition of Dy 30 at%, Fe 35 at%, Co 35 at% was employed. This thin film was deposited by magnetron DC sputtering employing a cast alloy target under the conditions that the argon pressure was 0.4 mTorr and the power was 100 W. Its Curie temperature was 280° C. As clearly understood by the composition, auxiliary recording layer 14 by itself is provided with the magnetic characteristics wherein the rare earth metal sublattice magnetization is dominant at room temperature.

The material of first dielectric layer 12 was AlSiN. The sputtering conditions were that the sputtering gas was Ar 60%+$N_2$ 40%, the pressure was 1.7 mTorr and the input power was RF 2500 W. The employed target was an alloy target of AlSiN. To level or planarize the minute roughness formed on the surface of first dielectric layer 12, as already explained, the surface of first dielectric layer 12 was sputtered again by the dry-etching technique by use of RF plasma. The RF plasma etching conditions were that the etching gas was Ar, the pressure was 1.8 mTorr, and the input power was RF 50 W, for instance.

Figure 25:
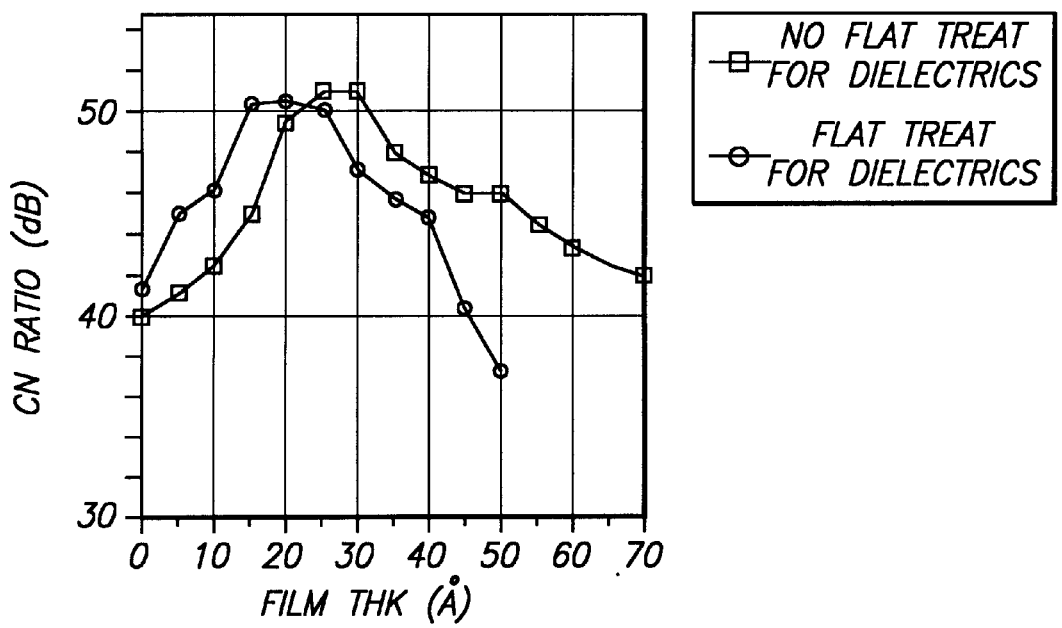
FIG. 25 is a characteristic graph showing the relationship between the film thickness and the CN ratio of the auxiliary recording layer in a nineteenth example.

After first dielectric layer 12 with a thickness of 770 Å had been formed on transparent substrate 11, the surface of dielectric layer 12 was leveled by the RF plasma etching for 20 min. Thereafter, recording layer 13 with a film thickness of 200 Å, auxiliary recording layer 14, second dielectric layer 15 with a film thickness of 200 Å, and reflective layer 16 with a film thickness of 600 Å were laminated in sequence on first dielectric layer 12. Here, samples were manufactured by changing the film thickness of auxiliary recording layer 14 from 0 Å to 50 Å under the conditions that the linear recording velocity was 1.4 m/s, the recording frequency was 720 kHz, the recording power was 6.0 mW, and the modulated magnetic field was ±50 Oe. FIG. 25 shows the relationship between the film thickness of auxiliary recording layer 14 and the CN ratio. Further, FIG. 25 shows the magnetic field sensitivity characteristics of the samples, to which the RF plasma etching for purposes of leveling was not applied after the first dielectric layer with a film thickness of 750 Å had been formed.

FIG. 25 indicates that when the underlayer is leveled by the RF plasma etching, it is possible to obtain the same excellent effect at thinner thickness of auxiliary recording layer 14 than the samples to which the leveling treatment is not applied. In other words, in the case of the samples to which the leveling treatment is not effected, a particularly large CN ratio may be obtained when the film thickness of auxiliary recording layer 14 is roughly from 20 Å to 30 Å. In the case of the samples to which the leveling treatment is applied, a particularly large CN ratio may be obtained when the film thickness thereof is roughly from 15 Å to 25 Å.

These samples manufactured as described above were tested in life test for 100 hours, 200 hours, 500 hours and 1,000 hours under the environment that the temperature was 80° C. and the relative humidity was 85%. In the case of the samples to which the leveling treatment was not made to first dielectric layer 12, the optimum film thickness range of auxiliary recording layer 14 before the life test was from 20 Å to 30 Å. However, the optimum film thickness range changed to that from 10 Å to 20 Å after the 100 hour life test. In particular, in the film thickness range from 5 Å to 15 Å, the effect of auxiliary recording layer 14 was not sufficient before the life test, but a remarkable improvement was obtained in the magnetic field sensitivity. On the other hand, in the case of the samples to which the leveling treatment was made, the optimum film thickness range of auxiliary recording layer 14 before the life test was from 15 Å to 25 Å. However, the optimum range changed slightly only from 10 Å to 20 Å after 100-hour life test. Irrespective of the presence or absence of the leveling treatment, there exists almost no difference in the heat treatment results between 200 hours or longer and 100 hours. As described above, when first dielectric layer 12 is leveled, it is possible to reduce the aging phenomenon in the magnetic field sensitivity characteristics, by determining the film thickness of auxiliary recording layer 14 to between 15 Å and 20 Å.

Next, the manufacturing method of forming auxiliary recording layer 14 after the surface of recording layer 13 has been leveled will now be explained. In the case where recording layer 13 is formed on a minute rough surface of the dielectric layer 12 without leveling or planarizing the minute roughness thereof, the surface of recording layer 13 also has a minute roughness. However, if auxiliary recording layer 14 is formed after leveling the roughness of the surface of recording layer 13, it is possible to change the magnetic characteristics of only auxiliary recording layer 14.

Figure 26A:
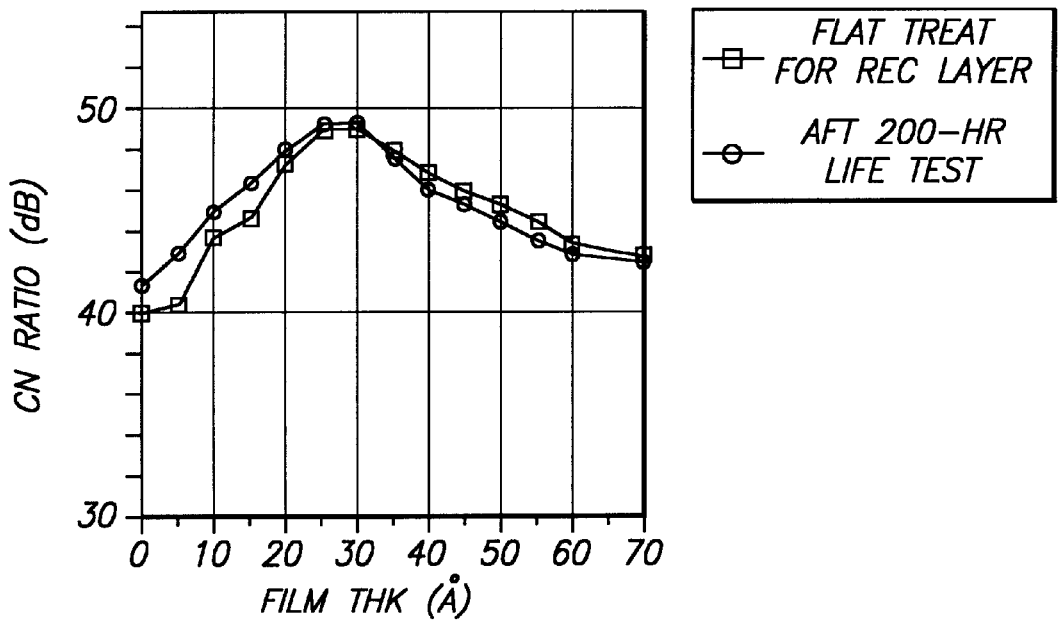
FIG. 26A and FIG. 26B are characteristic graphs showing the relationship between the film thickness and the CN ratio of the auxiliary recording layer in the nineteenth example manufactured by another method.

After first dielectric layer 12 with a film thickness of 750 Å had been formed on transparent substrate 11, without any leveling treatment to substrate 11, recording layer 13 with a film thickness of 210 Å was deposited. Then the surface of recording layer 13 was treated by the RF plasma etching under the conditions that the etching gas was Ar, the pressure was 1.8 mTorr, the input power was RF 50 W, and the RF plasma etching treatment time was 5 minutes. Successively, auxiliary recording layer 14 was deposited by changing the film thickness thereof from 0 Å to 70 Å at intervals of 5 Å. Further, second dielectric layer 15 with a film thickness of 200 Å and reflective layer 16 with a film thickness of 600 Å were deposited thereon. The samples manufactured as described above were recorded under the conditions that the linear recording velocity was 1.4 m/s, the recording frequency was 720 kHz, the recording power was 6.0 mW, and the modulated magnetic field was ±50 Oe. FIG. 26(A) shows the relationship between the CN ratio and the film thickness of auxiliary recording layer 14. Further, FIG. 26A shows the magnetic field sensitivity characteristics of the same samples to which the life test was made for 200 hours under the environment that the temperature was 80° C. and the relative humidity was 85%.

FIG. 26A indicates that the optimum film thickness of auxiliary recording layer 14 is from 15 Å to 40 Å, and does not change between before and after the life test. As described above, when auxiliary recording layer 14 is deposited after the surface of recording layer 13 has been leveled, it is understood that the magnetic field sensitivity characteristics hardly change before and after the life test, that is, the aging phenomenon of the magnetic characteristics may be suppressed.

Figure 26B:
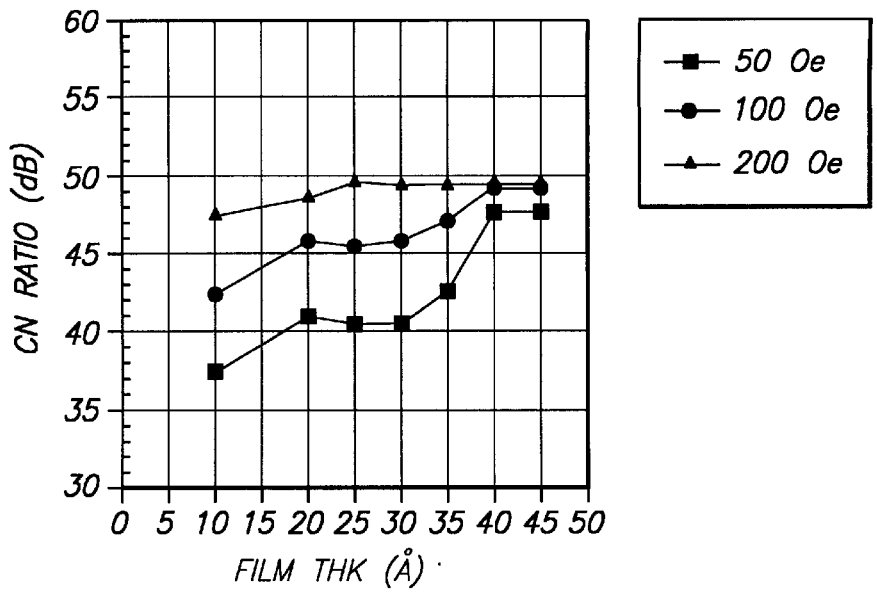

Further, FIG. 26B shows the relationship between the CN ratio and the film thickness of auxiliary recording layer 14 of the samples manufactured by setting the etching treatment time to 20 minutes under the same conditions as above except the etching treatment time. In FIG. 26B, the recording was made in three modulated magnetic fields of ±50 Oe, ±100 Oe and ±200 Oe, respectively. FIG. 26B indicates that the optimum film thickness is shifted from a range from 25 Å to 30 Å to another range from 40 Å to 45 Å when the etching time is increased from 5 to 20 minutes. The life test was made to these samples in the same way as above. However, any change of the characteristics was scarcely recognized, although not shown by a drawing.

(10) Examples Related to Another Arrangement of Recording Layer 13 and Auxiliary Recording Layer 14

[EXAMPLE 20]

Figure 27A:
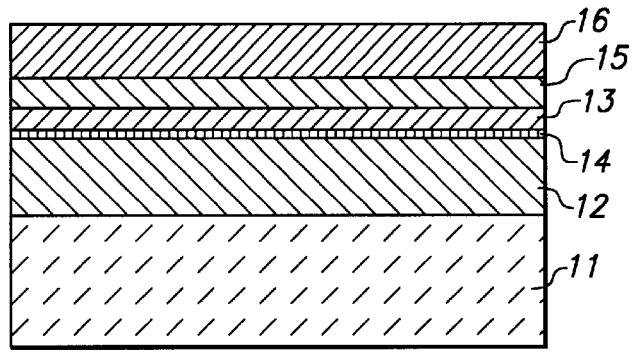
FIG. 27 is a cross-sectional view showing variations of the structure of the magneto-optical recording medium according to this invention.
Figure 27B:
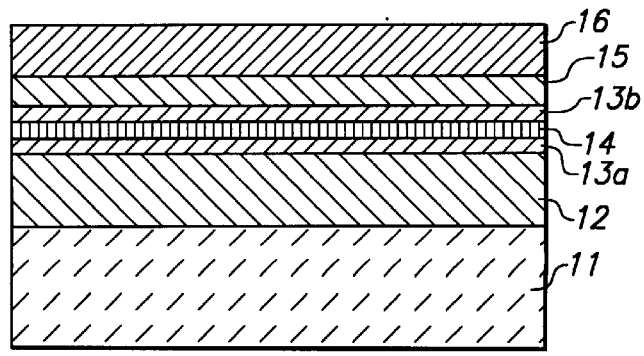
Figure 27C:
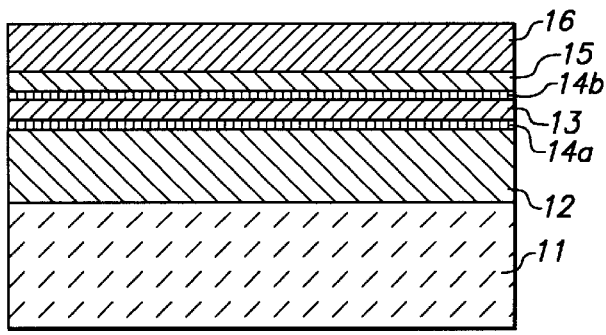

In the above-mentioned examples, the structure is such that auxiliary recording layer 14 is formed after recording layer 13 has been formed, as shown in FIG. 1, referred to as post-formation structure. In this example, however, the magneto-optical recording media of various structures will be described, wherein the arrangement relationship between recording layer 13 and auxiliary recording layer 14 is modified, as shown in FIG. 27A to FIG. 27C. FIG. 27A shows the magneto-optical recording medium wherein auxiliary recording layer 14 is formed before recording layer 13 is formed, referred to as preformation structure. FIG. 27B shows the magneto-optical recording medium wherein auxiliary recording layer 14 is sandwiched between two recording layers 13a and 13b, also referred to as intermediate-formation structure. FIG. 27C shows the magneto-optical recording medium wherein two auxiliary recording layers 14a and 14b are formed on both sides of recording layer 13, also referred to as final-formation structure. Further, in this example, although the reflective structure having first dielectric layer 12, second dielectric layer 15 and reflective layer 16 is employed, the recording medium according to this invention is not limited to only the reflective structure of this type.

As recording layer 13, a rare-earth transition-metal amorphous alloy having a composition of Nd 5 at%, Dy 16 at%, Tb 5 at% ,Fe 59 at%, Co 15 at% was employed. This thin film was deposited by magnetron DC sputtering employing a cast alloy target under the conditions that the argon pressure was 1.2 mTorr and the power was 300 W. The Curie, temperature was 180° C. As clearly understood by the composition, recording layer 13 by itself is provided with the magnetic characteristics that the transition metal sublattice magnetization is dominant at room temperature.

Further, for auxiliary recording layer 14, a rare-earth transition-metal alloy having a composition of Dy 30 at%, Fe 35 at%, Co 35 at% was employed. This thin film was deposited by magnetron DC sputtering employing a cast alloy target under the conditions that the argon pressure was 0.4 mTorr and the power was 100 W. The Curie temperature was 280° C. As clearly understood by the composition, auxiliary recording layer 14 by itself is provided with the magnetic characteristics that the rare earth metal sublattice magnetization is dominant at room temperature.

To manufacture the magneto-optical recording medium as shown in FIG. 27A to FIG. 27C, first dielectric layer 12 was first deposited on the transparent substrate 11. The material of first dielectric layer 12 was AlSiN, and the sputtering conditions are that the sputtering gas was Ar 60%+$N_2$ 40%, the pressure was 1.7 mTorr, and the input power was RF 2500 W. As the target, an AlSi alloy was employed. The leveling treatment was not made on first dielectric layer 12. The film thickness of first dielectric layer 12 was 750 Å.

Successively, the magnetic layers were formed as follows: In the case of the preformation structure, after auxiliary recording layer 14 had been formed, recording layer 13 was formed. The film thickness of recording layer 13 was determined to be 200 Å, and the film thickness of auxiliary recording layer 14 was changed from 0 Å to 80 Å.

In the case of the intermediate-formation structure, after the first half portion 13a of recording layer 13 had been formed, auxiliary recording layer 14 was formed and, then, the second half portion 13b of recording layer 13 was formed. The film thicknesses were 100 Å in both the first half portion 13a and the second half portion 13b of recording layer 13, so that the film thickness of recording layer 13 was 200 Å in total. The film thickness of auxiliary recording layer 14 was changed from 0 Å to 100 Å.

In the case of the final-formation structure, after the first half portion 14a of auxiliary recording layer 14 had been formed, recording layer 13 was formed and then the second half portion 14b of auxiliary recording layer 14 was formed. The film thickness was 15 Å in the first half portion 14a of auxiliary recording layer 14 and 200 Å in recording layer 13. The film thickness of second half portion 14b of auxiliary recording layer 14 was changed from 0 Å to 65 Å. The film thickness of auxiliary recording layer 14 was not measured actually, but determined by previously measuring the deposition rate of auxiliary recording layer 14 and by calculating the sputtering time required for the respective film thicknesses.

After the magnetic layers had been formed as described above, second dielectric layer 15 and reflective layer 16 were deposited. Second dielectric layer 15 was formed of AlSiN so as to have a film thickness of 200 Å, and reflective layer 16 was formed of AlTi so as to have a film thickness of 600 Å.

Figure 28:
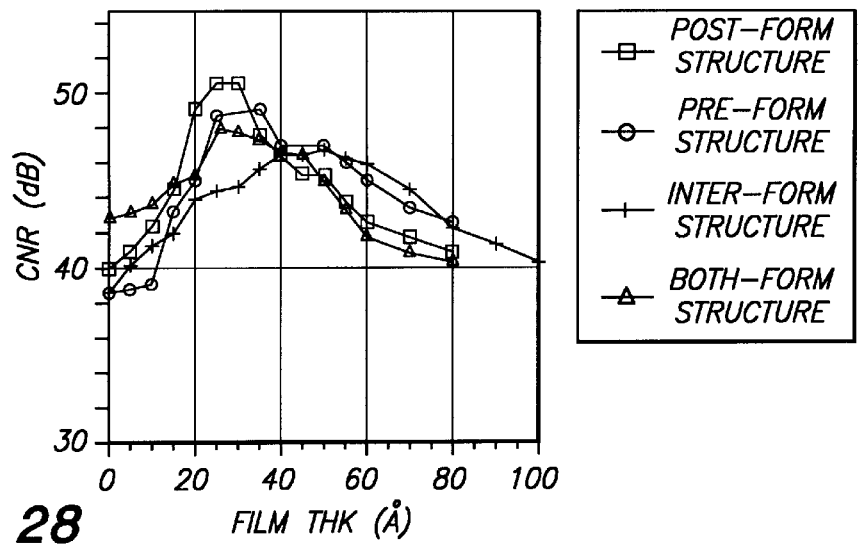
FIG. 28 is a characteristic graph showing the relationship between the film thickness and the CN ratio of the auxiliary recording layer in a twentieth example.

The magnetic field sensitivity characteristics of the samples thus manufactured were examined. FIG. 28 shows the relationship between the CN ratio and the film thickness of auxiliary recording layer 14 when recorded under the conditions that the recording linear velocity was 1.4 m/s, the recording frequency was 720 kHz, the recording power was 6.0 mW, and the modulated magnetic field was ±50 Oe. In FIG. 28, the test results of the magneto-optical recording medium of the post-formation structure shown in FIG. 1 are also shown. Further, with respect to the recording medium of the final-formation structure, the film thicknesses of second half portion 14b of auxiliary recording layer 14b is plotted along the abscissa.

As understood by the test results shown in FIG. 28, there exists an effect of improving the magnetic field sensitivity characteristics in any structures wherein the deposition sequence of recording layer 13 and auxiliary recording layer 14 is changed. However, the dependency of the magnetic field sensitivity characteristics upon the film thickness of auxiliary recording layer 14 differs according to the structure thereof. In comparison between the post-formation structure and the pre-formation structure, the tendency thereof is similar to each other. In other words, in either structure, excellent magnetic field sensitivity characteristics may be obtained when the film thickness of auxiliary recording layer 14 is from 15 Å to 45 Å, in particular from 20 Å to 35 Å.

Further, in comparison between the intermediate-formation structure and the post-formation structure, the change of the CN ratio with respect to the film thickness is more gentle in the intermediate-formation structure. In other words, in the case of the intermediate-formation structure, the magnetic field sensitivity characteristics are excellent within a wide range from 15 Å to 80 Å of the film thickness of auxiliary recording layer 14, in particular within a range between 30 Å and 70 Å. In particular, the most excellent characteristics may be obtained when the film thickness of auxiliary recording layer 14 is 50 Å. In the intermediate-formation structure, since the gradient of the carrier level is more gentle than the post- and pre-formation structures, the optimum film thickness range of auxiliary recording layer 14 is twice wider than that of the post- and pre-formation structures, but the CN ratio obtained at the optimum film thickness is somewhat low. In other words, the intermediate-formation structure is inferior to the post- and pre-formation structures from the standpoint of the excellent magnetic field sensitivity characteristics. However, since the film thickness range wherein the excellent magnetic field sensitivity characteristics may be obtained is wide, the margin in the manufacturing process is wide.

Further, the tendency of the final-formation structure is similar to that of the post-formation structure and the pre-formation structure. In this example, however, since the film thickness of the first half portion 14a of auxiliary recording layer 14 is fixed at 15 Å, in FIG. 28 the film thickness of 10 Å, for instance, on the abscissa indicates that the total film thickness of auxiliary recording layer 14 is 25 Å. At this film thickness, however, the characteristics are almost the same as when the second half portion 14b of auxiliary recording layer 14 is not formed. Rather, excellent magnetic field sensitivity characteristics may be obtained in the range from 20 Å to 45 Å of the second half portion 14b of auxiliary recording layer 14. Accordingly, when the film thickness is shown by adding the film thickness 15 Å of the first half portion 14a of auxiliary recording layer 14 to the second half portion 14b thereof, the excellent characteristics may be obtained within the film thickness range from 35 Å to 60 Å. The fact that the excellent magnetic field sensitivity may be obtained when the film thickness of second half portion 14b of auxiliary recording layer 14 is from 20 Å to 45 Å roughly matches the film thickness range wherein the excellent characteristics of the post-formation structure or the pre-formation structure may be obtained. In summary, in the combination of recording layer 13 and the auxiliary recording layer 14, it is important to form auxiliary recording layer 14 having a film thickness lying within this range, by itself.

Figure 29:
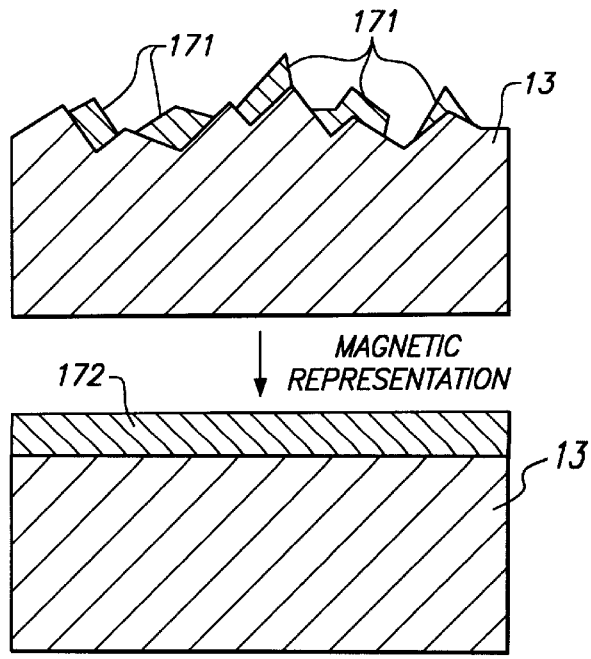
FIG. 29 is a model view showing the status where an ultra-thin auxiliary recording layer is laminated on the recording layer.

The feature of the magneto-optical recording medium according to this invention is to form auxiliary recording layer 14 with an ultra-thin film thickness of less than 70 Å. In order to form an extremely thin film which is continuous along the surface thereof, it is necessary to form the thin film under sufficiently controlled ideal conditions employing a mono-crystal substrate and limited combinations of elements. In the magneto-optical recording medium according to this invention, in practice, it is impossible to form the thin film under such limited conditions as above. As already explained, there exists a roughness of about several tens Å on the surface of the dielectric layer before the magnetic layers are formed. Therefore, even if auxiliary recording layer 14 as extremely thin as 70 Å or less is formed on the rough surface thereof, the possibility of manufacturing a continuous film is low, but rather it is regarded that a rough island structure as shown in FIG. 29 may be formed, wherein respective islands 171 of auxiliary recording layer 14 are separated from each other. From a magnetic point of view, however, islands 171 of auxiliary recording layer 14 are exchange-coupled to each other through intermediation or inter-coupling via recording layer 13, which layer is in contact with all of the islands 171. In other words, it is possible to regard auxiliary recording layer 14 as a virtual continuous, uniform magnetic film 172, although not physically a continuous layer.

Therefore, the magnetic field sensitivity characteristics during recording are determined on the basis of the characteristics of virtual continuous film 172 as auxiliary recording layer 14. The "composition" of virtual continuous film 172, which exerts an influence upon the magnetic field sensitivity characteristics, is regarded as an intermediate composition between recording layer 13 and auxiliary recording layer 14. This intermediate composition differs according to the film thickness of auxiliary recording layer 14, the manufacturing conditions of layer 14, and the arrangement of layer 14 in relation to recording layer 13. For instance, in the case of the intermediate-formation structure, since the upper and lower portions of islands 171 of auxiliary recording layer 14 are in contact with recording layer 13, the "composition" of the virtual continuous film 172 of auxiliary recording layer 14 is close to the composition of recording layer 13, as compared with the post-formation structure and the preformation structure in both of which islands 171 are in contact with recording layer 13 on one side thereof. Accordingly, the characteristics of the virtual continuous film 172 of auxiliary recording layer 14 is low in the Curie temperature, as compared with the post-formation and preformation structures, so that the effect of depressing the maze domains is reduced and thereby the increasing gradient of the carrier level becomes gentle. In other words, when auxiliary recording layer 14 is formed of a composition higher in content ratio of a heavy rare earth metals and Co, it is possible to manufacture the magneto-optical recording medium large in change of the carrier level even in the intermediate formation structure. Further, the phenomenon that the film thickness range of the second half portion 14b of auxiliary recording layer 14 wherein the magnetic field sensitivity characteristics are excellent in the final-formation, structure roughly matches the film thickness range wherein the same characteristics are excellent in the post-formation or preformation structure, is considered to be natural from the standpoint of the "composition" of the virtual continuous film 172 of auxiliary recording layer 14.

Figure 30:
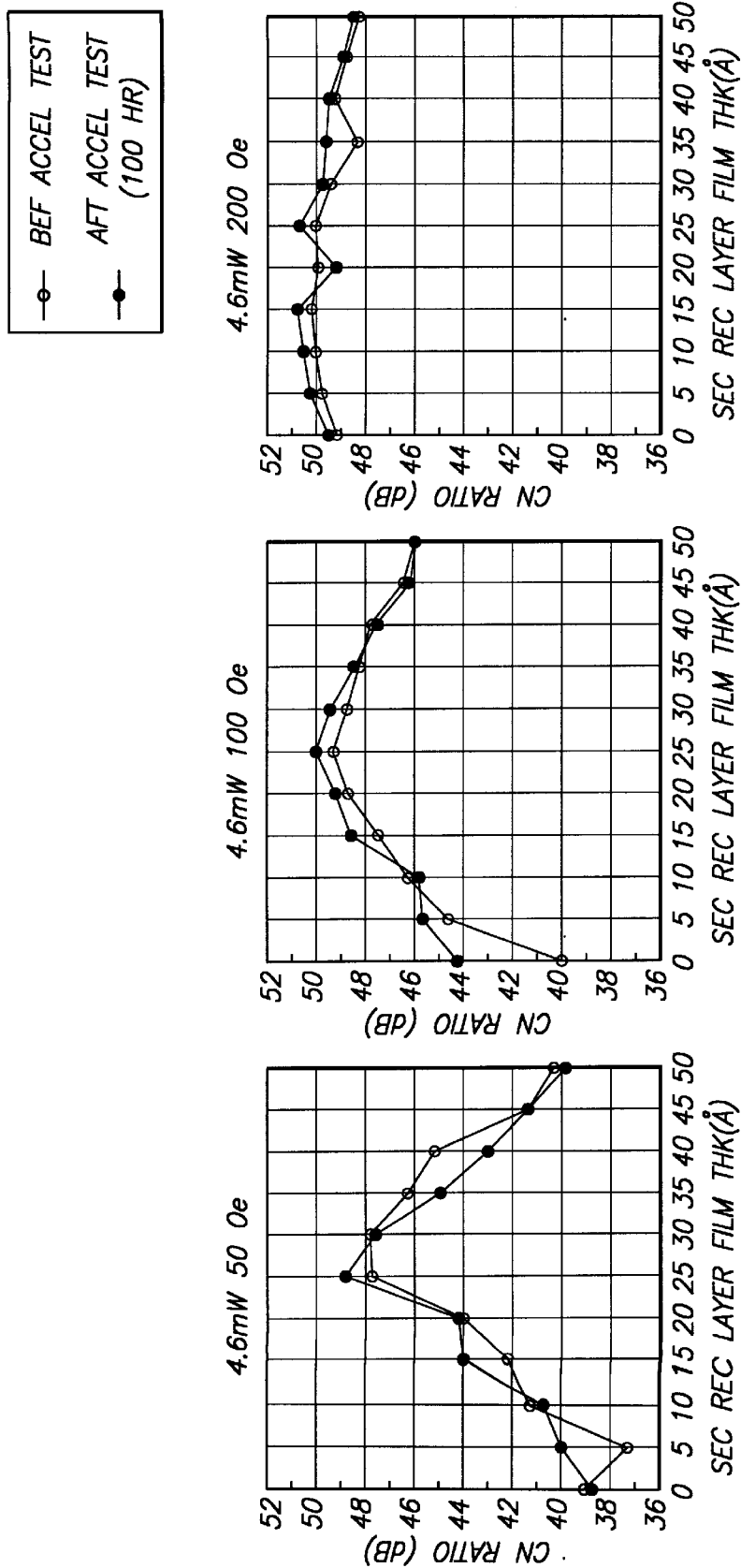
FIG. 30A, FIG. 30B and FIG. 30C are graphs showing the comparison of characteristics before and after a life test of the recording medium of pre-formation structure.

Further, the aging phenomenon of the magnetic field sensitivity characteristics of the magneto-optical recording medium was examined by life test, by changing the lamination structure of both recording layer 13 and auxiliary recording layer 14. The life test conditions were as follows: the temperature was 80° C.; the relative humidity was 90%; and the test time was 100 hours, 200 hours, 500 hours and 1,000 hours, respectively. The test results indicated that the aging phenomenon of the magnetic field sensitivity characteristics was very small in the pre-formation and the intermediate-formation structures. In other words, these structures are superior to the post-formation structure in this phenomenon. FIG. 30A, FIG. 30B and FIG. 30C show the magnetic field sensitivity characteristics obtained before and after the life test of 100 hours in the pre-formation structure, wherein, respectively, FIG. 30A shows the case when recorded at 4.6 mW and in 50 Oe; FIG. 30B shows the case when recorded at 4.6 mW and in 100 Oe; and FIG. 30C shows the case when recorded at 4.6 mW and in 200 Oe.

The preformation structure is provided with such advantages that not only the aging phenomenon thereof is very small, but also the structural relaxation due to repetitive recordings is small. In general, as the recording is repeated, the structural relaxation proceeds gradually, when the recording times exceeds one million and it becomes a noticeable problem. The experiments indicated that the preformation structure hardly cause the structural relaxation, as compared with the other formation structures.

(11) Examples Having Auxiliary Recording Layer Lower in Density Than Recording Layer

[EXAMPLE 21]

In this example, the density of auxiliary recording layer 14 is determined to be lower than that of recording layer 13 under the condition that both recording layer 13 and auxiliary recording layer 14 are formed of the same composition. Here, the lowering of density may be realized by decreasing the film deposition rate during the sputtering or by increasing the sputtering gas pressure.

In the structure as shown in FIG. 1, polycarbonate was employed for substrate 11; AlSiN was employed for first and second dielectric layers 12 and 15; TbFeCo was employed for recording layer 13 and auxiliary recording layer 14; and Al was employed for reflective layer 16. The film thicknesses were, respectively, 750 Å in first dielectric layer 12; 230 Å in recording layer 13; 30 Å in auxiliary recording layer 14; 250 Å in second dielectric layer 15; and 600 Å in reflective layer 16.

A sample, identified as Sample 1, was manufactured by determining the film deposition rate of auxiliary recording layer 14 lower than that of recording layer 13. First, first dielectric layer 12 was deposited on a polycarbonate substrate 11 by reactive sputtering with the employment of a SiAl alloy target. Further, recording layer 13 was deposited with the employment of a TbFeCo alloy target under the conditions that the argon pressure was 1.0 mTorr and the input power to the cathode was 2.0 kW. The film deposition rate thereof was 1.10 Å/sec. Successively, auxiliary recording layer 14 was deposited employing a TbFeCo target under the conditions that the argon pressure was 1.0 mTorr and the input power to the cathode was 0.5 kW. The film deposition rate thereof was 0.3 Å/sec. Further, second dielectric layer and reflective layer 16 were formed by reactive sputtering.

In addition, another sample, identified as Sample 2, was manufactured by determining the argon gas pressure in depositing auxiliary recording layer 14 higher than that in depositing recording layer 13. In more detail, first dielectric layer 12 was deposited on a polycarbonate substrate 11 by reactive sputtering with the employment of a SiAl alloy target, and further recording layer 13 was deposited with the employment of a TbFeCo alloy target under the conditions that the argon pressure was 1.0 mTorr and the input power to the cathode was 2.0 kW. Successively, auxiliary recording layer 14 was deposited with the employment of the same TbFeCo target under the conditions that the argon pressure was 10.0 mTorr and the input power to the cathode was 2.0 kW. Thereafter, second dielectric layer 15 and reflective layer 16 were deposited by reactive sputtering.

In addition, a third sample or Sample 3 was manufactured by determining the film deposition rate and the argon gas pressure in depositing auxiliary recording layer 14 lower and higher than those in depositing recording layer 13, respectively. In more detail, first dielectric layer 12 was deposited on a polycarbonate substrate 11 by reactive sputtering with the employment of a SiAl alloy target, and further recording layer 13 was deposited with the employment of a TbFeCo alloy target under the conditions that the argon pressure was 1.0 mTorr and the input power to the cathode was 2.0 kW. Successively, auxiliary recording layer 14 was deposited with the employment of the same TbFeCo target under the conditions that the argon pressure was 5.0 mTorr and the input power to the cathode was 1.0 kW. Thereafter, second dielectric layer 15 and reflective layer 16 were deposited by reactive sputtering.

Furthermore, the other sample, i.e, a Comparative Sample, was manufactured of the same composition and under same conditions as Samples 1 to 3, except the film thickness of recording layers 13 was 260 Å and no auxiliary recording layer 14 was formed.

For the samples manufactured as described above, magnetic field modulation recording was made under the conditions that the linear recording velocity was 1.4 m/sec, the recording frequency was 720 kHz, the recording laser power was 4.5 mW, the modulated magnetic field amplitudes was 4.0 kA/m, 6.4 kA/m and 8.8 kA/m, respectively, and thereafter reproducing from the recorded media was made under the condition that a reproducing laser power was 0.7 mW. Table 21 lists the CN ratios of these reproduced signals.

Table 21 indicates that the CN ratios of Samples 1, 2 and 3 are higher than that of the Comparative Sample. Further, in Samples 1 to 3, since the CN ratios are almost saturated at 6.4 kA/m of the modulated magnetic field amplitude, their recording characteristics are suitable for the magnetic field modulation recording.

As described above, in the case where recording layer 13 and auxiliary recording layer 14 are formed by the same composition and further the density of auxiliary recording layer 14 is lower than that of recording layer 13, it has been confirmed that the magnetic field sensitivity may be improved in the magnetic field modulation recording.

Further, the following sputtering conditions are effective to reduce the density of auxiliary recording layer 14:

(a) At the film deposition rate ¹⁄₂₀ to ²⁄₃ times lower than the film deposition rate of recording layer 13, and/or (b) Under a sputtering gas pressure 2 to 20 times higher than that employed when recording layer 13 is deposited at the film deposition rate of recording layer 13.

TABLE 21

|  | 4.0 kA/m | 6.4 kA/m | 8.0 kA/m |
| --- | --- | --- | --- |
| SAMPLE 1 | 48.0 dB | 51.5 dB | 51.9 dB |
| SAMPLE 2 | 48.5 dB | 51.7 dB | 52.0 dB |
| SAMPLE 3 | 48.8 dB | 51.8 dB | 52.0 dB |
| COMPARATIVE SAMPLE | 43.5 dB | 47.8 dB | 49.0 dB |

(12) Example Employing Transition Metal for Auxiliary Recording Layer

[EXAMPLE 22]

An example employing Fe, Co or Ni for auxiliary recording layer 14 will now be described.

The cross-sectional structure of this example of the magneto-optical recording medium belongs to that shown in FIG. 1 or that formed with no reflective layer 16. As the substrate material, glass or polycarbonate may be employed, and recording layer 13 is formed of an appropriate rare-earth transition-metal alloy by the sputtering. After recording layer 13 has been deposited, auxiliary recording layer 14 with a thickness less than 70 Å is deposited by sputtering or by evaporating any one of Fe, Co or Ni. Here, the thickness less than 70 Å is determined by controlling the film depositing time on the basis of the film deposition rate which has been calculated from the values of the film thickness deposited per unit time when any one of Fe, Ni or Co film was deposited to a thickness greater than 70 Å, e.g., 1,000 Å. In the thin film as thin as 70 Å or less, the film thickness is not uniform, but formed into island structure. When the dielectric layer is further deposited on the thin film of island structure, auxiliary recording layer 14 is composed of portions wherein recording layer 13 and the dielectric layer are directly in contact with each other, and portions wherein auxiliary recording layer 14 of island structure formed of any one of Fe, Ni or Co is sandwiched between recording layer 13 and dielectric layer 15.

Figure 31:
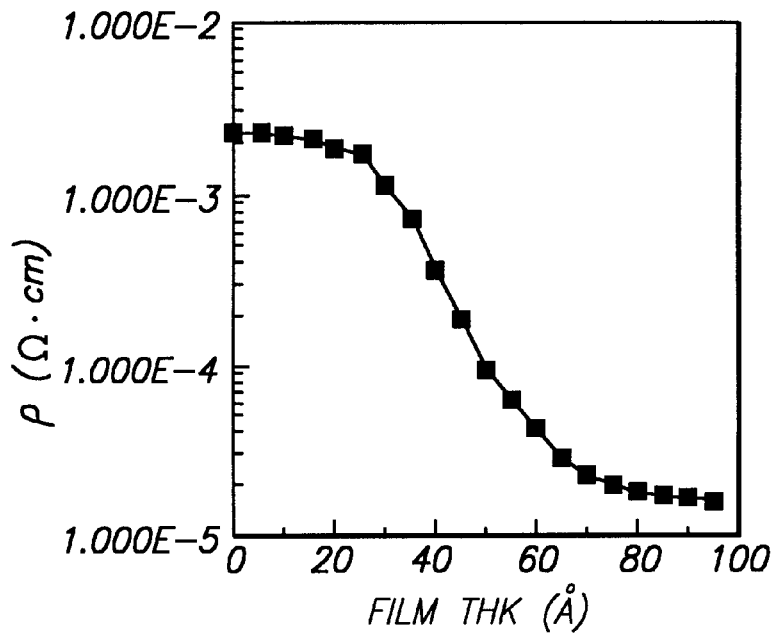
FIG. 31 is a graph showing the dependence of the electric resistivity upon the film thickness of an iron thin film.

FIG. 31 shows the relationship between the film thickness of this island structure and the measured electric resistivity of the Fe thin film. The samples were formed as follows. The SiAlN dielectric film with a thickness of 700 Å was deposited on a quartz glass substrate by magnetron sputtering, and further Fe was deposited by the same magnetron sputtering for a time corresponding to each of the film thicknesses shown in FIG. 31. The electric resistivity was measured at room temperature employing the four-probe method. FIG. 31 indicates that the electric resistivity thereof decreases gradually with increasing film thickness up to 30 Å, then decreases sharply and then saturated at the film thickness beyond 70 Å. Therefore, it is possible to estimate that the Fe film is not formed uniformly in the film thickness range wherein the electric resistivity is not yet saturated.

The magnetic field modulation recording and reproducing test was made for the samples formed as described above. In the substrate employed for the samples, the material was polycarbonate; the track pitch was 1.6 μm; and the substrate has the guide groove and the thickness of the substrate was 1.2 mm, without forming any pre-pits. On substrate 11 as described above, a SiN layer with a film thickness of 600 Å was formed as dielectric layer 12; an NdDyFeCo layer with a film thickness of 200 Å was formed as recording layer 13;

and an Fe layer was formed as auxiliary recording layer 14 by changing the film formation time. In addition, a SiN layer with a film thickness of 200 Å was laminated as the dielectric layer, and an AlTi layer with a film thickness of 600 Å was laminated as the reflective layer in sequence. Auxiliary recording layer 14 was formed by both magnetron sputtering and evaporation, but the other layers were formed by only magnetron sputtering. The wavelength of the irradiated laser beam was 780 nm; the recording laser beam power was 6 mW constant; and the reproducing laser beam power was 1 mW. The revolution velocity of the disk was 1,800 rpm; the recording was made at the radius of about 30 mm; and the linear recording velocity was 5.65 m/s. The magnetic field modulation recording head was floated on the reflective layer side at an average floating height of about 7 µm.

Figure 32:
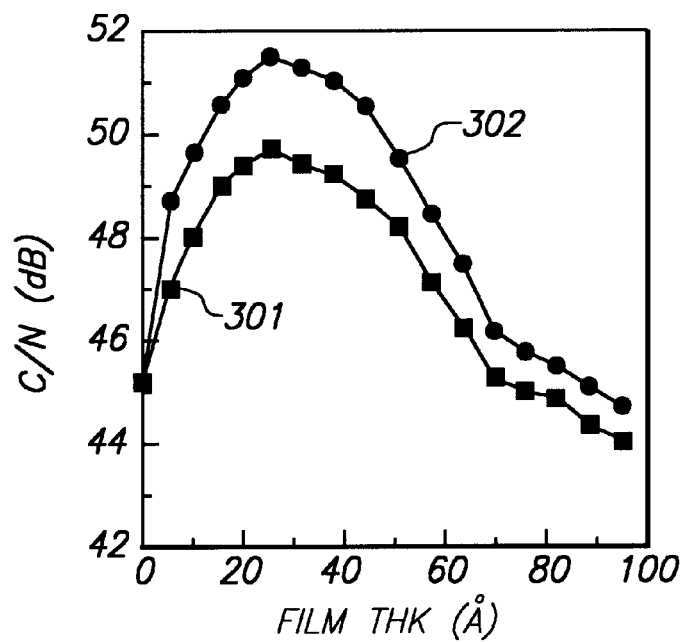
FIG. 32 is a graph showing the dependence of the carrier to noise ratio upon the film thickness of an iron auxiliary recording film.

FIG. 32 shows the test results, wherein the CN ratios (carrier-to-noise ratios) are plotted for each of the film thicknesses of the auxiliary recording layer when recorded at the modulated magnetic field of ±40 Oe. Since the CN ratios of all the samples are not saturated at this magnetic field modulation recording, the CN ratios shown in FIG. 32 correspond to the magnetic field sensitivity. Further, when the modulated magnetic field was increased, the CN ratios of all the samples were saturated to about 52.5 dB. Curve 301 in FIG. 32 shows the result of depositing the Fe auxiliary recording layer 14 by the DC magnetron sputtering, and curve 302 in FIG. 32 shows the result of depositing the Fe auxiliary recording layer 14 by physical evaporation. Both curves 301 and 302 indicate that the magnetic field sensitivity may be improved in the range of 70 Å or less thickness of auxiliary recording layer 14, as compared with the case where no auxiliary recording layer 14 is formed. In particular, the highest CN ratio may be obtained in the film thickness range between 20 Å and 30 Å.

Further, the same experiment was made on the auxiliary recording layers formed of Co and of Ni by the same manufacturing method as above, except that the auxiliary recording layers 14 were deposited only by DC magnetron sputtering.

Figure 33:
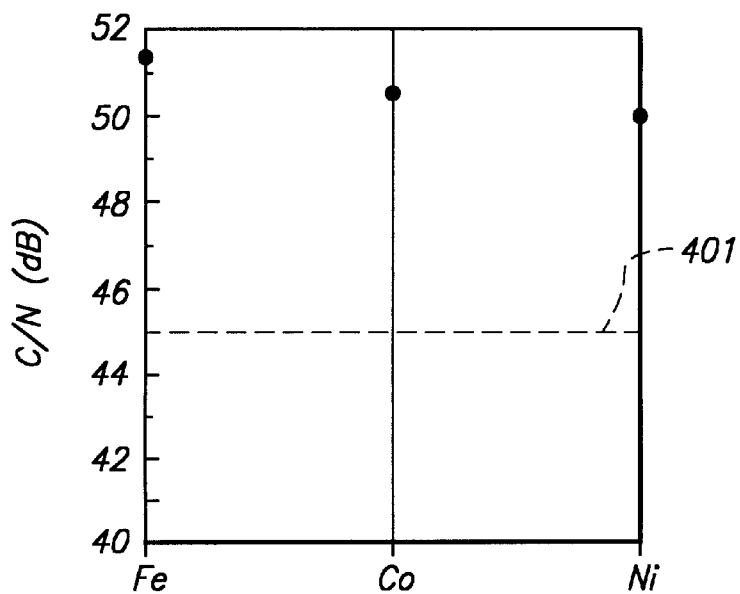
FIG. 33 is a graph showing the carrier to noise ratios of an iron, cobalt and nickel auxiliary recording films, respectively.

FIG. 33 shows three CN ratios obtained when the samples having auxiliary recording layer 14 having a film thickness of 30 Å and formed of Fe, Co or Ni respectively were recorded by the modulated magnetic field of ±40 Oe. Since the CN ratios of all the samples were not saturated at the modulated magnetic field of ±40 Oe, FIG. 33 shows the magnetic field sensitivity of the sample, respectively. In FIG. 33, dashed line 401 represents the CN ratio of the samples having no auxiliary recording layer 14. As compared with this dashed line, it is understood that when auxiliary recording layer 14 of any material of Fe, Co or Ni is formed, the magnetic field sensitivity may be improved.

(13) Examples Employing Non-magnetic Metal for Auxiliary Recording Layer

[EXAMPLE 23]

In this example, Pt, Al, Ti or Cr is employed as auxiliary recording layer 14 in the structure as shown in FIG. 1. Glass or polycarbonate may be employed for substrate 11, and substrate 11 is not necessarily transparent. Further, SiN, SiAlN, etc. are usable as dielectric layers 12 and 15. Recording layer 13 may be formed of a rare-earth transition-metal amorphous alloy by sputtering. Auxiliary recording layer 14 is deposited by sputtering any one of Pt, Al, Ti or Cr so as to have a film thickness of 70 Å or less, after the recording layer has been deposited. Further, in the case of an ultra-thin film less than 70 Å, the film thickness may not be formed uniformly but into the island structure.

Figure 34:
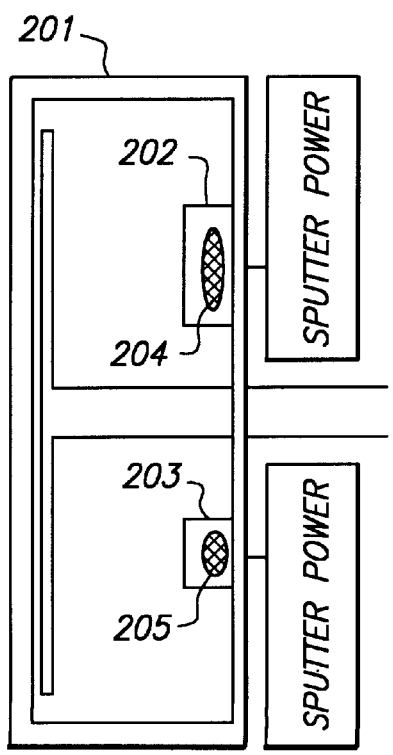
FIG. 34 is a cross-sectional view showing an apparatus for manufacturing a twenty third example of the magneto-optical recording medium according to this invention.

In the sputtering apparatus employed in the manufacture the magneto-optical recording medium of this example, shown in FIG. 34, recording layer target 202 and auxiliary recording layer target 203 are both provided in sputtering chamber 201 to effect magnetron sputtering. Since the film thickness of the auxiliary recording layer is extremely thin, the target area of target 203 for forming the auxiliary recording layer is determined smaller than that of the other target for forming the recording layer so that the film thickness per unit sputtering time may be reduced.

The sputtering gas pressure is related to the minute structure of the thin film. In particular, since the film thickness of auxiliary recording layer 14 is thin to such an extent as to correspond to a layer formed by about 30 atoms, the minute structure is significantly subjected to the influence of the sputtering gas pressure. In other words, when the sputtering gas pressure is low, since the plasma density decreases, the sputtering is disabled. In this case, however, the plasma density may be increased by increasing the leakage magnetic field toward the target surface during magnetron sputtering. The magnetic flux density on the surface of the target may be increased by determining the spontaneous magnetization of a ferromagnetic ring 205 attached on the back surface of the target for forming the auxiliary recording layer so as to be equal or larger than that of ferromagnetic ring 204 attached to the other target for forming the recording layer. In this case, since the thin film thickness of the auxiliary recording layer may be controlled in a wide gas pressure range, it is possible to finely control the minute structure of the auxiliary recording layer in dependence upon the sputtering gas pressure.

It is not necessarily required that the sputtering chamber for forming the recording layer is the same as that for forming the auxiliary recording layer. In the case of the same chamber, it is preferable to provide shutters for covering the targets, respectively, in order to prevent particles emitted from one target from adhering to the surface of the other target.

Figure 35:
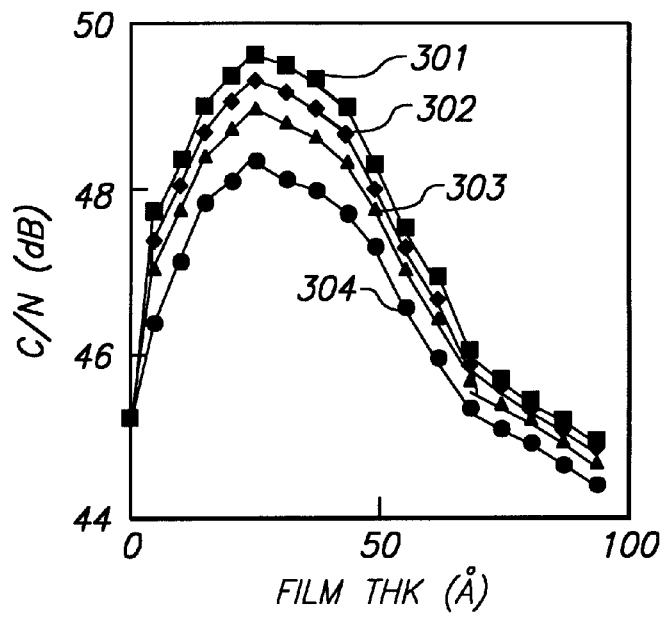
FIG. 35 is a characteristic graph showing the relationship between the film thickness and the CN ratio of the auxiliary recording layer in the twenty third example.

FIG. 35 shows the test results, wherein the effect of the film thickness of the auxiliary recording layer upon the magnetic field sensitivity is shown with respect to the samples of the magneto-optical recording medium manufactured by the above-described apparatus. These samples were manufactured as follows: an NdDyFeCo film with a film thickness of 200 Å was formed as first dielectric layer 12 on substrate 11 formed with a 1.6 µm guide groove by sputtering under Ar gas pressure of 2.0 mTorr; a Pt, Al, Ti or Cr was formed as auxiliary recording layer 14 by sputtering under gas pressure of 2.0 mTorr and by power of 100 W; a SiAlN film was formed as second dielectric layer 15; and further reflective layer 16 with a thickness of 600 Å was formed. The recording conditions were that the linear velocity was 1.4 m/s, the laser power was 4.5 mW, the magnetic field modulation recording frequency was 750 kHz, the duty factor was 50%, and the generated magnetic field was ±40 Oe. Further, the recorded data was reproduced with a laser power of 0.7 mW.

[EXAMPLE 24]

The influence of the sputtering gas pressure upon the magnetic field sensitivity was examined. A Pt film, which has the highest magnetic field sensitivity in Example 23, was formed as auxiliary recording layer 14. The manufacturing, recording and reproducing conditions were as same as in Example 23, except for the sputtering gas pressure under which auxiliary recording layer 14 was formed. The sputtering gas pressure was, respectively, changed to 2.0 mTorr, 0.3 mTorr and 4.0 mTorr.

Figure 36:
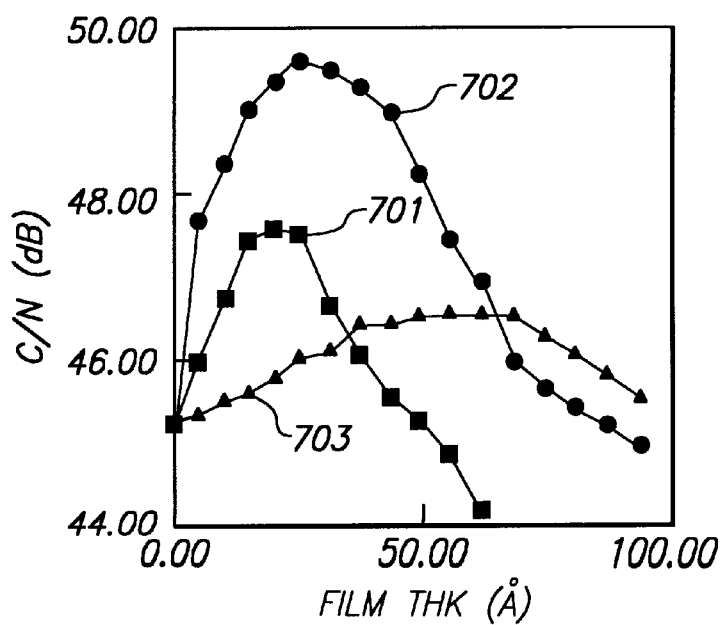
FIG. 36 is a characteristic graph showing the relationship between the film thickness and the CN ratio of the auxiliary recording layer in a twenty fourth example.

FIG. 36 shows the experimental results of the CN ratio at the modulated magnetic field of ±40 Oe, wherein curve 701 corresponds to 0.3 mTorr; curve 702 corresponds to 2.0 mTorr; and curve 703 corresponds to 4.0 mTorr, respectively. At the pressure of 0.3 mTorr, shown in curve 701, the film thickness range wherein the magnetic field sensitivity may be improved is as narrow as 40 Å or less. At the pressure of 4.0 mTorr, shown in curve 703, although the film thickness range wherein the magnetic field sensitivity may be improved is wide, the magnetic field sensitivity cannot be improved markedly. In this example, under the pressure of 2.0 mTorr, shown in curve 702, the magnetic field sensitivity may be improved markedly in a wide film thickness range.

[EXAMPLE 25]

Figure 37:
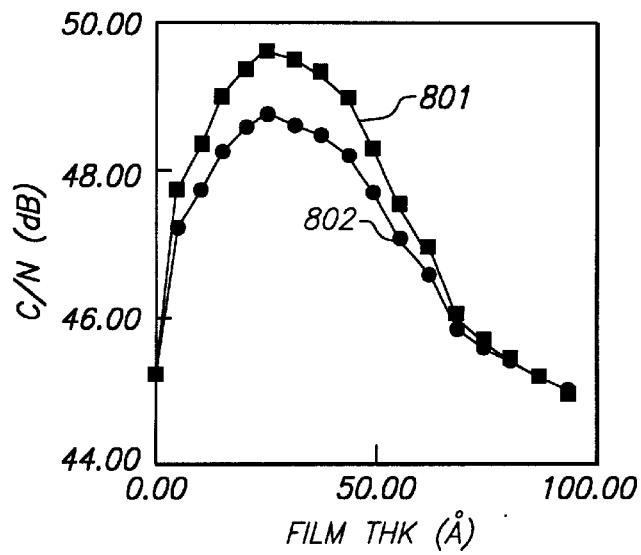
FIG. 37 is a characteristic graph showing the relationship between the film thickness and the CN ratio of the auxiliary recording layer in a twenty fifth example.

As auxiliary recording layer 14, an alloy containing 40% Pt was employed. FIG. 37 shows the dependence of the film thickness upon the CN ratio of when recorded at the modulated magnetic field of 40 Oe, wherein curve 802 shows the test results obtained when auxiliary recording layer 14 was formed by a composition containing 40% Pt, and curve 801 shows the test results obtained when auxiliary recording layer 14 was formed by 100% Pt,. FIG. 37 indicates that when Pt alloy is employed for the auxiliary recording layer, the magnetic field sensitivity may be improved without damaging the characteristics of the recording layer.

[EXAMPLE 26]

Figure 38:
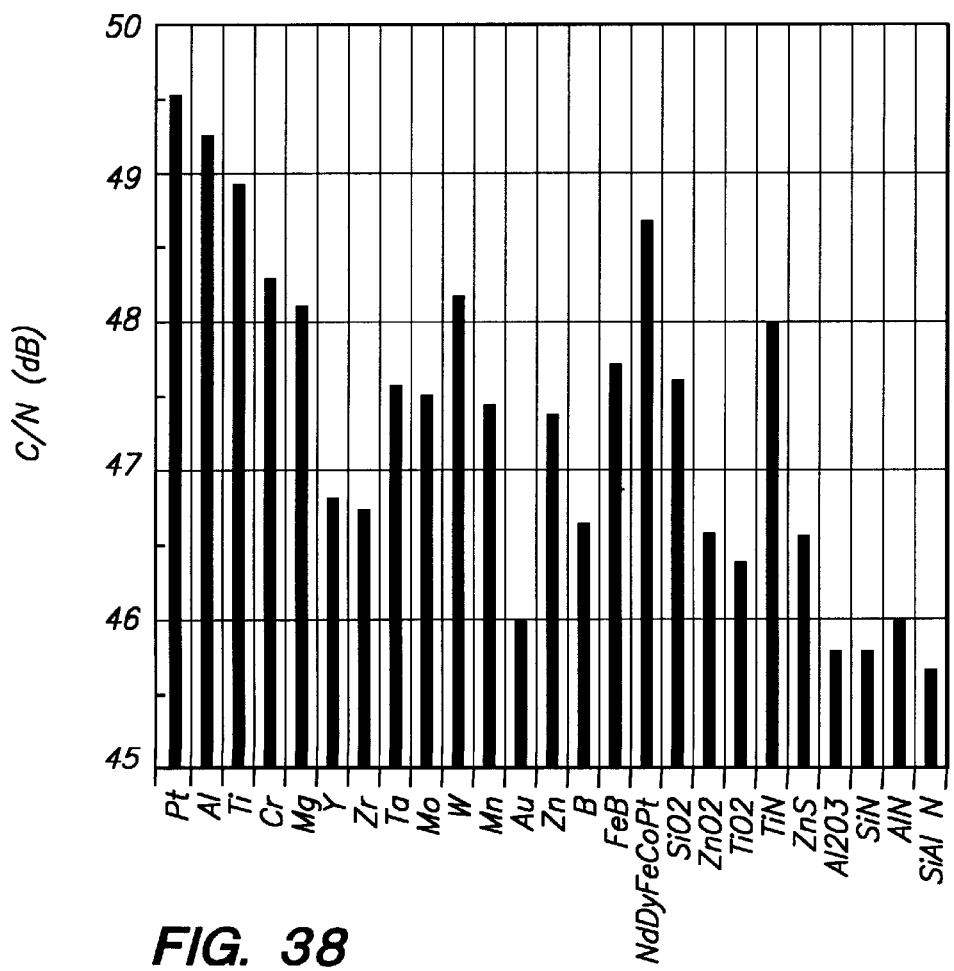
FIG. 38 is a graph showing the respective magnetic field sensitivities according to the substance of the auxiliary recording layer in a twenty sixth example.

FIG. 38 shows the magnetic field sensitivity obtained when various substances so far employed for the abovementioned examples and other substances are employed for the auxiliary recording layer. Auxiliary recording layer 14 was formed under sputtering gas pressure of 2 mTorr. In this sputtering, the conductive target was formed by the DC magnetron sputtering, and the other targets were formed by the high frequency (RF) sputtering. FIG. 38 shows the maximum CN ratio obtained at the optimum film thickness, that is, the CN ratio at the modulated magnetic field of ±40 Oe becomes the maximum. Further, in the case of SiAlN shown in FIG. 38, after a SiAlN film with a thickness of 20 Å has been formed on recording layer 13, the sputtering was stopped once, and thereafter the SiAlN was formed again.

FIG. 38 indicates that the magnetic field sensitivity may be improved in the case of any materials.

(14) Examples Employing Alloy Containing Nitrogen for Auxiliary Recording Layer

Examples employing a rare-earth transition-metal alloy containing nitrogen for the auxiliary recording layer will now be described.

[EXAMPLE 27]

In the structure as shown in FIG. 1, polycarbonate was employed for substrate 11; AlSiN was employed for dielectric layers 12 and 15; DyTbFeCo was employed for recording layer 13; a composition obtained by nitrizing the composition the same as recording layer 13 was employed for auxiliary recording layer 14; Al was employed for reflective layer 16; and further the formed sample was covered by a photo-polymerization resin as a protective layer. Further, variations other than above-mentioned material may be employed as follows: substrate 11 may be formed of glass, 2P, amorphous polyolefin, etc.; dielectric layers 12 and 15 may be formed of SiN, AlO, SiO, ZrO, AlN, etc.; and recording layer 13 may be formed of various rare-earth transition-metal alloys, such as, TbFe, DyFe, DdTbFe, GdTbFe, GdDyTbFe, TbFeCo, NdDyFeCo, PrDyFeCo, etc.

The samples of the magneto-optical recording media of the above structure were manufactured as follows:

First, to clean polycarbonate substrate 11, substrate 11 was etched for 20 sec by the RF plasma etching under the conditions that the sputtering gas was Ar, the gas pressure was 1 mTorr, and the input power was 50 W.

Further, first dielectric layer 12 with a thickness of 600 Å was formed of AlSiN on substrate 11 by the RF magnetron sputtering under the conditions that the sputtering gas was Ar 60%+$N_2$ 40%, the gas pressure was 1.5 mTorr, and the input power was 1 kW. Further, recording layer 13 was formed of a composition of Nd 5.4 at%, Dy 15.7 at%, Tb 5.1 at%, Fe 58.5 at%, Co 15.3 at% on substrate 11 by the DC magnetron sputtering under the conditions that the sputtering gas was Ar, the gas pressure was 1.5 mTorr, and the input power was 300 W. The samples were manufactured by changing the film thickness of recording layer 13 from 200 Å to 270 Å at intervals of 10 Å.

Then, the surface layer of recording layer 13 was nitrized by holding substrate 11 in a electric discharging space employing the rare-earth transition-metal alloy target as a cathode, under the conditions that the sputtering gas was Ar 60%+$N_2$ 40%, the gas pressure was 1.5 mTorr, and the input power was 300 W. The nitrization rate was determined by the qualitative analysis according to the auxiliary ion mass spectrometry (SIMS) in the depth direction. The nitrization rate will be represented hereinafter by the layer thickness at which nitrogen may be detected in accordance with the SIMS. Further, in any samples, the sputtering time was adjusted so that the film thickness of recording layer 13 remaining as being not nitrized became 200 Å. As described above, the samples were manufactured in such a way that auxiliary recording layers 14 formed of the composition obtained by nitrizing recording layer 13 and having the respective film thicknesses from 0 Å to 70 Å at intervals of 10 Å were formed on recording layer 13 with a thickness of 200 Å.

Thereafter, second dielectric layer 15 of AlSiN with a thickness of 200 Å was formed thereon by the RF magnetron sputtering under the condition that the sputtering gas was Ar 60%+$N_2$ 40%, the gas pressure was 1.5 mTorr, and the input power was 1 kW. Further, the reflective layer 6 of Al was formed thereon by the DC magnetron sputtering under the conditions that the sputtering gas was Ar, the gas pressure was 2.0 mTorr, and the input power was 300 W. Further, a photo-polymerization resin was applied by 10 μm as a protective coat by spin coating. With respect to the samples of the magneto-optical recording media manufactured as described above, the magnetic field sensitivity was examined under the following recording conditions: the substrate revolution velocity was 1,800 rpm, the recording radial position was 30 mm, the recording frequency was 3.7 MHz, the recording laser power was 7 mW, and the recording magnetic field applied was from 0 to 300 Oe. Further, the reproducing laser power was 1.0 mW.

Figure 39:
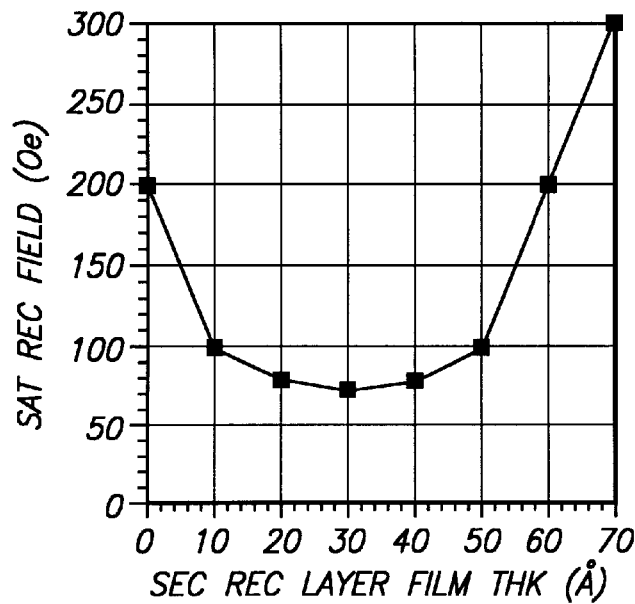
FIG. 39 is a characteristic graph showing the relationship between the recording magnetic field intensity and the film thickness of the auxiliary recording layer in a twenty seventh example.

FIG. 39 shows the relationship between the film thickness of auxiliary recording layer 14 and the recording magnetic field intensity at which the CN ratio is saturated. FIG. 39 indicates that as compared with the conventional medium having no auxiliary recording layer 14, the magnetic field sensitivity may be improved when the film thickness of auxiliary recording layer 14 lies in a range from 10 Å to 50 Å, more preferably in a range from 20 Å to 40 Å, that is, the CN ratio may be saturated by a low magnetic field.

Further, the same experiment as above was made of the cases where a single auxiliary recording layer 14 was formed before forming recording layer 13, or auxiliary recording layers 14 were formed on both sides of recording layer 13. In those cases, respectively, the magnetic field sensitivity was improved in the same manner.

[Comparative Example 2]

The same experiment similar to Example 27 was made for the samples wherein auxiliary recording layer 14 was formed by oxidizing recording layer 13, instead of nitrizing the same layer.

After recording layer 13 had been formed by the same process as Example 27, recording layer 13 was oxidized by holding substrate 11 in a electric discharging rate employing the rare-earth transition-metal alloy target as a cathode, under the conditions that the sputtering gas was Ar 99%+O 21%, the gas pressure was 1.5 mTorr, and the input power was 300 W. The other manufacturing steps were the same as the case of Example 27.

The magnetic field sensitivity characteristics of the samples of the magneto-optical recording media manufactured as described above were tested, and the test results similar to those of Example 27 were obtained.

Being different form nitrogen, however, since oxygen tends to form oxide by reacting with the rare-earth transition-metal alloy, it was difficult to control the film thickness of auxiliary recording layer 14. Further, since the partial pressure of oxygen required for oxidization was low, the influence of oxygen in the residual gas was serious. Further, since the reaction occurred when oxygen gas was only introduced into the chamber, it was difficult to control the reaction. Accordingly, the production yield on the basis of the acceptance criterion that the magnetic field at which the CN ratio is saturated is 100 Oe or less, was as low as 40% when oxygen was employed, while 95% obtained when nitrogen was employed as with the case of Example 27.

Further, an endurance test was performed with respect to of samples having the auxiliary recording layers with a film thickness of 30 Å formed of the rare-earth transition-metal alloy containing nitrogen and the rare-earth transition-metal alloy containing oxygen, respectively. The conditions of the endurance test were that the temperature and humidity were fixed at 80° C. and 90%, respectively. The aging phenomenon of the bit error rate was measured by use of a bit error rate measuring apparatus.

Figure 40:
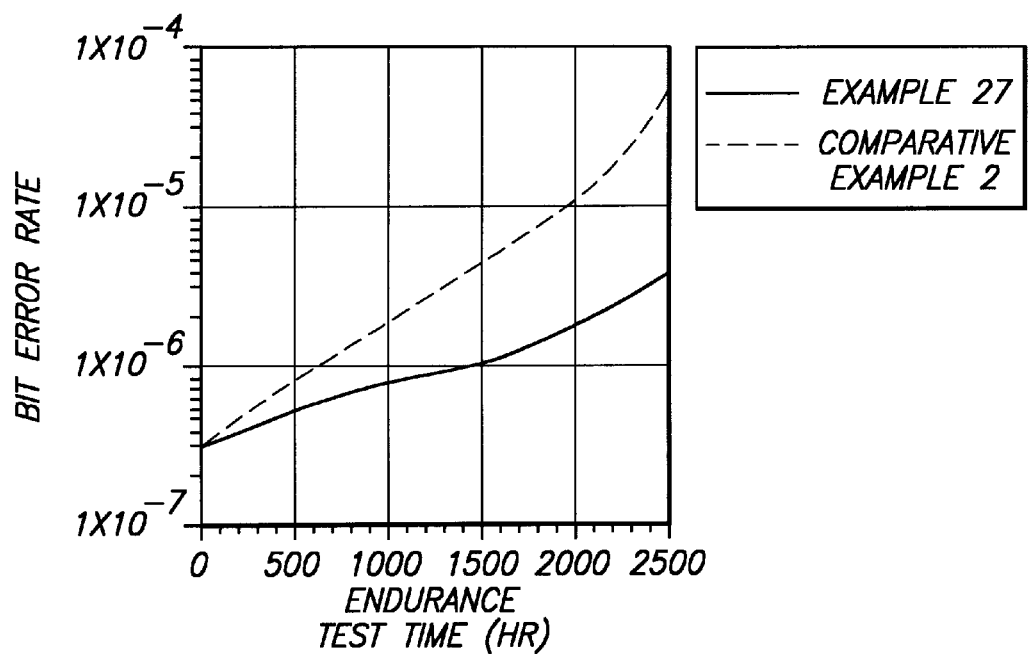
FIG. 40 is a graph showing the endurance test results of the twenty seventh example and the second comparative example of the magneto-optical recording medium.

FIG. 40 shows the endurance test results, which indicates that the magneto-optical recording medium employing nitrogen is superior in durability to the medium employing oxygen. The above-mentioned results may be due to the fact that in the case of the rare-earth transition-metal alloy containing oxygen, since the rare earth is active to oxygen, the magnetic characteristics are deteriorated markedly due to diffusion of oxygen. In contrast with this, in the case of the rare-earth transition-metal alloy containing nitrogen, the influence of diffusion of nitrogen is not only small, but also the nitrogen serves to protect the recording layer.

[EXAMPLE 28]

After recording layer 13 had been formed in the same process as with the case of Example 27, auxiliary recording layer 14 was formed by holding the substrate within a gas atmosphere containing nitrogen in order to nitrize the surface layer of recording layer 13.

In other words, in the same process as with the case of Example 27, recording layer 13 of a composition of Nd 5.4 at%, Dy 15.7 at%, Tb 5.1 at%, Fe 58.5 at%, Co 15.3 at% was formed on substrate 11 by changing the film thickness thereof from 200 Å to 270 Å at intervals of 10 Å.

Further, the surface layer of recording layer 13 was nitrized by holding the substrate within a gas atmosphere of Ar 60%+$N_2$ 40% and under a gas pressure of 1.5 mTorr. The nitrization rate was measured by the SIMS. The holding time was adjusted in any samples in such a way that the film thickness of recording layer 13 remaining as being not nitrized became 200 Å. The sample formed with auxiliary recording layer 14 nitrized as described above was manufactured by changing the film thickness thereof from 0 Å to 70 Å at intervals of 10 Å.

In the same process as with the case of Example 27, second dielectric layer 15, reflective layer 16 and the protective coat were formed.

The samples of the magneto-optical recording media manufactured as described above were tested for magnetic field sensitivity, and the test results achieved were similar to those of Example 27.

Figure 41:
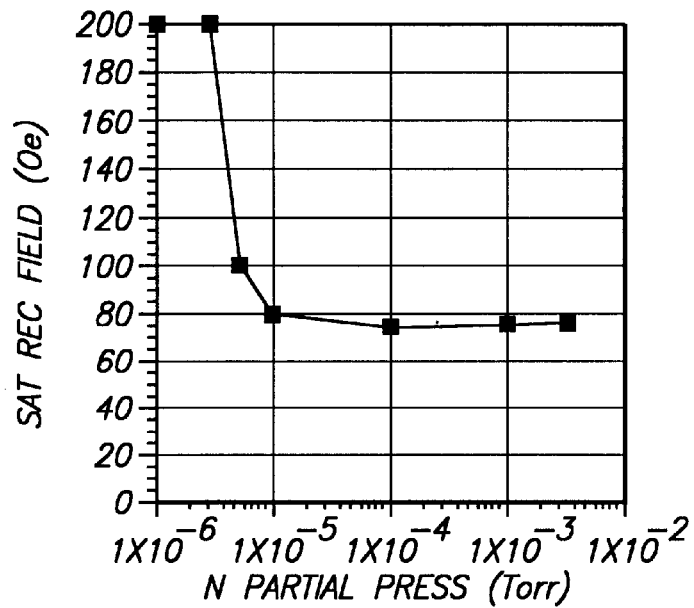
FIG. 41 is a characteristic graph showing the relationship between the partial pressure of nitrogen and the saturated recording magnetic field intensity in a twenty eighth example.

Further, in the above manufacturing process, the partial pressure of nitrogen gas Ar+$N_2$ for nitrizing the recording layer was changed to check the influence of the nitrogen partial pressure upon magnetic field sensitivity. FIG. 41 shows the test results, which indicate that magnetic field sensitivity may be improved when the nitrogen partial pressure is lower than $5 \times 10^{-6}$ Torr.

[EXAMPLE 29]

After recording layer 13 had been formed in the same process as with the case of Example 27, recording layer 13 was nitrized by the plasma etching within a gas atmosphere containing nitrogen in order to form auxiliary recording layer 14 by nitrizing the surface layer of recording layer 13.

In other words, in the same process as with the case of Example 27, recording layer 13 of a composition of Nd 5.4 at%, Dy 15.7 at%, Tb 5.1 at%, Fe 58.5 at%, Co 15.3 at% was formed on substrate 11 by changing the film thickness thereof from 200 Å to 270 Å at intervals of 10 Å in the same way as in Example 27.

Further, the surface layer of recording layer 13 was nitrized by the plasma etching within a gas atmosphere of Ar 60%+$N_2$ 40% under the conditions that the gas pressure was 1.5 mTorr and the input power was 50 W. The sample wherein auxiliary recording layer 14 nitrized as described above was formed on recording layer 13 with a film thickness of 200 Å was manufactured by changing the film thickness of auxiliary recording layer 14 from 0 Å to 70 Å at intervals of 10 Å. The nitrization depth thereof was determined by the SIMS.

In the same process as with the case of Example 27, second dielectric layer 15, the layer 16 and the protective coat were formed.

The samples of the magneto-optical recording media manufactured as described above were tested for magnetic field sensitivity, and the test results achieved were similar to those of Example 27.

Figure 42:
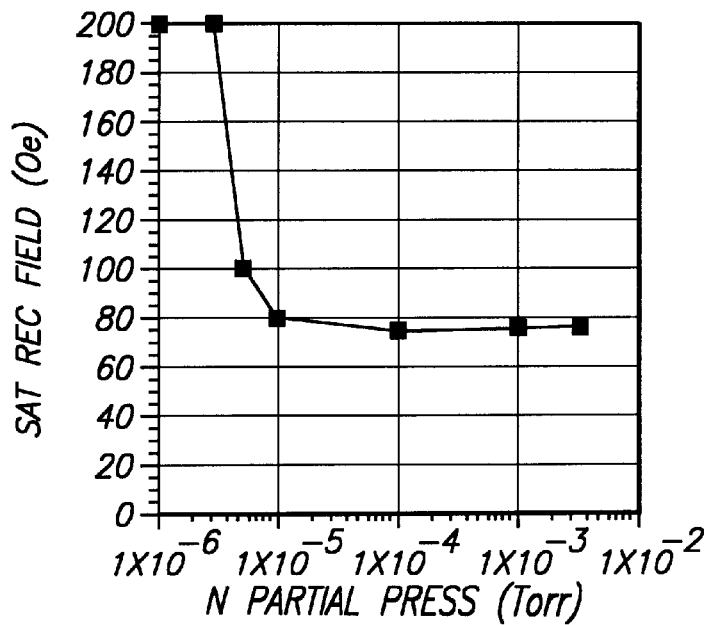
FIG. 42 is a characteristic graph showing the relationship between the partial pressure of nitrogen and the saturated recording magnetic field intensity in a twenty ninth example.

Further, in the above manufacturing process, the partial pressure of nitrogen gas during the RF plasma etching for nitrization was changed to check the influence of the nitrogen partial pressure upon magnetic field sensitivity. FIG. 42 shows the test results, which indicate that magnetic field sensitivity may be improved when the nitrogen partial pressure is lower than $5 \times 10^{-6}$ Torr.

[EXAMPLE 30]

After recording layer 13 had been formed in the same process as with the case of Example 27, auxiliary recording layer 14 containing nitrogen was deposited on recording layer 13 by DC magnetron sputtering. In other words, in the same process as in the case of Example 27, recording layer 13 having a film thickness of 200 Å and a composition of Nd 5.4 at%, Dy 15.7 at%, Tb 5.1 at%, Fe 58.5 at%, Co 15.3 at% was formed.

Further, auxiliary recording layer 14 of a rare-earth transition-metal alloy layer containing nitrogen was formed, by DC magnetron sputtering employing a rare-earth transition-metal alloy target in a gas atmosphere of Ar 98%+$N_2$ 2% under the conditions that the gas pressure was 1.5 mTorr and the input power was 300 W, by changing the film thickness of the rare-earth transition-metal alloy layer from 0 Å to 70 Å at intervals of 10 Å.

The remaining steps were the same as with the case of Example 27.

The samples of the magneto-optical recording media manufactured as described above were tested for magnetic field sensitivity, and the test results achieved were similar to those of Example 27.

[EXAMPLE 31]

In the same process as with the case of Example 30, auxiliary recording layer 14 was formed by DC magnetron sputtering. In this sputtering, a rare-earth transition-metal alloy containing nitrogen was employed as the target, without adding nitrogen to the gas. In other words, after recording layer 13 having a film thickness of 200 Å and a composition of Nd 5.4 at%, Dy 15.7 at%, Tb 5.1 at%, Fe 58.5 at%, Co 15.3 at% had been formed, auxiliary recording layer 14 of a rare-earth transition-metal alloy layer containing nitrogen was formed, by DC magnetron sputtering employing a rare-earth transition-metal alloy target in a gas atmosphere of Ar under the condition that the gas pressure was 1.5 mTorr and the input power was 300 W, while changing the film thickness of the rare-earth transition-metal alloy layer from 0 Å to 70 Å at intervals of 10 Å.

The remaining steps were the same as with the case of Example 27.

The samples of the magneto-optical recording media manufactured as described above were tested for magnetic field sensitivity, and the test results achieved were similar to those of Example 27.

Figure 43:
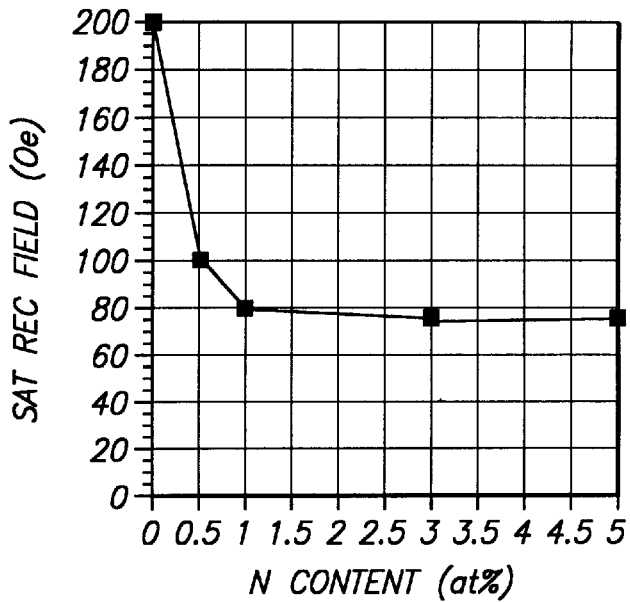
FIG. 43 is a characteristic graph showing the relationship between the content of nitrogen and the saturated recording magnetic field intensity in a thirty first example.

FIG. 43 shows the test results of the relationship between the nitrogen content of the target employed for forming auxiliary recording layer 14 and magnetic field sensitivity, which indicates that the magnetic field sensitivity may be improved when the target containing nitrogen of 0.5 at% or more is employed.

(15) Examples Related to Spontaneous Magnetization of Auxiliary Recording Layer and the Recording Layer In previous Sections (2) and (6), the reason or ground of improvement in the magnetic field sensitivity, has been explained from the standpoint of the generation of maze domains. In summary, in the case of a magnetic film wherein minute maze domains are easily generated, when the applied magnetic field intensity is small, the maze domains are frozen in the recorded domains as micro domains, with the result that the magnetic field sensitivity is deteriorated. Accordingly, when the domain width of the maze domains is widened, since the maze domains may be changed into single-domains by a small magnetic field applied thereto, so that magnetic field sensitivity may be improved.

To widen the domain width of the maze domains, the following points are effective:

(1) spontaneous magnetization Ms is decreased, (2) domain wall energy density σw is increased, or (3) film thickness of the magnetic layer is reduced as much as possible.

In Sections (2) and (6) above, the generation of maze domains has been explained mainly from the standpoint of the domain wall energy density σw. Therefore, the generation of maze domains will now be described from the standpoint set forth in Section (1), that is, reducing the spontaneous magnetization Ms. The reason why the maze domains are generated is that the demagnetization energy $2\pi Ms^2$ is reduced in the perpendicular magnetization film. Therefore, when Ms is reduced, since the demagnetization energy may be reduced inversely proportional to the square of Ms, the effect is noticeable. In this case, the intensity of Ms near the Curie temperature related to the recording is important, that is, the spontaneous magnetization Ms, between the Curie temperature and the temperature at which the domain walls are fixed, is important.

[EXAMPLE 32]

As already explained, in the magneto-optical recording medium according to this invention, auxiliary recording layer 14 is dominant over the domain formation in the area heated for recording. Accordingly, the Ms of the auxiliary recording layer will be first explained.

In the structure wherein auxiliary recording layer 14 with a film thickness of 70 Å or less is laminated on recording layer 13, although the temperature at which the domains are formed is slightly shifted from the Curie temperature to a higher temperature, the shifted temperature is sufficiently small, so that the intensity of the spontaneous magnetization Ms of the auxiliary recording layer at $T_{C1}$ becomes important.

Figure 44:
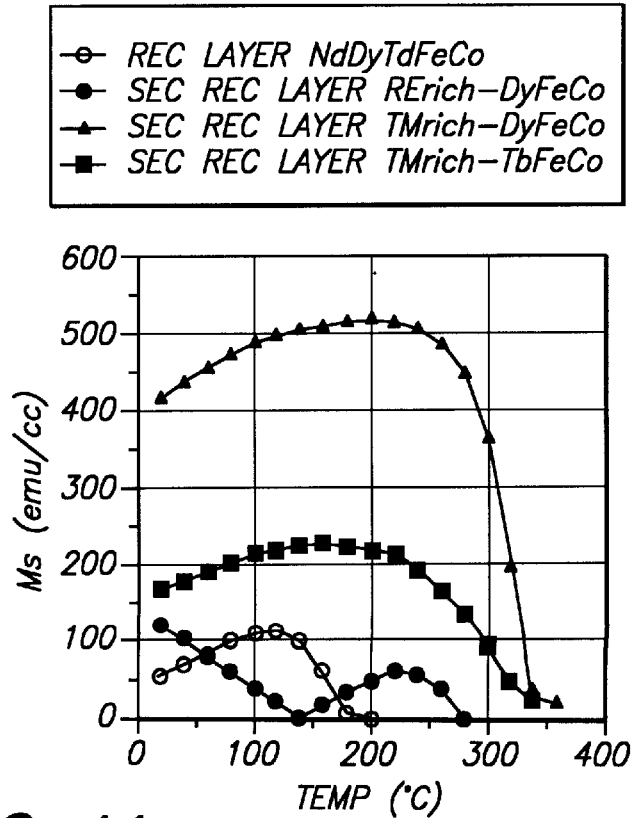
FIG. 44 is a characteristic graph showing the dependence of Ms of the respective thin films upon the temperature in a thirty second example.

For experiment, recording layers 13 were formed of a NdDyTbFe thin film of Nd 5 at%, Dy 16 at%, Tb 5 at%, Fe 59 at%, Co 15 at%, and auxiliary recording layers 14 were formed of three different rare-earth transition-metal alloy thin films: RE-rich DyFeCo thin film of Dy 30 at%, Fe 35 at%, Co 35 at%; TM-rich DyFeCo thin film of Dy 17 at%, Fe 47 at%, Co 36 at%; and TM-rich TbFeCo thin film of Tb 18 at%, Fe 62 at%, Co 20 at%. FIG. 44 shows the dependency of the Ms of these thin films upon the temperature, wherein Ms was measured by a vibration sample type magnetometer (VSM) and the film thickness of each thin film was 400 Å, respectively.

FIG. 44 indicates that the dependency of the Ms upon the temperature changes markedly according to the content of Co. Here, since the Curie temperature $T_{C1}$ of recording layer 13 is 180° C., the intensity of Ms of auxiliary recording layer 14 at this temperature is 30 emu/cc in the RE-rich DyFeCo, 515 emu/cc in the TM-rich DyFeCo, and 220 emu/cc in the TM-rich TbFeCo.

Further, another sample was prepared such that the recording layer with a film thickness of 200 Å was formed of the same composition as above, and thereafter the auxiliary recording layer 13 with a film thickness of 25 Å was formed of the RE-rich DyFeCo. The CN ratio of the prepared sample was checked under the recording conditions as follows: the linear velocity was 1.4 m/s, the frequency was 720 kHz, the power was 6.0 mW, and the modulated magnetic field was ±50 Oe. The obtained test result for the CN ratio was 51 dB.

A similar test was made for another sample wherein after similar recording layer 13 had been formed, auxiliary recording layer 14 with a film thickness of 20 Å was formed of TM-rich TbFeCo. The obtained test result was 46 dB in CN ratio. Further, a similar test was made for the other sample wherein, after similar recording layer 13 was formed, auxiliary recording layer 14 was formed of TM-rich DyFeCo. The obtained CN ratio decreased monotonously according to an increase in the film thickness of auxiliary recording layer 14. In this connection, in the case of the magneto-optical recording medium having only recording layer 13, without any auxiliary recording layer 13, the obtained test result for the CN ratio was 41 dB.

The above experiment indicates that the magnetic field sensitivity decreases with increasing Ms of auxiliary recording layer 14 at or near the Curie temperature $T_{C1}$ of recording layer 13.

Figure 45:
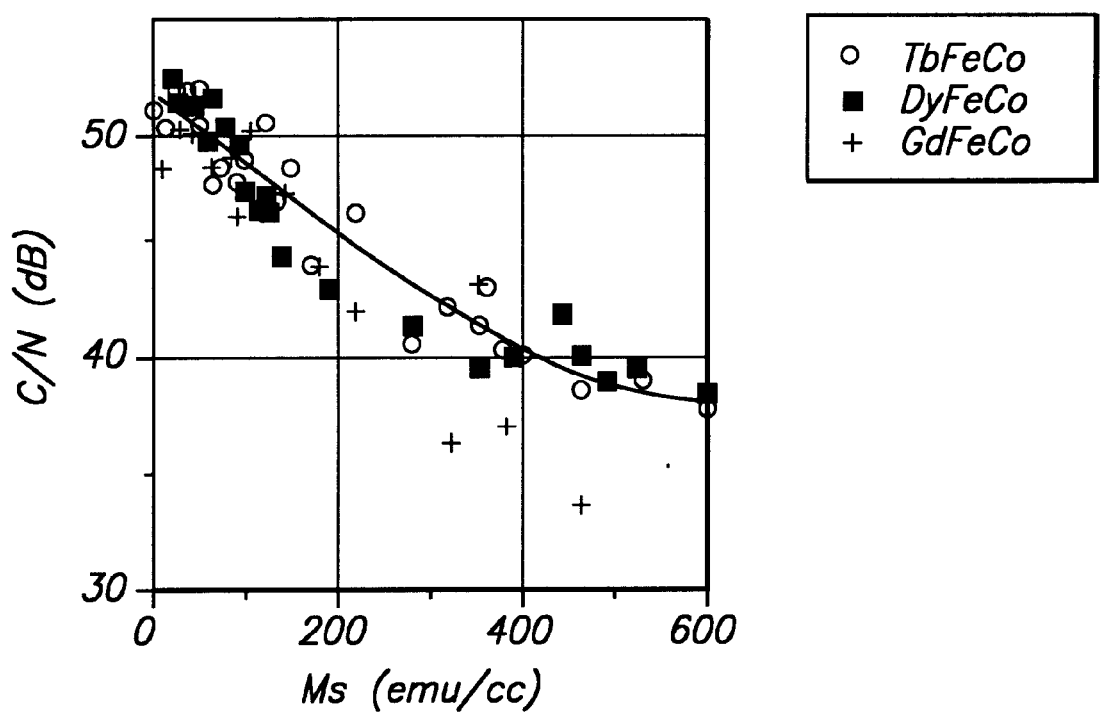
FIG. 45 is a characteristic graph showing the relationship between the Ms of the auxiliary recording film and the CN ratio in the thirty second example.

To reinforce the above-mentioned results, the relationship between Ms of auxiliary recording layer 14 at the Curie temperature $T_{C1}$ of recording layer 13 and the CN ratio obtained when recorded under the above-mentioned conditions was examined. FIG. 45 shows the examined results. In this experiment, recording layer 13 was formed of (Gd, Tb, Dy)—FeCo whose Curie temperature $T_{C1}$ was between 160° C. and 230° C. and whose difference $(T_{C1}-T_{COMP1})$ between the Curie temperature $T_{C1}$ and the compensation temperature $T_{COMP1}$ was from 100° K to 500° K, or of an amorphous alloy of the same composition to which a light rare earth metal such as Nd, Pr or Sm was added. Here, the reason why the $T_{C1}$ was limited between 160° C. and 230° C. was to test the influence of Ms of auxiliary recording layer 14 upon the CN ratio and, therefore, not for the purpose of limiting recording layer 13 of this invention. GdFeCo, TbFeCo and DyFeCo were employed as auxiliary recording layer 14. FIG. 45 shows the maximum CN ratio in the cases where auxiliary recording layer 14 was formed before or after recording layer 13 and the film thickness was changed as follows: 20 Å, 25 Å, 30 Å, 35 Å and 40 Å.

FIG. 45 indicates that the smaller the Ms of auxiliary recording layer 14 at the Curie temperature $T_{C1}$ of recording layer 13 is, the higher will be the CN ratio. Since the CN ratio in the case of single-layer of recording layer 13 is from 39 dB to 42 dB, when the Ms of auxiliary recording layer 14 at the Curie temperature $T_{C1}$ of recording layer 13 is less than 400 emu/cc, it is understood that the magnetic field sensitivity may be improved by auxiliary recording layer 14. In particular, when less than 250 emu/cc, an improvement more than 5 dB may be achieved. Further, when less than 80 emu/cc, the magnetic field sensitivity may be markedly improved.

Since the difference among GdFeCo, TbFeCo, DyFeCo is small, it is understood that the temperature dependency of Ms is a very important factor in these three alloy groups or these mixed composition groups, and the kind of rare earth metal is of only secondarily importance.

However, where the film thickness of auxiliary recording layer 14 deviated from the optimum film thickness, there exists a difference in magnetic field sensitivity characteristics between the respective alloys. For instance, in the case of auxiliary recording layer 14 of GdFeCo, it was recognized that when the film thickness of auxiliary recording layer 14 deviated from the optimum film thickness thereof to thicker, the noise level markedly increased. In contrast to this, in the case of auxiliary recording layer 14 of TbFeCo or DyFeCo, the noise level increased relatively in a gentle manner. This difference may be due to a difference in the perpendicular anisotropy energy Ku between these materials.

[EXAMPLE 33]

The dependency of the spontaneous magnetization Ms of recording layer 13 upon the temperature is also important. This is because the magnetic characteristics of the recording layer is dominant at the low temperature portion of the domain forming zone during the process of forming the magnetic domains, as already explained. The factor of characterizing the temperature dependency of the Ms is appropriately a difference $(T_{C1}-T_{COMP1})$ between the Curie temperature $T_{C1}$ and the compensation temperature $T_{COMP1}$. As understood with reference to FIG. 44, the Ms near $T_{C1}$ of recording layer 13 increases with the difference $(T_{C1}-T_{COMP1})$ between the two.

In the experiment shown in FIG. 45, the difference (between $T_{C1}$ and $T_{COMP1}$) of each recording layer 13 is from 100° K to 500° K. In this temperature range, when auxiliary recording layer 14 was laminated, the magnetic field sensitivity was markedly improved. However, it was found that the CN ratio decreased with decreasing difference $(T_{C1}-T_{COMP1})$, so that the effect of laminating the auxiliary recording layer was not sufficiently obtained. In particular, when the difference $(T_{C1}-T_{COMP1})$ was 50° K or less, even if the auxiliary recording layer was formed, the magnetic field sensitivity was not at all improved. This may be due to the fact that if the difference $(T_{C1}-T_{COMP1})$ is excessively small, since the Ms of recording layer 13 near $T_{C1}$ is small, the function of the recording layer in the domain formation, that is, the function of forming sharp domains accurately according to the temperature distribution cannot be effected. In practice, when the domains recorded in recording layer 13 having an excessively small difference $(T_{C1}-T_{COMP1})$ were observed, no sharp shapes were recognized at the rear portions of the recorded domains, but the domains were rounded into irregular shape.

When the Ms of the recording layer is too small, the driving force for forming magnetization inverting nuclei or shifting the domain walls is too small due to an external magnetic field, so that the domain wall energy density becomes a dominant driving force for determining the form of the recorded domains. As a result, the recorded domains are formed as to minimize the domain wall energy density, and the magnetic film is easily subjected to the influence of local nonuniformity, thus resulting in that the CN ratio is markedly reduced.

On the other hand, when the Ms of recording layer 13 near the Curie temperature is excessively large, since the demagnetization energy becomes excessive as compared with the perpendicular anisotropy energy Ku, even if auxiliary recording layer 14 is laminated, the generation of the maze domains cannot be suppressed in the recorded domains or the domain wall at the boundary between the recorded domains is disturbed, with the result that the magnetic field sensitivity or the CN ratio is deteriorated. As a result, when the difference $(T_{C1}-T_{COMP1})$ exceeded 500 K, even if the composition of the auxiliary recording layer was adjusted, it had been difficult to obtain a practical magneto-optical recording medium.

The experimental results indicate that the preferable range of ($T_{C1}$-$T_{COMP1}$) of recording layer 13 is from 200° K to 300° K.

What is claimed is:

1. A magneto-optical recording medium comprising a recording layer with a Curie temperature $T_{C1}$, an auxiliary recording layer on said recording layer, a Curie temperature $T_{C2}$ of said auxiliary recording layer higher than the Curie temperature $T_{C1}$ of said recording layer, said auxiliary recording layer having a film thickness of about 70 Å or less.

2. A magneto-optical recording medium comprising a recording layer with a Curie temperature $T_{C1}$, an auxiliary recording layer on said recording layer, a Curie temperature $T_{C2}$ of said auxiliary recording layer higher than the Curie temperature $T_{C1}$ of said recording layer, said auxiliary recording layer including a structure having a plurality of discrete islands comprising aggregates of a material forming said auxiliary recording layer, and said auxiliary recording layer having a film thickness of about 70 Å or less.

3. The magneto-optical recording medium of claim 1 or 2 wherein a temperature difference between $T_{C2}$ and $T_{C1}$ is larger than 10° K.

4. The magneto-optical recording medium of claim 1 or 2 wherein a temperature difference between $T_{C2}$ and $T_{C1}$ is larger than 30° K.

5. The magneto-optical recording medium of claim 1 or 2 wherein said auxiliary recording layer is laminated in contact with a surface of said recording layer on a side remote from a light irradiation side of said medium.

6. The magneto-optical recording medium of claim 1 or 2 wherein said auxiliary recording layer is laminated in contact with a surface of said recording layer on a light irradiation side of said medium.

7. The magneto-optical recording medium of claim 1 or 2 wherein said recording layer is provided one each on opposite surfaces of said auxiliary recording layer.

8. The magneto-optical recording medium of claim 1 or 2 wherein said auxiliary recording layer is provided one each on opposite surfaces of said recording layer.

9. The magneto-optical recording medium of claim 1 or 2 wherein a squareness ratio of said auxiliary recording layer at $T_{C1}$ is 0.3 or more.

10. The magneto-optical recording medium of claim 1 or 2 wherein a squareness ratio of said auxiliary recording layer at $T_{C1}$ is 0.7 or more.

11. The magneto-optical recording medium of claim 1 or 2 wherein a squareness ratio of said auxiliary recording layer at $T_{C1}$ is 0.95 or more.

12. The magneto-optical recording medium of claim 1 or 2 wherein said auxiliary recording layer comprises a rare-earth transition-metal amorphous alloy.

13. The magneto-optical recording medium of claim 12 wherein a content ratio of the rare-earth metal in said auxiliary recording layer is between 15 at% and 50 at%.

14. The magneto-optical recording medium of claim 12 wherein a content ratio of the rare-earth metal in said auxiliary recording layer is between 18 at% and 45 at%.

15. The magneto-optical recording medium of claim 12 wherein a content ratio of the rare-earth metal in said auxiliary recording layer is between 23 at% and 45 at%.

16. The magneto-optical recording medium of claim 12 wherein said auxiliary recording layer contains at least Fe and Co as the transition metal and at least one of Gd, Tb and Dy as the rare-earth metal.

17. The magneto-optical recording medium of claim 16 wherein, in the case of the presence of Gd, a content ratio of Gd to the rare-earth metal of said auxiliary recording layer is larger than that of said recording layer and, in the case of the Presence of Tb, a content ratio of Tb to the rare-earth metal of said auxiliary recording layer is larger than that of said recording layer.

18. The magneto-optical recording medium of claim 16 wherein a content ratio of the rare-earth metal to a total of the rare-earth metal and the transition metal of said auxiliary recording layer is larger than that of said recording layer and a content ratio of Co to the transition metal of said auxiliary recording layer is larger than that of said recording layer.

19. The magneto-optical recording medium of claim 12 wherein said auxiliary recording layer contains at least Fe and Co as the transition metal, at least one of heavy rare-earth metals comprising, Gb, Tb and Dy as the rare-earth metal, and at least one of light rare-earth metals comprising Sm, Nd and Pr as the rare-earth metal.

20. The magneto-optical recording medium of claim 19 wherein a content ratio of the light rare-earth metal to the rare-earth metal of said auxiliary recording layer is smaller than that of said recording layer.

21. The magneto-optical recording medium of claim 1 or 2 wherein a film thickness of said recording layer is 80 Å or more.

22. The magneto-optical recording medium of claim 1 or 2 wherein spontaneous magnetization Ms of said auxiliary recording layer at $T_{C1}$ is 400 emu/cc or less.

23. The magneto-optical recording medium of claim 1 or 2 wherein spontaneous magnetization Ms of said auxiliary recording layer at $T_{C1}$ is 250 emu/cc or less.

24. The magneto-optical recording medium of claim 1 or 2 wherein spontaneous magnetization Ms of said auxiliary recording layer at $T_{C1}$ is 80 emu/cc or less.

25. The magneto-optical recording medium of claim 1 or 2 wherein a difference ($T_{C1}$-$T_{COMP1}$) between the Curie temperature $T_{C1}$ and a compensation temperature $T_{COMP1}$ of the recording layer is 500° K or less.

26. The magneto-optical recording medium of claim 1 or 2 wherein a difference ($T_{C1}$-$T_{COMP1}$) between the Curie temperature $T_{C1}$ and a compensation temperature $T_{COMP1}$ of the recording layer is between 200° K and 300° K.

27. The magnetic-optical recording medium of claim 1 or 2 wherein magnetic characteristics of said recording layer and said auxiliary recording layer are selected so that said auxiliary recording layer is dominant at high temperature portions in domain forming zones formed during recording and said recording layer is dominant at low temperature portions in domain forming zones formed during the recording.

28. A magneto-optical recording medium comprising a first rare-earth transition-metal alloy film, a second rare-earth transition-metal alloy film on said first alloy film, a density of said second alloy film being lower than a density of said first alloy layer, said second alloy film having a film thickness from 5 Å to 50 Å.

29. A method of manufacturing a magneto-optical recording medium, comprising the steps of:

forming a first rare-earth transition-metal alloy film by sputtering; and forming a second rare-earth transition-metal alloy film having a film thickness of about 70 Å or less on the first alloy film under at least one of the following conditions:

(a) employing a film forming rate that is 1/20 to 2/3 lower than that employed during formation of the first alloy film, and (b) employing an inert gas pressure that is 2 to 20 times higher than that employed during formation of the first alloy film.

30. A magneto-optical recording medium comprising a recording layer formed of a rare-earth transition-metal alloy, an auxiliary recording layer formed on said recording layer, said auxiliary recording layer containing at least one of the components comprising Fe and Co, said auxiliary recording layer having a film thickness less than about 70 Å.

31. A magneto-optical recording medium comprising a recording layer formed of a rare-earth transition-metal alloy, an auxiliary recording layer formed on said recording layer, said auxiliary recording layer containing at least one of the components comprising Fe and Co, said auxiliary recording layer having a structure comprising a plurality of discrete islands comprising aggregates of a material forming said auxiliary recording layer, and said auxiliary recording layer having a film thickness of about 70 Å or less.

32. A magneto-optical recording medium comprising a recording layer formed of a rare-earth transition-metal alloy, an auxiliary recording layer formed on said recording layer, said auxiliary recording layer containing at least one of the group comprising Pt, Al, Ti and Cr, said auxiliary recording layer having a film thickness less than about 70 Å.

33. A magneto-optical recording medium comprising a recording layer formed of a rare-earth transition-metal alloy, an auxiliary recording layer formed on said recording layer, said auxiliary recording layer containing at least one of the group comprising Pt, Al, Ti and Cr, said auxiliary recording layer having a structure comprising a plurality of discrete islands comprising aggregates of a material forming said auxiliary recording layer, and said auxiliary recording layer having a film thickness of about 70 Å or less.

34. A method of manufacturing a magneto-optical recording medium, comprising the steps of:

forming a recording layer of rare-earth transition-metal alloy; and forming an auxiliary recording layer having a film thickness of about 70 Å or less and containing at least one of the group comprising Pt, Al, Ti and Cr on the recording layer employing inert gas magnetron sputtering having a sputtering gas pressure from 0.3 mTorr to 4 mTorr.

35. An apparatus for manufacturing a magneto-optical recording medium, comprising:

a first target for forming a recording layer of a rare-earth transition-metal alloy employing magnetron sputtering; and a second target for forming an auxiliary recording layer with a film thickness of about 70 Å or less employing magnetron sputtering, wherein the maximum magnetic flux density on a target surface of the first target is less than the maximum magnetic flux density on a target surface of said second target.

36. A magneto-optical recording medium comprising a recording layer formed of a rare-earth transition-metal alloy, an auxiliary recording layer on said recording layer, said auxiliary recording layer comprising a rare-earth transition-metal alloy containing nitrogen and having a film thickness of about 50 Å or less.

37. A magneto-optical recording medium comprising a recording layer formed of rare-earth transition-metal alloy, an auxiliary recording layer on said recording layer, said auxiliary recording layer comprising a rare-earth transition-metal alloy containing nitrogen and having a structure having a plurality of discrete islands comprising aggregates of a material forming said auxiliary recording layer, and said auxiliary recording layer having a film thickness of about 70 Å or less.

38. A method of manufacturing a magneto-optical recording medium, comprising the steps of:

forming a recording layer of a rare-earth transition-metal alloy on a substrate; and forming an auxiliary recording layer on the recording layer, the auxiliary recording layer being formed of a rare-earth transition-metal alloy containing nitrogen with a film thickness of 50 Å or less.

39. The method of manufacturing a magneto-optical recording medium of claim 38 wherein the step of forming the auxiliary recording layer comprises the step of subjecting the substrate to an atmosphere of a nitrogen gas or a compound gas containing nitrogen.

40. The method of manufacturing a magneto-optical recording medium of claim 38 wherein the step of forming the auxiliary recording layer comprises the step of subjecting the substrate to an atmosphere containing nitrogen gas with a partial pressure of $5 \times 10^{-6}$ Torr or more.

41. The method of manufacturing a magneto-optical recording medium of claim 38 wherein the step of forming the auxiliary recording layer comprises the step of applying radio-frequency plasma-etching to the recording layer in an atmosphere containing nitrogen gas with a partial pressure of $5 \times 10^{-6}$ Torr or more.

42. The method of manufacturing a magneto-optical recording medium of claim 38 wherein the step of forming the auxiliary recording layer comprises the step of reactive sputtering the recording layer in an atmosphere containing nitrogen gas with a partial pressure of $5 \times 10^{-6}$ Torr or more.

43. The method of manufacturing a magneto-optical recording medium of claim 38 wherein the step of forming the auxiliary recording layer comprises the step of sputtering the substrate surface employing a rare-earth transition-metal alloy target containing nitrogen of 0.5 at% or more.

* * * * *

UNITED STATES PATENT AND TRADEMARK OFFICE
CERTIFICATE OF CORRECTION

PATENT NO.    : 5,976,688
DATED         : November 2, 1999
INVENTOR(S)   : Takeo Kawase, et al.

It is certified that an error appears in the above identified patent and that said Letters Patent is hereby corrected as shown below:

Column 70, line 2, change "Presence" to --presence--.

Signed and Sealed this

Fourth Day of July, 2000

*Attest:*

Q. TODD DICKINSON

*Attesting Officer*        *Director of Patents and Trademarks*